US012735077B2

(12) United States Patent
Yamamoto et al.

(10) Patent No.: US 12,735,077 B2

(45) Date of Patent: Sep. 15, 2026

(54) INFORMATION PROCESSING DEVICE AND MOVEMENT DEVICE TO PERFORM SAFE MANUAL DRIVING BASED ON DRIVER AND ENVIRONMENTAL DATA

(71) Applicants: SONY GROUP CORPORATION, Tokyo (JP); SONY SEMICONDUCTOR SOLUTIONS CORPORATION, Kanagawa (JP)

(72) Inventors: Yuki Yamamoto, Chiba (JP); Eiji Oba, Tokyo (JP)

(73) Assignees: SONY SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 465 days.

(21) Appl. No.: 18/297,391

(22) Filed: Apr. 7, 2023

(65) Prior Publication Data

US 2023/0311953 A1 Oct. 5, 2023

Related U.S. Application Data

(63) Continuation of application No. 16/964,189, filed as application No. PCT/JP2019/003030 on Jan. 29, 2019, now Pat. No. 11,654,936.

(30) Foreign Application Priority Data

Feb. 5, 2018 (JP) ................................ 2018-018360

(51) Int. Cl.

*B60W 60/00* (2020.01)
*B60W 40/08* (2012.01)
(Continued)

(52) U.S. Cl.

CPC ........ *B60W 60/0053* (2020.02); *B60W 40/08* (2013.01); *B60W 50/14* (2013.01);
(Continued)

(58) Field of Classification Search

None
See application file for complete search history.

(56) References Cited

U.S. PATENT DOCUMENTS

2014/0244096 A1* 8/2014 An ........................ B60K 28/06 701/25
2015/0070160 A1 3/2015 Davidsson et al.
(Continued)

FOREIGN PATENT DOCUMENTS

CN 105575210 A 5/2016
CN 105825621 A 8/2016
(Continued)

OTHER PUBLICATIONS

International Preliminary Report on Patentability of PCT Application No. PCT/JP2019/003030, issued on Aug. 20, 2020, 7 pages of English Translation and 05 pages of IPRP.
(Continued)

*Primary Examiner* — James J Lee
*Assistant Examiner* — Tawri M Mcandrews
(74) *Attorney, Agent, or Firm* — CHIP LAW GROUP

(57) ABSTRACT

A configuration is achieved in which driver information and environmental information are input and a safety index value indicating whether or not a driver who is performing automatic driving is in a state of being able to perform safe manual driving or a manual driving recovery available time is estimated. The configuration includes: a driver information acquisition unit that acquires driver information of a movement device such as an automobile; an environmental information acquisition unit that acquires environmental
(Continued)

information of the movement device; and a safety determination unit that receives, as an input, the driver information and the environmental information, and learns and calculates a safety index value indicating whether or not a driver in the movement device during automatic driving is in a state of being able to perform safe manual driving. The safety determination unit further estimates a manual driving recovery available time including a time required until the driver in the movement device during the automatic driving becomes able to start the safe manual driving.

14 Claims, 24 Drawing Sheets

(51) Int. Cl.
*B60W 50/14* (2020.01)
*G05D 1/00* (2024.01)
*G06N 20/00* (2019.01)

(52) U.S. Cl.
CPC .... *B60W 60/0015* (2020.02); *B60W 60/0057* (2020.02); *B60W 60/0059* (2020.02); *G05D 1/0061* (2013.01); *G06N 20/00* (2019.01); *B60W 2050/146* (2013.01); *B60W 2420/403* (2013.01); *B60W 2420/408* (2024.01); *B60W 2540/221* (2020.02); *B60W 2540/225* (2020.02)

(56) References Cited

U.S. PATENT DOCUMENTS

| | | | | |
|---|---|---|---|---|
| 2016/0001781 | A1 | 1/2016 | Fung et al. | |
| 2016/0041553 | A1 | 2/2016 | Sato et al. | |
| 2016/0214618 | A1 | 7/2016 | Wulf | |
| 2016/0246298 | A1* | 8/2016 | Sato | B60W 40/08 |
| 2017/0021837 | A1 | 1/2017 | Ebina | |
| 2017/0303842 | A1 | 10/2017 | Yoshida et al. | |
| 2017/0313319 | A1* | 11/2017 | Kishi | B60W 10/04 |
| 2017/0364070 | A1 | 12/2017 | Oba | |
| 2018/0173227 | A1 | 6/2018 | Mukai et al. | |
| 2019/0047588 | A1 | 2/2019 | Yabuuchi et al. | |
| 2019/0056732 | A1 | 2/2019 | Aoi et al. | |
| 2019/0370580 | A1 | 12/2019 | Aoi et al. | |
| 2020/0098265 | A1 | 3/2020 | Agnew et al. | |
| 2020/0283028 | A1 | 9/2020 | Oba | |

FOREIGN PATENT DOCUMENTS

| | | | |
|---|---|---|---|
| CN | 107000760 | A | 8/2017 |
| CN | 107207013 | A | 9/2017 |
| CN | 107430007 | A | 12/2017 |
| CN | 107531252 | A | 1/2018 |
| CN | 108137062 | A | 6/2018 |
| CN | 109074748 | A | 12/2018 |
| CN | 111315627 | A | 9/2020 |
| DE | 102012112802 | A1 | 6/2014 |
| DE | 102015201369 | A1 | 7/2016 |
| DE | 112016005314 | T5 | 8/2018 |
| EP | 2848488 | A1 | 3/2015 |
| EP | 2982565 | A2 | 2/2016 |
| EP | 3128498 | A1 | 2/2017 |
| EP | 2848488 | B1 | 8/2017 |
| EP | 3438948 | A1 | 2/2019 |
| EP | 3712028 | A1 | 9/2020 |
| JP | H10-309961 | A | 11/1998 |
| JP | 2016115356 | A | 6/2016 |
| JP | 2017-097518 | A | 6/2017 |
| JP | 4980988 | B2 | 7/2017 |
| JP | 2017/204301 | A | 11/2017 |
| JP | 6264492 | B1 | 1/2018 |
| KR | 101684556 | B1 | 12/2016 |
| KR | 20170087335 | A | 7/2017 |
| KR | 10-2020-0086268 | A | 7/2020 |
| WO | 2016/092796 | A1 | 6/2016 |
| WO | 2017/085981 | A1 | 5/2017 |
| WO | 2017/086079 | A1 | 5/2017 |
| WO | 2017/195405 | A1 | 11/2017 |
| WO | 2018/168040 | A1 | 9/2018 |
| WO | 2018/168121 | A1 | 9/2018 |
| WO | 2019/097944 | A1 | 5/2019 |

OTHER PUBLICATIONS

Non-Final Office Action for U.S. Appl. No. 16/964,189, issued on Mar. 23, 2022, 48 pages.
Final Office Action for U.S. Appl. No. 16/964,189, issued on Aug. 26, 2022, 29 pages.
Advisory Action for U.S. Appl. No. 16/964,189, issued on Nov. 3, 2022, 03 pages.
Notice of Allowance for U.S. Appl. No. 16/964,189, issued on Jan. 9, 2023, 20 pages.
International Search Report and Written Opinion of PCT Appln. No. PCT/JP2019/003030, issued May 7, 2019, 8 pages of English Translation and 8 pages of ISRWO.
Extended European Search Report of EP Appln. No. 19746945.5, issued Mar. 5, 2021, 9 pages.

* cited by examiner

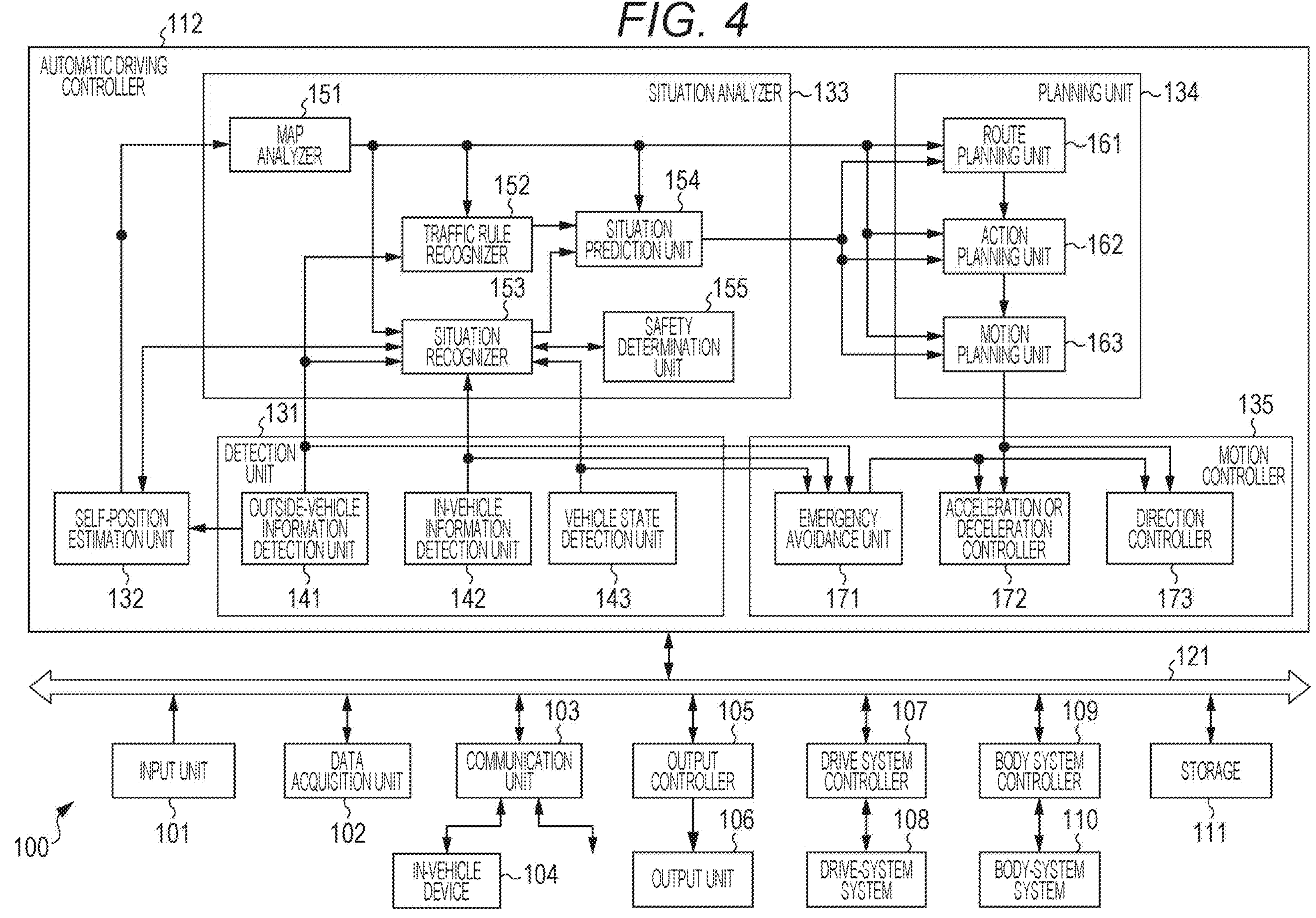
FIG. 4
112
AUTOMATIC DRIVING CONTROLLER
SITUATION ANALYZER
133
PLANNING UNIT
134
151
MAP ANALYZER
152
TRAFFIC RULE RECOGNIZER
154
SITUATION PREDICTION UNIT
153
SITUATION RECOGNIZER
155
SAFETY DETERMINATION UNIT
ROUTE PLANNING UNIT
161
ACTION PLANNING UNIT
162
MOTION PLANNING UNIT
163
131
DETECTION UNIT
135
MOTION CONTROLLER
SELF-POSITION ESTIMATION UNIT
OUTSIDE-VEHICLE INFORMATION DETECTION UNIT
IN-VEHICLE INFORMATION DETECTION UNIT
VEHICLE STATE DETECTION UNIT
EMERGENCY AVOIDANCE UNIT
ACCELERATION OR DECELERATION CONTROLLER
DIRECTION CONTROLLER
132
141
142
143
171
172
173
121
103
105
107
109
INPUT UNIT
DATA ACQUISITION UNIT
COMMUNICATION UNIT
OUTPUT CONTROLLER
DRIVE SYSTEM CONTROLLER
BODY SYSTEM CONTROLLER
STORAGE
100
101
102
106
108
110
111
IN-VEHICLE DEVICE
104
OUTPUT UNIT
DRIVE-SYSTEM SYSTEM
BODY-SYSTEM SYSTEM

FIG. 8

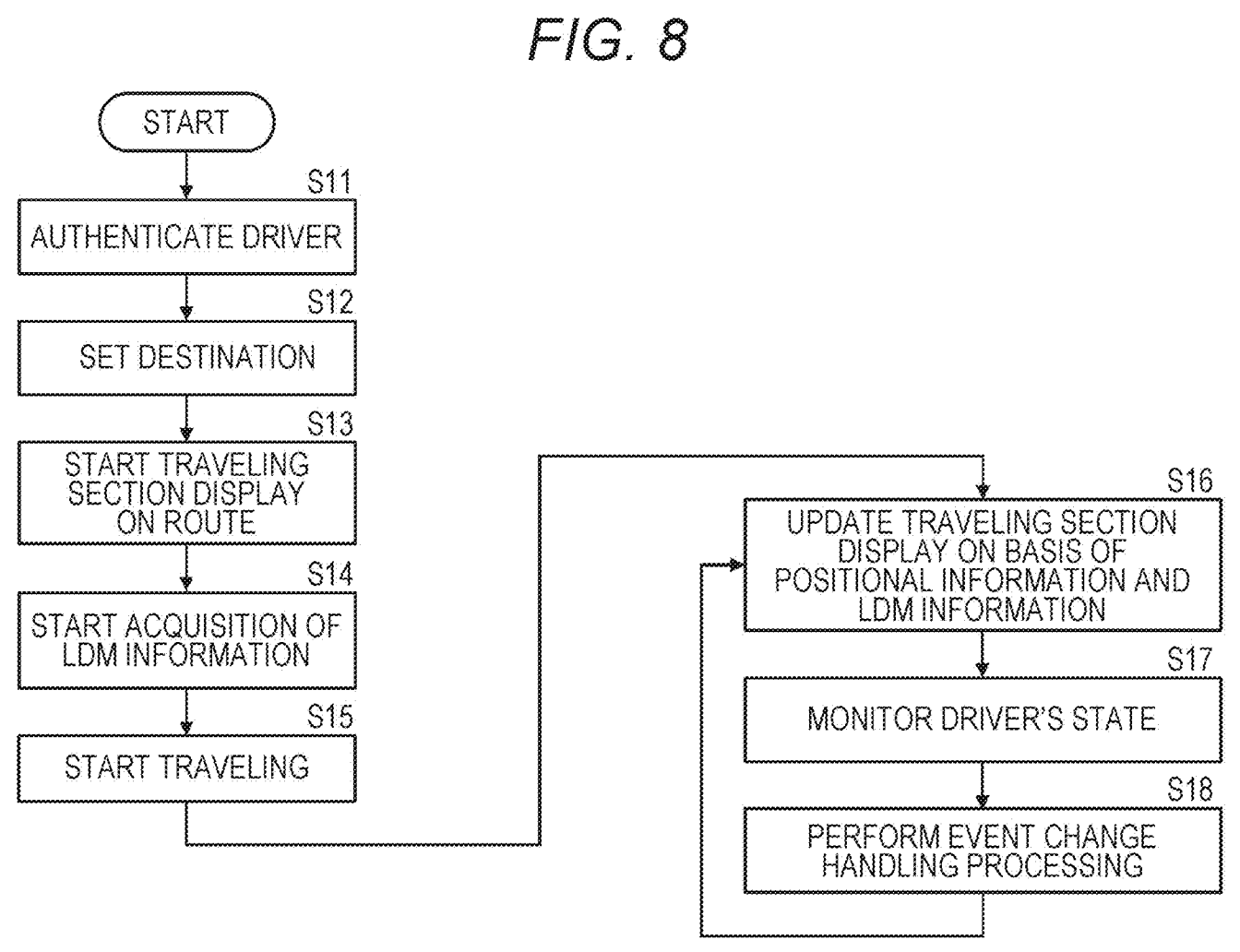

START

S11 AUTHENTICATE DRIVER

S12 SET DESTINATION

S13 START TRAVELING SECTION DISPLAY ON ROUTE

S14 START ACQUISITION OF LDM INFORMATION

S15 START TRAVELING

S16 UPDATE TRAVELING SECTION DISPLAY ON BASIS OF POSITIONAL INFORMATION AND LDM INFORMATION

S17 MONITOR DRIVER'S STATE

S18 PERFORM EVENT CHANGE HANDLING PROCESSING

GREEN
YELLOW
RED
Sa
Sc
Sb
Sa
Sd
Sc
Sb
Sc
Sb v(t)

0
MOVEMENT DISTANCE
Sa
Sc
Sb
Sa
Sd
Sc
Sb
Sc
Sb

0
TIME
TIME LINEAR DISPLAY CLOSEST SECTION
TIME RECIPROCAL DISPLAY SECTION 1/Δt
TIME LINEAR DISPLAY DISTANT SECTION REDUCTION RATE hs/ho
Sc h0
h
hs
CURRENT POINT
t0
t
( t = t0 * h0/h )
t1
t2 t2
t1
EXECUTION SCREEN
OF SECONDARY TASK,
FREE USE RANGE
182
181
t1
t0
CURRENT
POINT t2
t1
EXECUTION SCREEN
OF SECONDARY TASK,
FREE USE RANGE
182
181
t1
t0
CURRENT
POINT

THIRD SECTION t1 t2

Figure 15:
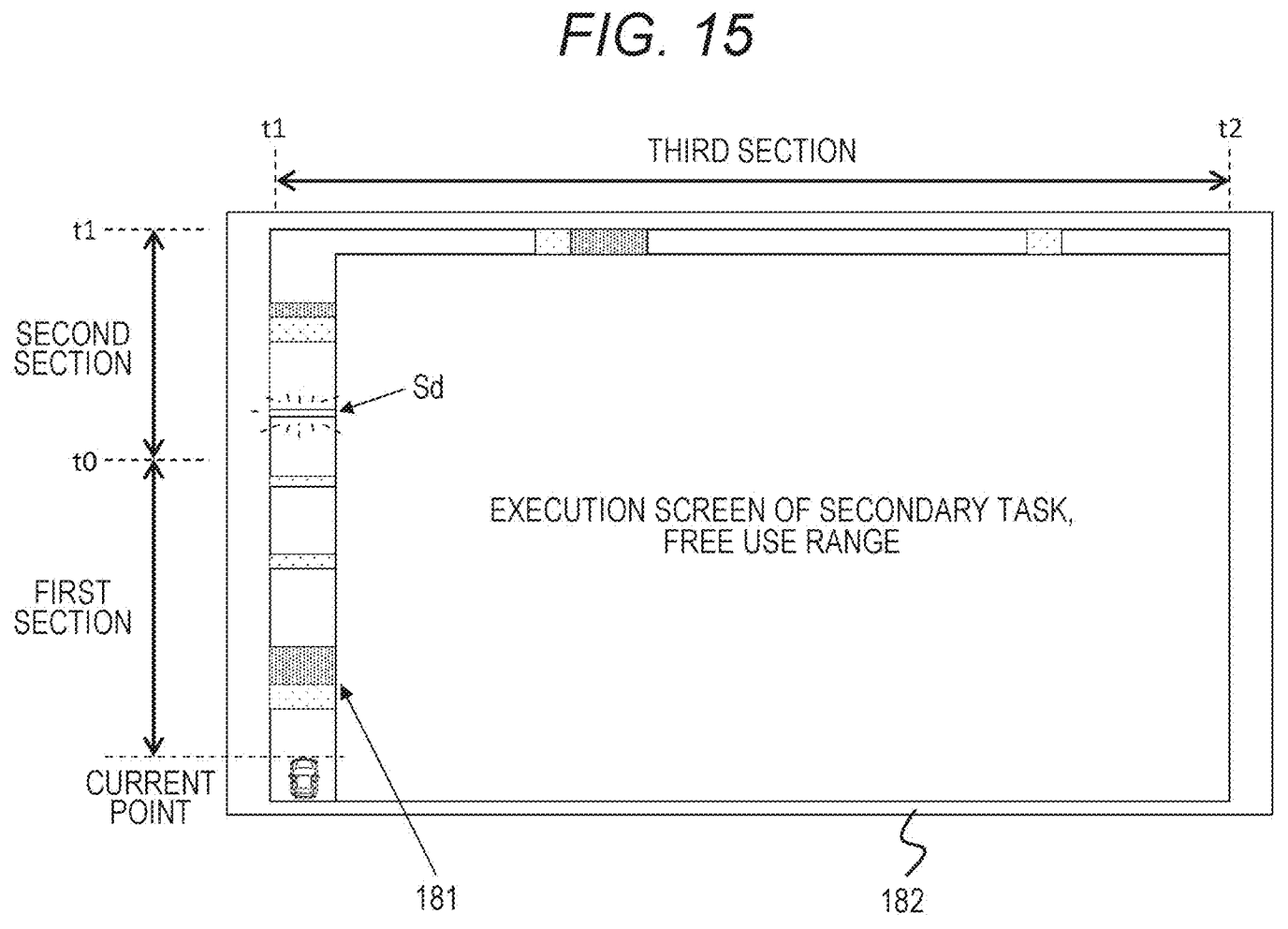

EXECUTION SCREEN OF SECONDARY TASK,
FREE USE RANGE

182

Sd

181 t1

SECOND SECTION t0

FIRST SECTION

CURRENT POINT

THIRD SECTION
t2
t1
SMALL Window
EXECUTION SCREEN OF SECONDARY TASK,
FREE USE RANGE
182
181
t1
SECOND SECTION
t0
FIRST SECTION
CURRENT POINT

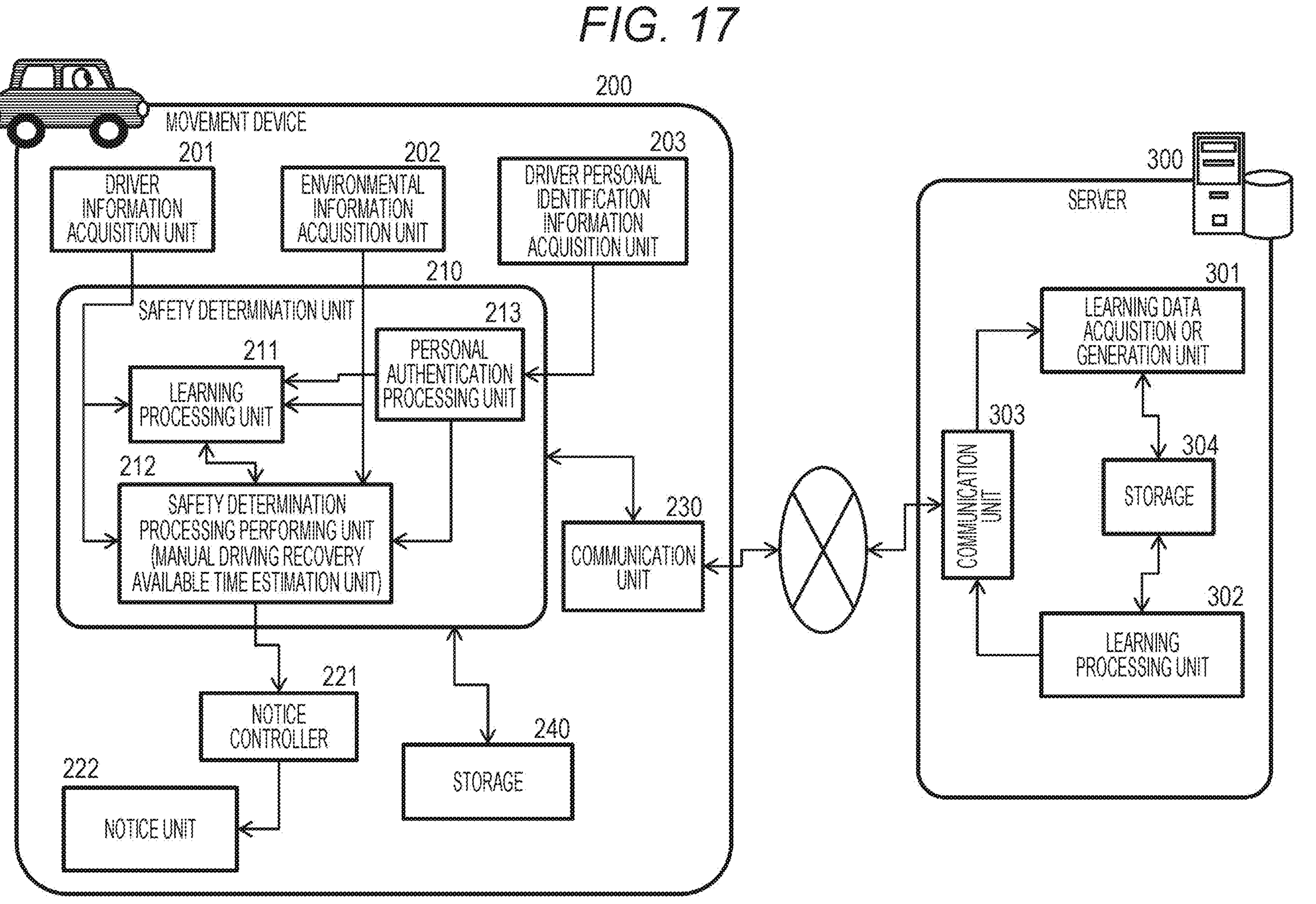
FIG. 17
200
MOVEMENT DEVICE
201
DRIVER INFORMATION ACQUISITION UNIT
202
ENVIRONMENTAL INFORMATION ACQUISITION UNIT
203
DRIVER PERSONAL IDENTIFICATION INFORMATION ACQUISITION UNIT
210
SAFETY DETERMINATION UNIT
211
LEARNING PROCESSING UNIT
213
PERSONAL AUTHENTICATION PROCESSING UNIT
212
SAFETY DETERMINATION PROCESSING PERFORMING UNIT (MANUAL DRIVING RECOVERY AVAILABLE TIME ESTIMATION UNIT)
230
COMMUNICATION UNIT
221
NOTICE CONTROLLER
240
STORAGE
222
NOTICE UNIT
300
SERVER
301
LEARNING DATA ACQUISITION OR GENERATION UNIT
303
COMMUNICATION UNIT
304
STORAGE
302
LEARNING PROCESSING UNIT

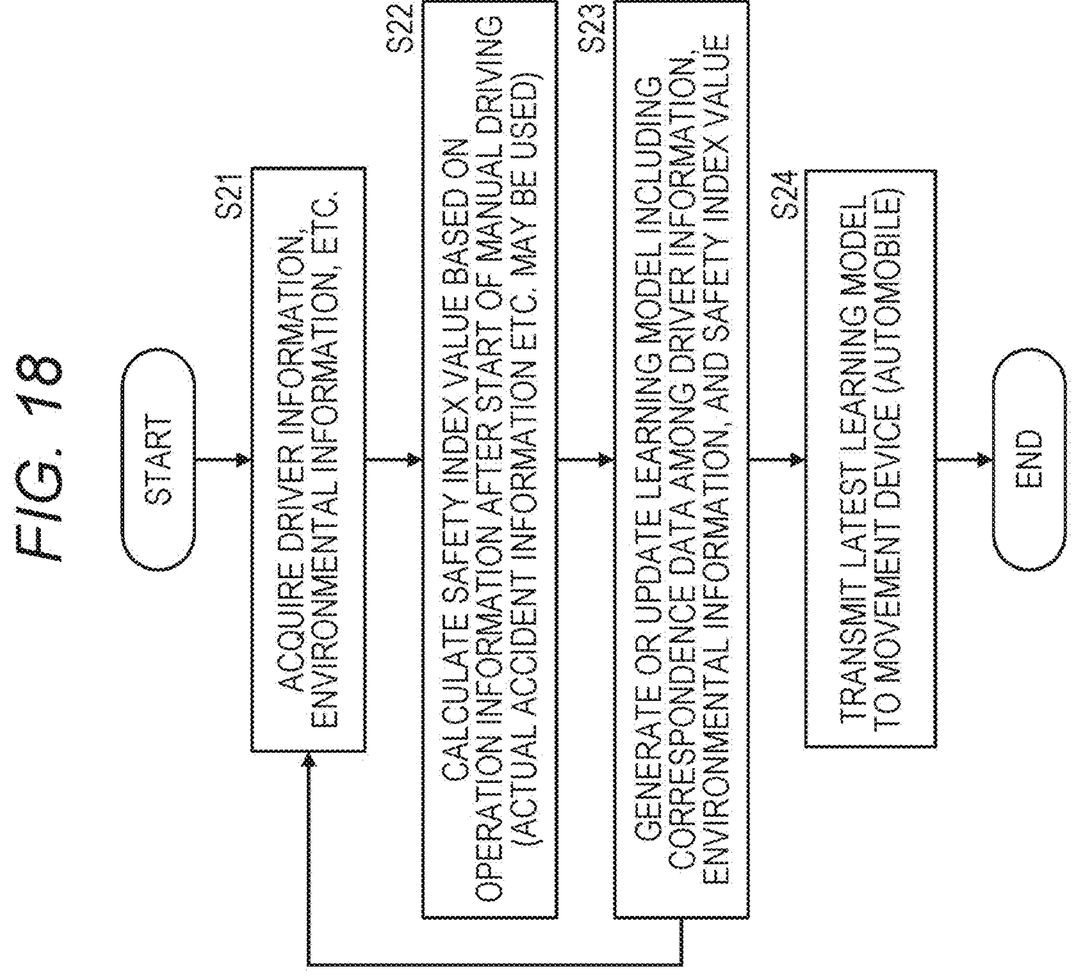
FIG. 18
START
S21
ACQUIRE DRIVER INFORMATION, ENVIRONMENTAL INFORMATION, ETC.
S22
CALCULATE SAFETY INDEX VALUE BASED ON OPERATION INFORMATION AFTER START OF MANUAL DRIVING (ACTUAL ACCIDENT INFORMATION ETC. MAY BE USED)
S23
GENERATE OR UPDATE LEARNING MODEL INCLUDING CORRESPONDENCE DATA AMONG DRIVER INFORMATION, ENVIRONMENTAL INFORMATION, AND SAFETY INDEX VALUE
S24
TRANSMIT LATEST LEARNING MODEL TO MOVEMENT DEVICE (AUTOMOBILE)
END

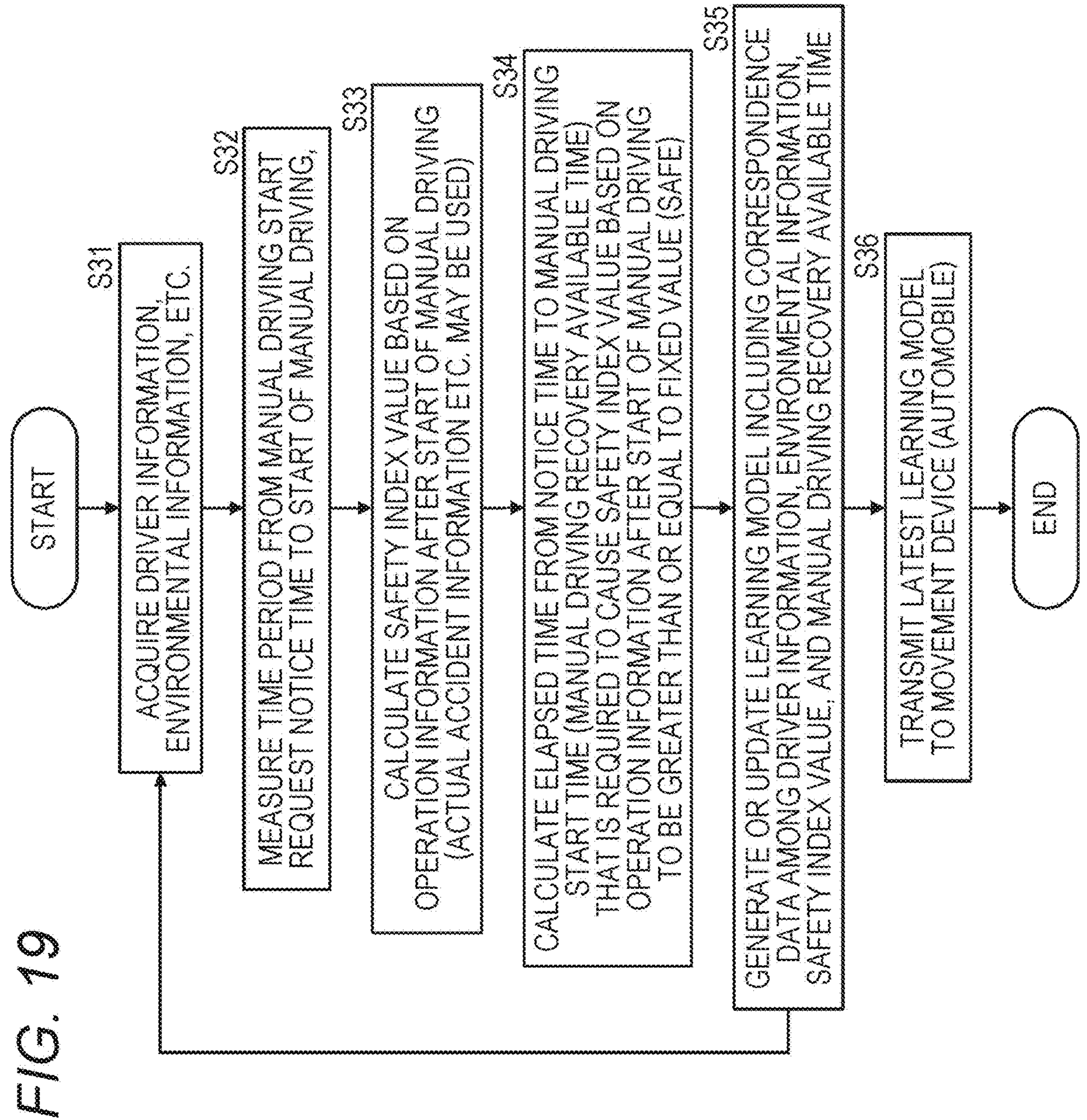
FIG. 19
START
S31
ACQUIRE DRIVER INFORMATION, ENVIRONMENTAL INFORMATION, ETC.
S32
MEASURE TIME PERIOD FROM MANUAL DRIVING START REQUEST NOTICE TIME TO START OF MANUAL DRIVING,
S33
CALCULATE SAFETY INDEX VALUE BASED ON OPERATION INFORMATION AFTER START OF MANUAL DRIVING (ACTUAL ACCIDENT INFORMATION ETC. MAY BE USED)
S34
CALCULATE ELAPSED TIME FROM NOTICE TIME TO MANUAL DRIVING START TIME (MANUAL DRIVING RECOVERY AVAILABLE TIME) THAT IS REQUIRED TO CAUSE SAFETY INDEX VALUE BASED ON OPERATION INFORMATION AFTER START OF MANUAL DRIVING TO BE GREATER THAN OR EQUAL TO FIXED VALUE (SAFE)
S35
GENERATE OR UPDATE LEARNING MODEL INCLUDING CORRESPONDENCE DATA AMONG DRIVER INFORMATION, ENVIRONMENTAL INFORMATION, SAFETY INDEX VALUE, AND MANUAL DRIVING RECOVERY AVAILABLE TIME
S36
TRANSMIT LATEST LEARNING MODEL TO MOVEMENT DEVICE (AUTOMOBILE)
END

FIG. 20

| | DRIVER INFORMATION PARAMETER (Pd1, Pd2, ･･･Pdn) | ENVIRONMENTAL INFORMATION PARAMETER (Pc1, Pc2, ･･･Pcm) | SAFETY INDEX VALUE (0 (DANGEROUS) TO 1 (SAFE)) | MANUAL DRIVING RECOVERY AVAILABLE TIME ESTIMATION VALUE |
|---|---|---|---|---|
| (1) | (Pd1,Pd2,...Pdn)= (0.9,1.2,2.2･･) | (Pc1,Pc2,...Pcn)= (3.5,4.2,1.0･･) | 0 | 120sec |
| (2) | (Pd1,Pd2,...Pdn)= (0.9,1.3,2.1･･) | (Pc1,Pc2,...Pcn)= (3.4,4.1,0.9･･) | 0 | 120sec |
| (3) | (Pd1,Pd2,...Pdn)= (1.0,1.1,2.1･･) | (Pc1,Pc2,...Pcn)= (3.4,4.1,1.0･･) | 0. 1 | 100sec |
| (4) | (Pd1,Pd2,...Pdn)= (0.8,1.1,2.1･･) | (Pc1,Pc2,...Pcn)= (3.3,4.0,0.9･･) | 0. 2 | 90sec |
| | : | : | : | : |
| (kkk-1) | (Pd1,Pd2,...Pdn)= (2.1,1.5,2.8･･) | (Pc1,Pc2,...Pcn)= (3.1,3.8,0.5･･) | 0. 9 | 40sec |
| (kkk) | (Pd1,Pd2,...Pdn)= (02.2,1.7,2.9･･) | (Pc1,Pc2,...Pcn)= (3.0,3.7,0.3･･) | 1. 0 | 30sec |

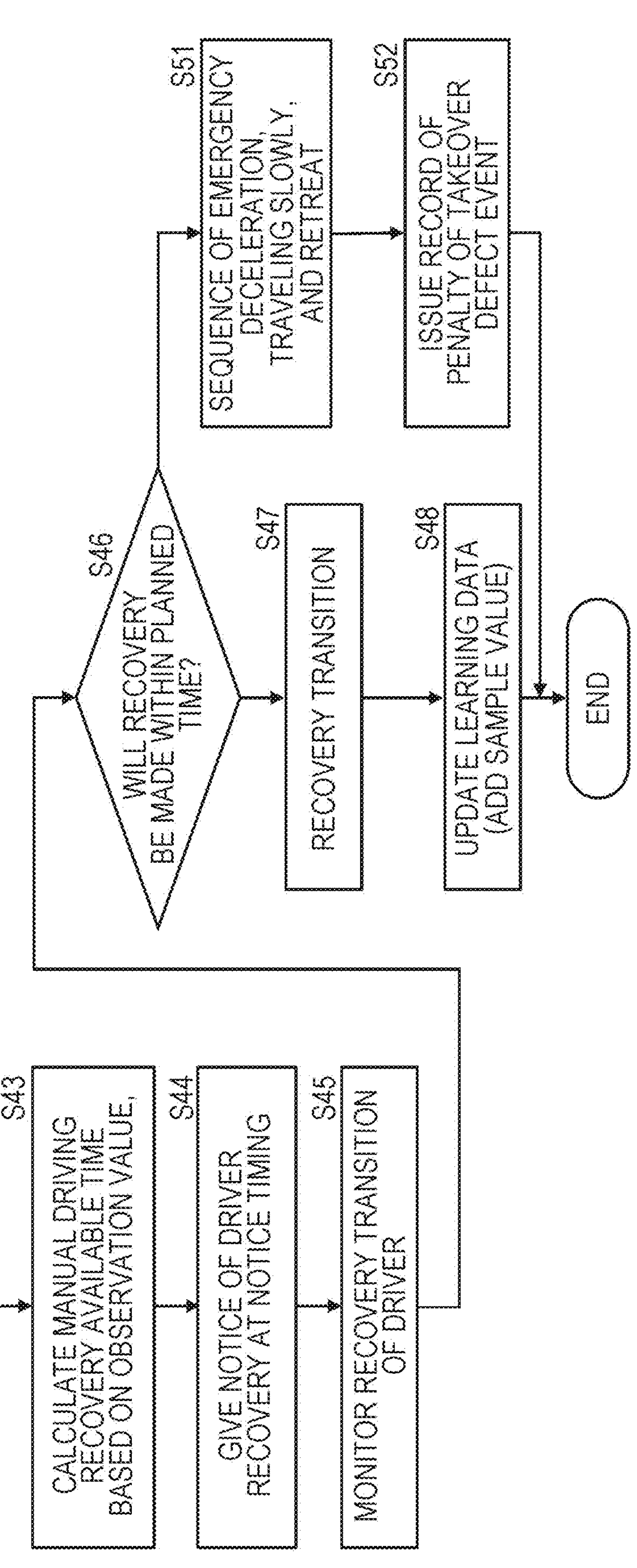
FIG. 21
START
S41
OBSERVE MANUAL DRIVING RECOVERY REQUEST EVENT
S42
ACQUIRE OBSERVATION VALUE
S43
CALCULATE MANUAL DRIVING RECOVERY AVAILABLE TIME BASED ON OBSERVATION VALUE,
S44
GIVE NOTICE OF DRIVER RECOVERY AT NOTICE TIMING
S45
MONITOR RECOVERY TRANSITION OF DRIVER
S46
WILL RECOVERY BE MADE WITHIN PLANNED TIME?
S47
RECOVERY TRANSITION
S48
UPDATE LEARNING DATA (ADD SAMPLE VALUE)
END
S51
SEQUENCE OF EMERGENCY DECELERATION, TRAVELING SLOWLY, AND RETREAT
S52
ISSUE RECORD OF PENALTY OF TAKEOVER DEFECT EVENT OBSERVATION PLOT OF OBSERVABLE EVALUATION VALUE AND RECOVERY DELAY TIME
RECOVERY DELAY TIME
c
OBSERVABLE EVALUATION VALUE
HIGH
LOW RECOVERY DELAY TIME
t1
15
10
5
0
0.95
a
b
1.2
1
0.8
0.6
0.4
0.2
0
RECOVERY SUCCESS RATE

FIG. 24

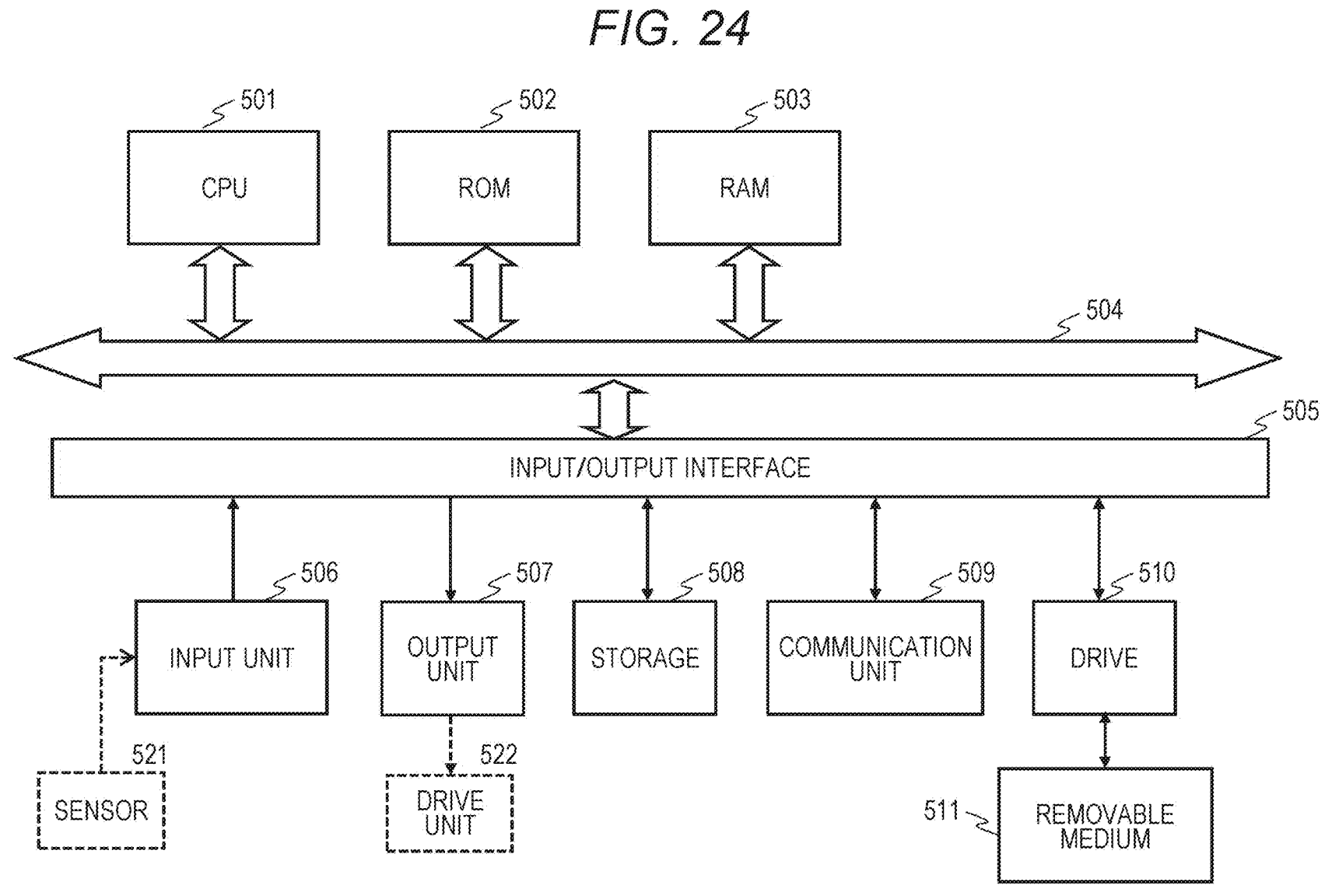

501 CPU
502 ROM
503 RAM
504
505 INPUT/OUTPUT INTERFACE
506 INPUT UNIT
507 OUTPUT UNIT
508 STORAGE
509 COMMUNICATION UNIT
510 DRIVE
511 REMOVABLE MEDIUM
521 SENSOR
522 DRIVE UNIT

INFORMATION PROCESSING DEVICE AND MOVEMENT DEVICE TO PERFORM SAFE MANUAL DRIVING BASED ON DRIVER AND ENVIRONMENTAL DATA

CROSS REFERENCE TO RELATED APPLICATIONS

This application is a continuation of U.S. Ser. No. 16/964,189 filed Jul. 22, 2020; which is a U.S. National Phase of International Patent Application No. PCT/JP2019/003030 filed Jan. 29, 2019, which claims priority benefit of Japanese Patent Application No. JP 2018-018360 filed in the Japan Patent Office Feb. 5, 2018. Each of the above-referenced applications is hereby incorporated herein by reference in its entirety.

TECHNICAL FIELD

The present disclosure relates to an information processing device, a movement device, and a method, and a program. More specifically, the present disclosure relates to an information processing device, a movement device, and a method, and a program for performing control to switch automatic driving and manual driving.

BACKGROUND ART

In recent years, a technology relating to automatic driving has been actively developed.

An automatic driving technology is a technology that enables automatic traveling on roads by using a variety of sensors, such as position detection means, that are provided in a vehicle (an automobile), and it is predicted that the automatic driving technology will rapidly spread in the future.

However, in the present situation, automatic driving is in a development stage, it is considered that it will take time to enable 100% automatic driving, and it is predicted that, for a while, traveling will be performed while automatic driving and manual driving performed by a driver are appropriately switched.

For example, it is predicted that modes will need to be switched in such a way that traveling is performed in an automatic driving mode on linear roads having a sufficient road width, such as expressways, and in a case where a vehicle leaves an expressway and is parked in a desired position in a parking lot, or on mountain paths or the like that have a narrow road width, switching to a manual driving mode is performed, and traveling is performed according to an operation performed by a driver.

While a vehicle is performing automatic driving, a driver does not need to direct a line-of-sight in a forward direction that is a vehicle traveling direction, and has freedom of action such as dozing, watching television, reading a book, or sitting to face backward and talking with a person sitting on a rear seat, for example.

In a vehicle that is traveling while automatic driving and manual driving are switched, in a case where there is a need for switching from the automatic driving mode to the manual driving mode, a driver needs to be caused to start manual driving.

However, for example, during the performance of automatic driving, if the driver dozes, a degree of awakening of the driver deteriorates. Stated another way, a level of consciousness has deteriorated. If switching is performed to the manual driving mode in a state of a reduced degree of awakening, as described above, normal manual driving fails to be performed, and in the worst case, there is a possibility of the occurrence of an accident.

In order to secure the safety of driving, manual driving needs to be caused to be started in a state where a driver has a high degree of awakening, and in other words, in a state where the driver is very conscious.

For this purpose, a degree of awakening of the driver needs to be checked.

An example of a prior art that discloses a technology for checking a degree of awakening of a driver is Patent Document 1 (Japanese Patent No. 4980988). This document discloses a configuration in which a state of a deterioration in attention of a driver is estimated by using face information or biological information, such as a line-of-sight or a pupil diameter, of the driver.

However, prior arts including this Patent Document 1 do not disclose a configuration in which a notice timing required for safe recovery from automatic driving to manual driving is controlled.

In a case where there is a need for switching from the automatic driving mode to the manual driving mode, notice needs to be given to cause a driver to start manual driving. If this notice timing is too late, manual driving is caused to be started in a state where the driver has a low degree of awakening, and in other words, in a state where a level of consciousness has deteriorated, and there is a problem of an increase in a probability of the occurrence of an accident.

CITATION LIST

Patent Document

Patent Document 1: Japanese Patent No. 4980988

SUMMARY OF THE INVENTION

Problems to be Solved by the Invention

The present disclosure has been made, for example, in view of the program described above, and it is an object of the present disclosure to provide an information processing device, a movement device, and a method, and a program that enable switching from automatic driving to manual driving to be safely performed.

Solutions to Problems

A first aspect of the present disclosure is:

an information processing device including a safety determination unit that receives, as an input, driver information and environmental information, and calculates a safety index value indicating whether or not a driver in a vehicle during automatic driving is in a state of being able to perform safe manual driving.

Moreover, a second aspect of the present disclosure is:

a movement device including:

a driver information acquisition unit that acquires driver information of the movement device;

an environmental information acquisition unit that acquires environmental information of the movement device; and a safety determination unit that receives, as an input, the driver information and the environmental information, and calculates a safety index value indicating whether or not a driver in the movement device during automatic driving is in a state of being able to perform safe manual driving.

Moreover, a third aspect of the present disclosure is:

an information processing method performed by an information processing device, the information processing method including:

a safety determination unit receiving, as an input, driver information and environmental information, and performing processing for calculating a safety index value indicating whether or not a driver in a vehicle during automatic driving is in a state of being able to perform safe manual driving.

Moreover, a fourth aspect of the present disclosure is:

an information processing method performed by a movement device, the information processing method including:

a driver information acquisition step of a driver information acquisition unit acquiring driver information of the movement device;

an environmental information acquisition step of an environmental information acquisition unit acquiring environmental information of the movement device; and a safety determination step of a safety determination unit receiving, as an input, the driver information and the environmental information, and calculating a safety index value indicating whether or not a driver in the movement device during automatic driving is in a state of being able to perform safe manual driving.

Moreover, a fifth aspect of the present disclosure is:

a program that causes an information processing device to perform information processing, the information processing including:

a safety determination unit receiving, as an input, driver information and environmental information, and calculating a safety index value indicating whether or not a driver in a vehicle during automatic driving is in a state of being able to perform safe manual driving.

Note that the program according to the present disclosure is, for example, a program that can be provided to an information processing device or a computer system that can execute a variety of program codes by a storage medium or a communication medium that provides the program in a computer-readable form. By providing such a program in the computer-readable form, processing according to the program is performed on the information processing device or the computer system.

Yet other objects, features, or advantages of the present disclosure will be clarified by a more detailed description based on the examples described later of the present disclosure or the attached drawings. Note that the system described herein is a configuration including a logical set of a plurality of devices, and does not always include devices having respective configurations in the same housing.

Effects of the Invention

By employing a configuration in one example of the present disclosure, a configuration is achieved in which driver information and environmental information are input and a safety index value indicating whether or not a driver who is performing automatic driving is in a state of being able to perform safe manual driving or a manual driving recovery available time is estimated.

Specifically, for example, the configuration includes: a driver information acquisition unit that acquires driver information of a movement device such as an automobile; an environmental information acquisition unit that acquires environmental information of the movement device; and a safety determination unit that receives, as an input, the driver information and the environmental information, and learns and calculates a safety index value indicating whether or not a driver in the movement device during automatic driving is in a state of being able to perform safe manual driving. The safety determination unit further estimates a manual driving recovery available time including a time required until the driver in the movement device during the automatic driving becomes able to start the safe manual driving.

By employing this configuration, a configuration is achieved in which driver information and environmental information are input and a safety index value indicating whether or not a driver who is performing automatic driving is in a state of being able to perform safe manual driving or a manual driving recovery available time is estimated.

Note that effects described herein are only illustrative and are not restrictive, and additional effects may be exhibited.

BRIEF DESCRIPTION OF DRAWINGS

FIG. 4 is a diagram explaining a configuration example of the movement device according to the present disclosure.

FIG. 8 is a diagram illustrating a flowchart explaining one example of an operation sequence of automatic driving.

FIG. 14 is a diagram illustrating one example of a state where a driver is performing a secondary task by actually using a tablet.

FIG. 15 is a diagram illustrating a state where a cautious traveling section Sd is newly generated in a second section and a warning is issued to a driver by conducting a flashing display.

FIG. 17 is a diagram explaining a specific configuration example and processing of a safety determination unit.

FIG. 18 is a diagram illustrating a flowchart explaining a sequence example of learning processing.

FIG. 19 is a diagram illustrating a flowchart explaining a sequence example of learning processing.

FIG. 20 is a diagram explaining a configuration example of learning device input/output data.

FIG. 21 is a diagram illustrating a flowchart explaining one example of a sequence of processing that is performed at the time of switching from the automatic driving mode to the manual driving mode.

FIG. 24 is a diagram explaining a hardware configuration example of an information processing device.

MODE FOR CARRYING OUT THE INVENTION

Figure 1:
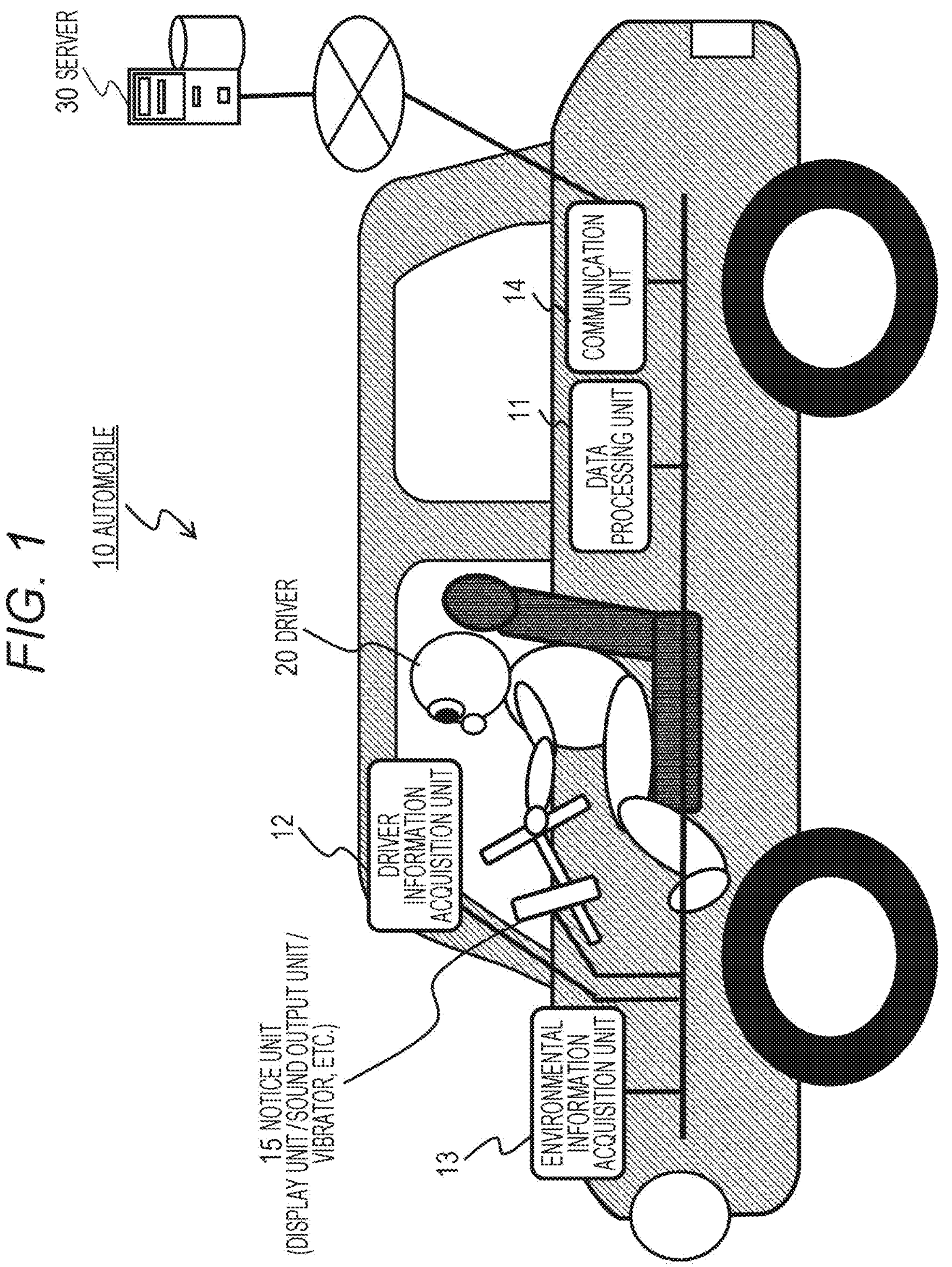
FIG. 1 is a diagram explaining one configuration example of a movement device according to the present disclosure.

Details of an information processing device, a movement device, and a method, and a program according to the present disclosure are described below with reference to the drawings. Note that description is provided according to the items described below.

1. Outline of configurations and processing of movement device and information processing device
2. Specific configuration and processing example of movement device
3. Sequence of mode switching from automatic driving mode to manual driving mode
4. Operation sequence example of automatic driving
5. Safety determination processing and manual driving recovery available time estimation processing that are performed by movement device
6. Sequence of processing performed by movement device and information processing device according to the present disclosure
7. Configuration example of information processing device
8. Summary of configuration according to the present disclosure

1. Outline of Configurations and Processing of Movement Device and Information Processing Device First, the outline of configurations and processing of a movement device and an information processing device is described with reference to FIG. 1 and the drawings that follow.

A movement device according to the present disclosure is, for example, an automobile that is capable of traveling while switching automatic driving and manual driving.

In such an automobile, in a case where there is a need for switching from an automatic driving mode to a manual driving mode, a driver needs to be caused to start manual driving.

However, various types of processing (secondary tasks) are performed by a driver during the performance of automatic driving.

For example, a simple release of hands from a steering wheel includes a case where a driver is gazing at the front of an automobile, similarly to the time of driving, a case where the driver is reading a book, or a case where the driver is dozing.

A degree of awakening (a level of consciousness) of the driver changes due to a difference among these pieces of processing.

For example, if a driver dozes, a degree of awakening of the driver deteriorates. Stated another way, a level of consciousness has deteriorated. In a state where a degree of awakening has deteriorated, as described above, normal manual driving fails to be performed. If switching to the manual driving mode is performed in this state, in the worst case, there is a possibility of the occurrence of an accident.

In order to secure the safety of driving, manual driving needs to be caused to be started in a state where a driver has a high degree of awakening, and in other words, in a state where the driver is very conscious.

For this purpose, a notice timing at which a request to switch from automatic driving to manual driving is issued needs to be changed according to a degree of awakening of a driver during the performance of automatic driving.

For example, in a case where a driver faces forward and is viewing a road during the performance of automatic driving, the driver has a high degree of awakening, and in other words, the driver can start manual driving at any time.

In such a case, it is sufficient if notice of switching to manual driving is given at a timing just before the time when manual driving is required. This is because a driver can immediately start safe manual driving.

However, in a case where a driver is dozing during the performance of automatic driving, the driver has an extremely low degree of awakening.

In such a case, if notice of switching to manual driving is given at a timing just before the time when manual driving is required, the driver has to start manual driving in an unconscious state. This results in an increase in a probability of the occurrence of an accident. Accordingly, in the case of a low degree of awakening, as described above, notice of switching to manual driving needs to be given in an earlier stage.

A movement device according to the present disclosure or an information processing device that can be mounted in the movement device controls a timing of notice of switching to manual driving, for example, in accordance with a degree of awakening of a driver.

Moreover, in one example of the present disclosure, an optimum timing of notice of switching to manual driving is calculated by using information such as the traveling time of a movement device, driver operation information, environmental information of roads or the like, or information relating to an accident that has occurred in the past, in addition to driver information such as a degree of awakening.

For example, in one example of the present disclosure, learning processing is performed to calculate a degree of awakening by using each of the pieces of information described above, namely, information such as the traveling time of a movement device, driver operation information, environmental information of roads or the like, or information relating to an accident that has occurred in the past, and an optimum notice timing is calculated as a result of the learning processing.

Note that the learning processing can be performed in an automobile serving as the movement device, or may be performed in a server that is communicable with the automobile serving as the movement device.

Furthermore, in one example of the present disclosure, in the notice timing calculation processing described above, processing is performed in consideration of information relating to an individual driver, namely, a driving history, an accident history, driving operation information after the start of manual driving of the driver, and moreover, information relating to the type of an automobile, and the like.

Moreover, the number of occupants or information relating to loaded freight is also used.

Note that, in a case where many types of information are used, the many types of information can be used in a state where the many types of information have been classified into information for advance learning and information for online learning in accordance with data characteristics.

Configurations and processing of a movement device according to the present disclosure and an information processing device that can be mounted in the movement device are described with reference to FIG. 1 and the drawings that follow.

FIG. 1 is a diagram illustrating one configuration example of an automobile 10 serving as one example of the movement device according to the present disclosure.

An information processing device according to the present disclosure is attached to the automobile 10 illustrated in FIG. 1.

The automobile 10 illustrated in FIG. 1 is an automobile that can be driven in two driving modes, a manual driving mode and an automatic driving mode.

In the manual driving mode, traveling is performed on the basis of an operation performed by a driver 20, namely, an operation performed on a steering wheel or an operation performed on an accelerator, a brake, or the like.

In contrast, in the automatic driving mode, the driver 20 does not need to perform an operation, and driving is performed on the basis of sensor information from, for example, a position sensor, another peripheral information detection sensor, or the like.

The position sensor is, for example, a GPS receiver or the like, and the peripheral information detection sensor is, for example, a camera, an ultrasonic sensor, a radar, a light detection and ranging or laser imaging detection and ranging (LiDAR), a sonar, or the like.

Note that FIG. 1 is a diagram explaining the outline of the present disclosure, and schematically illustrates principal components. A detailed configuration is described later.

As illustrated in FIG. 1, the automobile 10 includes a data processing unit 11, a driver information acquisition unit 12, an environmental information acquisition unit 13, a communication unit 14, and a notice unit 15.

The driver information acquisition unit 12 acquires, for example, information for determining a degree of awakening of a driver, driver operation information, or the like. Specifically, the driver information acquisition unit 12 includes, for example, a camera that captures a face image of a driver, an operation information acquisition unit of each operation unit (such as a steering wheel, an accelerator, or a brake), or the like.

The environmental information acquisition unit 13 acquires traveling environmental information of the automobile 10. Examples include image information of front, rear, left-hand, and right-hand sides of the automobile, position information from the GPS, information relating to surrounding obstacles from a light detection and ranging or laser imaging detection and ranging (LiDAR), a sonar, or the like, and the like.

The data processing unit 11 receives, as an input, driver information acquired by the driver information acquisition unit 12 or environmental information acquired by the environmental information acquisition unit 13, and calculates a safety index value indicating whether or not a driver in a vehicle during automatic driving can perform safe manual driving, whether or not a driver during manual driving is performing safe driving, and the like.

Moreover, for example, in a case where there is a need for switching from the automatic driving mode to the manual driving mode, processing for giving notice via the notice unit 15 is performed in such a way that switching to the manual driving mode is performed.

It is assumed that a timing of this notice processing is an optimum timing calculated, for example, by inputting the driver information acquisition unit 12 and the environmental information acquisition unit 13.

Stated another way, it is assumed that a timing is used at which the driver 20 can start safe manual driving.

Specifically, in a case where a driver has a high degree of awakening, notice is given just before a manual driving start time, for example, five seconds before. In a case where the driver has a low degree of awakening, processing is performed with time to spare, for example, in such a way that notice is given 20 seconds before the manual driving start time. Specific calculation of an optimum notice timing is described later.

Figure 2:
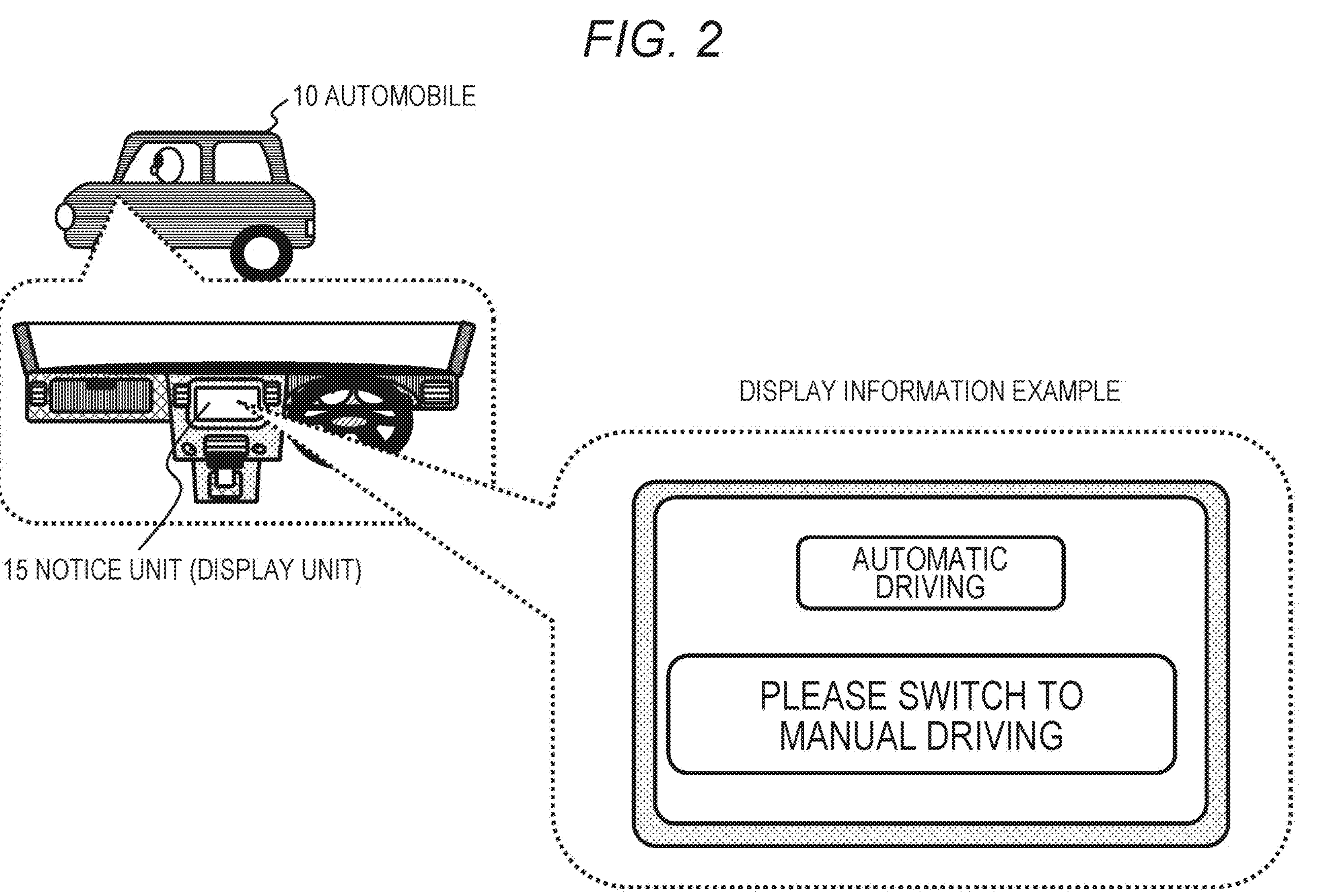
FIG. 2 is a diagram explaining one example of data displayed on a display unit of the movement device according to the present disclosure.

The notice unit 15 includes a display unit, a sound output unit, or a vibrator of a steering wheel or a seat that gives this notice, An example of a warning display conducted on the display unit that configures the notice unit 15 is illustrated in FIG. 2.

As illustrated in FIG. 2, respective displays described below are conducted on a display unit 30.

Driving mode information="AUTOMATIC DRIVING",

Warning display="PLEASE SWITCH TO MANUAL DRIVING".

In an area where the driving mode information is displayed, "AUTOMATIC DRIVING" is displayed during the performance of the automatic driving mode, and "MANUAL DRIVING" is displayed during the performance of the manual driving mode.

In an area where warning display information is displayed, is a display area where the display described below is conducted while automatic driving is performed in the automatic driving mode.

"PLEASE SWITCH TO MANUAL DRIVING"

Note that, as illustrated in FIG. 1, the automobile 10 has a configuration that is communicable with a server 30 via the communication unit 14.

For example, part of processing performed by the data processing unit 11 for calculating a proper time for the output of notice and specifically, learning processing can be performed in the server 30.

A specific example of this is described later.

Figure 3A:
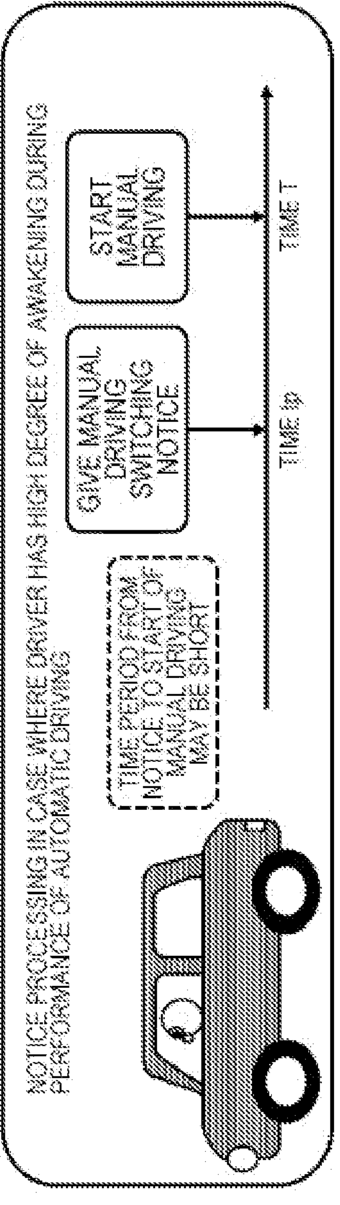
FIG. 3A is a diagram explaining processing performed by the movement device according to the present disclosure, more specifically, illustrating an example of setting a proper timing of notice requesting switching to manual driving during the performance of automatic driving in the automatic driving mode in a case where a driver has a high degree of awakening during the performance of automatic driving.

FIG. 3A is a diagram illustrating an example of setting a proper timing of notice requesting switching to manual driving during the performance of automatic driving in the automatic driving mode, and illustrates an example of notice processing.

in a case where a driver has a high degree of awakening during the performance of automatic driving.

Figure 3B:
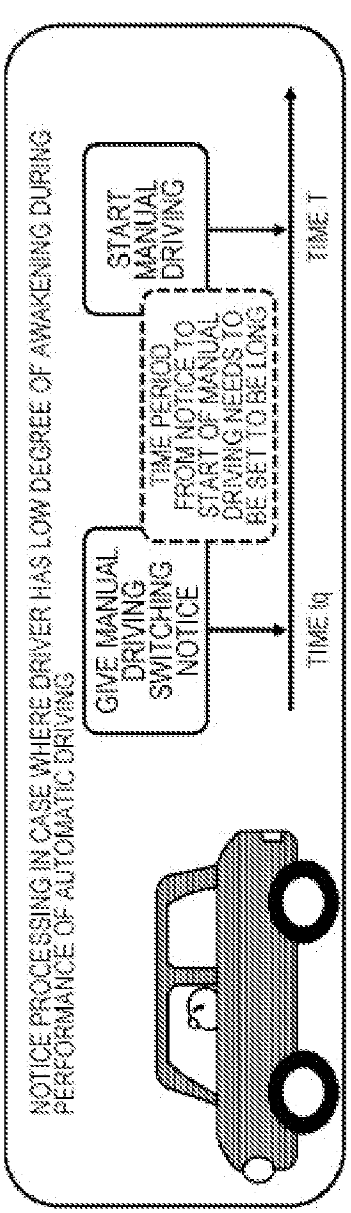
FIG. 3B is a diagram explaining processing performed by the movement device according to the present disclosure, more specifically, illustrating an example of setting a proper timing of notice requesting switching to manual driving during the performance of automatic driving in the automatic driving mode in a case where a driver has a low degree of awakening during the performance of automatic driving.

FIG. 3B is a diagram illustrating an example of setting a proper timing of notice requesting switching to manual driving during the performance of automatic driving in the automatic driving mode, and illustrates an example of Notice processing in a case where a driver has a low degree of awakening during the performance of automatic driving FIG. 3A is an example where, during the performance of automatic driving, a driver faces forward and is viewing a road. In this case, the driver has a high degree of awakening, and in other words, the driver can start manual driving at any time.

In such a case, even if notice of switching to manual driving is given at a timing just before the time when manual driving is required, a driver can immediately start safe manual driving.

FIG. 3B is a case where a driver is dozing during the performance of automatic driving, the drive has an extremely low degree of awakening.

In such a case, if notice of switching to manual driving is given at a timing just before the time when manual driving is required, a driver starts manual driving in an unconscious state, and there is a high probability of the occurrence of an accident. Accordingly, in a case where a degree of awakening is low, as described above, notice of switching to manual driving needs to be given in an earlier stage.

2. Specific Configuration and Processing Example of Movement Device

Next, a specific configuration and processing example of the movement device 10 according to the present disclosure are described with reference to FIG. 4 and the drawings that follow.

FIG. 4 illustrates a configuration example of a movement device 100. Note that, hereinafter, in a case where a vehicle that is provided with the movement device 100 is distinguished from another vehicle, the vehicle that is provided with the movement device 100 is referred to as the local car or the local vehicle.

The movement device 100 includes an input unit 101, a data acquisition unit 102, a communication unit 103, an in-vehicle device 104, an output controller 105, an output unit 106, a drive system controller 107, a drive-system system 108, a body system controller 109, a body-system 110, a storage 111, and an automatic driving controller 112.

The input unit 101, the data acquisition unit 102, the communication unit 103, the output controller 105, the drive system controller 107, the body system controller 109, the storage 111, and the automatic driving controller 112 are mutually connected via a communication network 121. The communication network 121 includes, for example, an on-vehicle communication network conforming to an arbitrary standard, such as a controller area network (CAN), a local interconnect network (LIN), a local area network (LAN), or FlexRay (registered trademark), a bus, or the like. Note that, in some cases, respective units of the movement device 100 are directly connected without the communication network 121.

Note that, hereinafter, in a case where the respective units of the movement device 100 perform communication via the communication network 121, the description of the communication network 121 is omitted. For example, in a case where the input unit 101 and the automatic driving controller 112 perform communication via the communication network 121, it is simply described that the input unit 101 and the automatic driving controller 112 perform communication.

The input unit 101 includes a device that a passenger uses to input various types of data, instructions, or the like. For example, the input unit 101 includes an operation device such as a touch panel, a button, a microphone, a switch, or a lever, an operation device on which an input operation can be performed by using a method other than a manual operation, such as sound or a gesture, and the like. Furthermore, for example, the input unit 101 may be a remote control device that uses infrared rays or other radio waves, or an external connection device, such as a mobile device or a wearable device, that corresponds to an operation of the movement device 100. The input unit 101 generates an input signal on the basis of data, an instruction, or the like that has been input by a passenger, and supplies the input signal to the respective units of the movement device 100.

The data acquisition unit 102 includes a variety of sensors or the like that acquire data to be used in processing performed by the movement device 100, and supplies the acquired data to the respective units of the movement device 100.

For example, the data acquisition unit 102 includes a variety of sensors that detect a state of the local car, or the like. Specifically, for example, the data acquisition unit 102 includes a gyro sensor, an acceleration sensor, an inertial measurement unit (IMU), a sensor that detects an amount of an operation performed on an accelerator pedal, an amount of an operation performed on a brake pedal, a steering angle of a steering wheel, engine speed, the rotational speed of a motor, the rotational speed of a wheel, or the like, and the like.

Furthermore, for example, the data acquisition unit 102 includes a variety of sensors that detect information relating to the outside of the local car. Specifically, for example, the data acquisition unit 102 includes an imaging device such as a time-of-flight (ToF) camera, a stereo camera, a monocular camera, an infrared camera, or another camera. Furthermore, for example, the data acquisition unit 102 includes an environment sensor that detects weather, meteorological phenomena, or the like, and a peripheral information detection sensor that detects an object around the local car. The environment sensor includes, for example, a raindrop sensor, a fog sensor, a sunshine sensor, a snow sensor, or the like. The peripheral information detection sensor includes, for example, an ultrasonic sensor, a radar, a light detection and ranging or laser imaging detection and ranging (LiDAR), a sonar, or the like.

Figure 5:
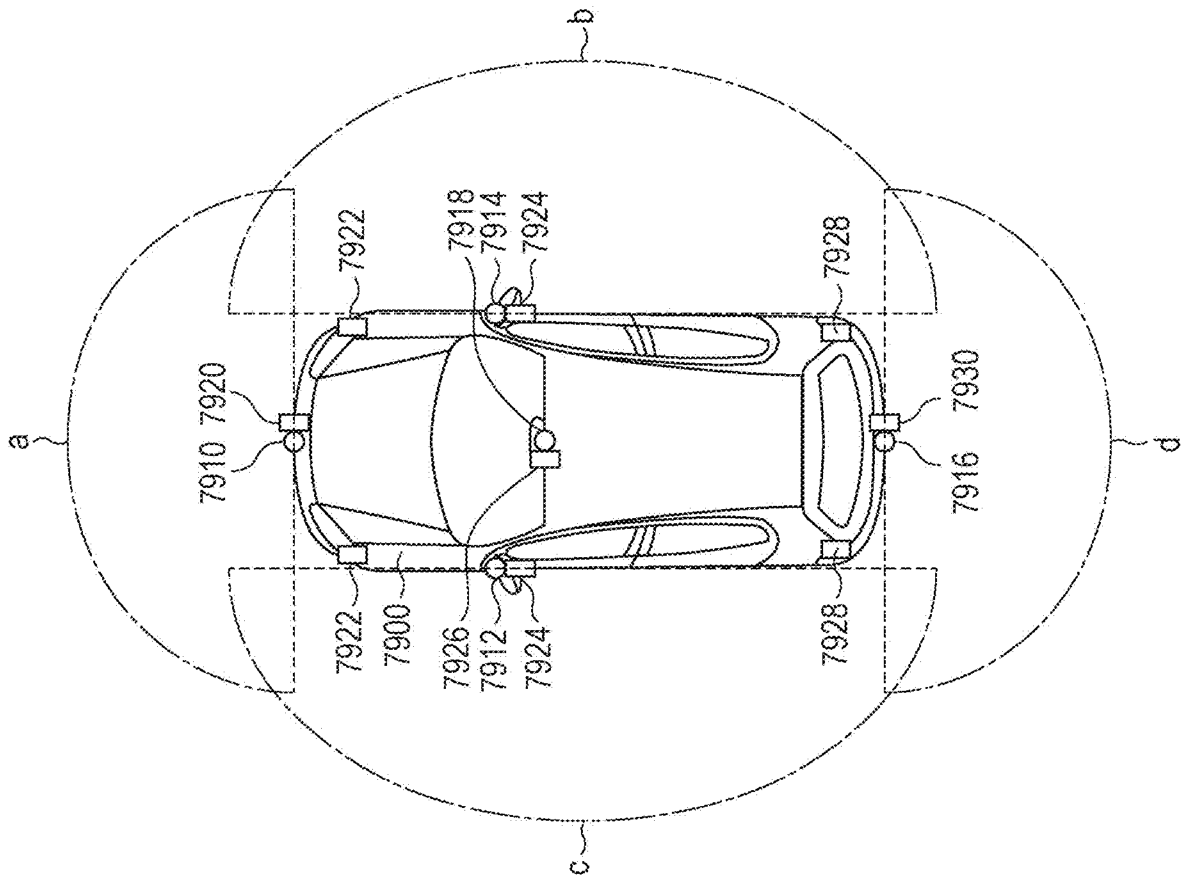
FIG. 5 is a diagram explaining a configuration example of the movement device according to the present disclosure.

For example, FIG. 5 illustrates an installation example of a variety of sensors that detect information relating to the outside of the local car. Imaging devices 7910, 7912, 7914, 7916, and 7918 are provided, for example, in at least one position of a front nose, a side-view mirror, a rear bumper, a back door, or an upper portion of a windshield in a vehicle cabin of a vehicle 7900.

The imaging device 7910 included in the front nose and the imaging device 7918 included in the upper portion of the windshield in the vehicle cabin principally acquire an image of a front side of the vehicle 7900. The imaging devices 7912 and 7914 included in the side-view mirrors principally acquire images of sides of the vehicle 7900. The imaging device 7916 included in the rear bumper or the back door principally acquires an image of a rear side of the vehicle 7900. The imaging device 7918 included in the upper portion of the windshield in the vehicle cabin is principally used to detect a preceding vehicle, or a pedestrian, an obstacle, a traffic light, a traffic sign, a traffic lane, or the like. Furthermore, in the future, in automatic driving, when a vehicle turns right or left, usage may be extended to a pedestrian crossing a road after a right or left turn within a wider range, and further a range of an object approaching a crosswalk.

Note that FIG. 5 illustrates one example of an image capturing range of each of the imaging devices 7910, 7912, 7914, and 7916. An imaging range a indicates an imaging range of the imaging device 7910 provided in the front nose, imaging ranges b and c respectively indicate imaging ranges of the imaging devices 7912 and 7914 provided in the side-view mirrors, and an imaging range d indicates an imaging range of the imaging device 7916 provided in the rear bumper or the back door. For example, an overhead image in which the vehicle 7900 is viewed from the above, an entire-circumference stereoscopic display image in which a vehicle periphery is surrounded by a curved plane, and the like are acquired by superimposing pieces of image data that have been captured by the imaging devices 7910, 7912, 7914, and 7916 onto each other.

Sensors 7920, 7922, 7924, 7926, 7928, and 7930 that are provided in a front portion, a rear portion, sides, corners, and the upper portion of the windshield in the vehicle cabin of the vehicle 7900 may be, for example, ultrasonic sensors or radars. The sensors 7920, 7926, and 7930 that are provided in the front nose, the rear bumper, the back door, and the upper portion of the windshield in the vehicle cabin of the vehicle 7900 may be, for example, LiDARs. These sensors 7920 to 7930 are principally used to detect a preceding vehicle, a pedestrian, an obstacle, or the like. These detection results may be further employed to improve a display of a stereoscopic object in the overhead display or the entire-circumference stereoscopic display that are described above.

Return to FIG. 4. The description of respective components is continued. The data acquisition unit 102 includes a variety of sensors that detect a current position of the local car. Specifically, for example, the data acquisition unit 102 includes a global navigation satellite system (GNSS) receiver that receives a GNSS signal from a GNSS satellite, or the like.

Furthermore, for example, the data acquisition unit 102 includes a variety of sensors that detect in-vehicle information. Specifically, for example, the data acquisition unit 102 includes an imaging device that images a driver, a biosensor that detects biological information of the driver, a microphone that collects sound in a vehicle cabin, and the like. The biosensor is provided, for example, on a seat surface, a steering wheel, or the like, and detects a seating state of a passenger who is seated on a seat or biological information of a driver who is holding the steering wheel. As a biological signal, diversification observable data, such as the heart rate, the pulse rate, the blood flow, respiration, psychosomatic correlation, visual stimuli, brain waves, a perspiration condition, the posture and behavior of the head, eyes, gazing, blinking, a saccade, a microsaccade, fixation, drift, staring, or the pupillary reaction of the iris, can be used. These pieces of organism activity observable information reflecting an observable driving state are used by a safety determination unit 155 described later to calculate a recovery notice timing as intrinsic characteristics of a recovery delay case of a corresponding driver on the basis of a recovery delay time characteristic that has been summarized as an observable evaluation value estimated due to observation and has been linked to a log of the evaluation value.

Figure 6:
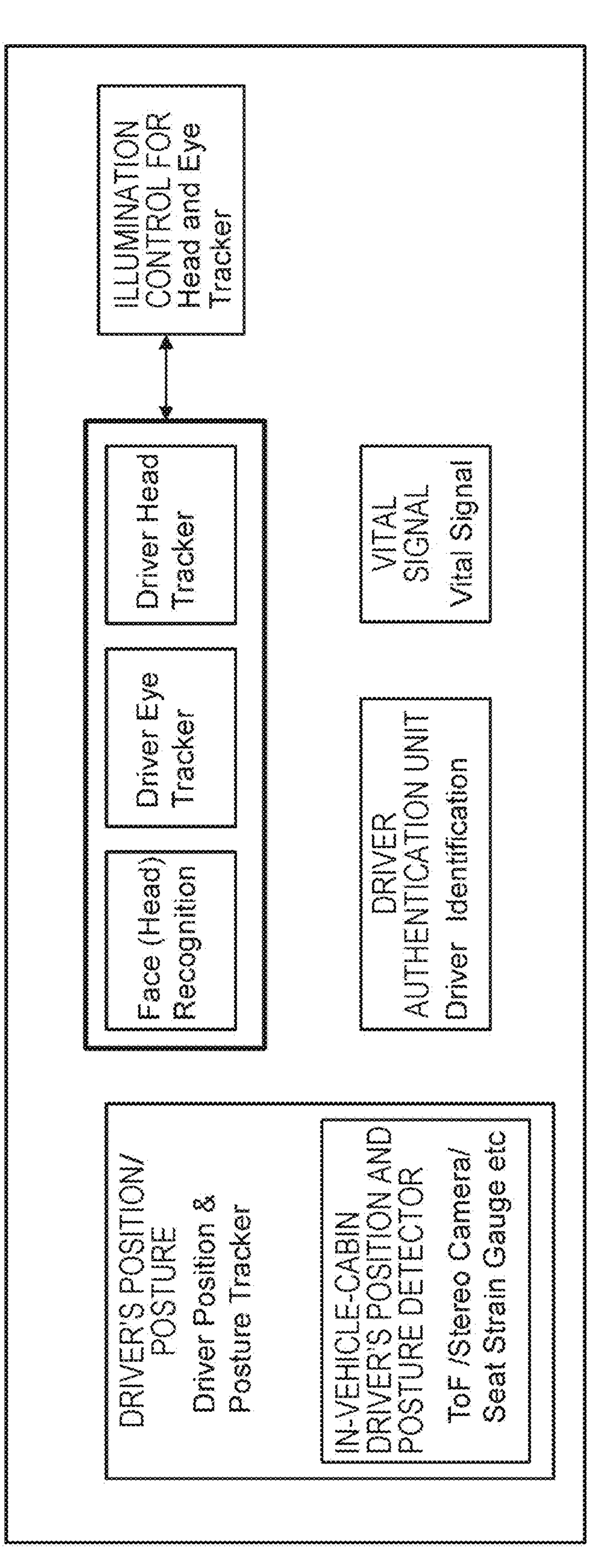
FIG. 6 is a diagram explaining a sensor configuration example of the movement device according to the present disclosure.

FIG. 6 illustrates examples of a variety of sensors that are included in the data acquisition unit 102 and acquire information relating to a driver in a vehicle. For example, the data acquisition unit 102 includes a ToF camera, a stereo camera, a seat strain gauge, or the like as a detector that detects the position or posture of a driver. Furthermore, the data acquisition unit 102 includes a face (head) recognition device, a driver eye tracker, a driver head tracker, or the like as a detector that acquires organism activity observable information of a driver.

Furthermore, the data acquisition unit 102 includes a vital signal detector as a detector that acquires the organism activity observable information of the driver. Furthermore, the data acquisition unit 102 includes a driver identification unit. Note that knowledge authentication using a password, a personal identification number, or the like and biometric authentication using a face, a fingerprint, the iris of the pupil, a voiceprint, or the like are also conceivable as an authentication method.

The communication unit 103 performs communication with the in-vehicle device 104, and a variety of outside-vehicle devices, a server, a base station, and the like, and transmits data supplied from respective units of the movement device 100 or supplies received data to the respective units of the movement device 100. Note that a communication protocol supported by the communication unit 103 is not particularly limited, and the communication unit 103 can also support plural types of communication protocols.

For example, the communication unit 103 performs wireless communication with the in-vehicle device 104 by using a wireless LAN, Bluetooth (registered trademark), near field communication (NFC), a wireless USB (WUSB), or the like. Furthermore, for example, the communication unit 103 performs wired communication with the in-vehicle device 104 via a not-illustrated connection terminal (and a cable if necessary), by using a universal serial bus (USB), a high-definition multimedia interface (HDMI) (registered trademark), a mobile high-definition link (MHL), or the like.

Moreover, for example, the communication unit 103 performs communication with equipment (for example, an application server or a control server) that is present on an external network (for example, the Internet, a cloud network, or a company-specific network) via the base station or an access point. Furthermore, for example, the communication unit 103 performs communication with a terminal that is present near the local car (for example, a terminal of a pedestrian or a store, or a machine type communication (MTC) terminal) by using a peer to peer (P2P) technology.

Moreover, for example, the communication unit 103 performs V2X communication such as vehicle to vehicle communication, vehicle to infrastructure communication, vehicle to home communication, or vehicle to pedestrian communication. Furthermore, for example, the communication unit 103 includes a beacon receiver, receives radio waves or electromagnetic waves that have been transmitted from a wireless station that is provided on a road, or the like, and acquires information relating to a current position, a traffic jam, traffic regulations, a required time, or the like. Note that pairing may be performed via the communication unit with a forward traveling vehicle that can be a leading vehicle and is traveling in a section, information acquired by a data acquisition unit mounted in a preceding vehicle may be acquired as information during advance traveling and may be used to complement data of the data acquisition unit 102 of the local car. In particular, in columnar traveling using the leading vehicle, or the like, means for further securing the safety of a succeeding line is achieved.

The in-vehicle device 104 includes, for example, a mobile device (a tablet, a smartphone, or the like) or a wearable device that is possessed by a passenger, an information device that is carried in or attacked to the local car, a navigation device that searches for a route to an arbitrary destination, and the like. Note that, if it is considered that an occupant is not always fixed to a seating fixed position due to the spreading of automatic driving, usage may be extended to equipment that can be used in a manner detachable from a video reproduction device, game equipment, or another vehicle installation in the future. In the present example, description is provided by using an example where information relating to a point at which driver's intervention is required is only presented to a corresponding driver. However, the information may be further provided to a succeeding vehicle in columnar traveling or the like, and moreover, usage in appropriate combination with remote traveling support may be achieved by constantly providing the information to an operation management center of passenger transport share-riding busses or long-distance distribution commercial vehicles.

The output controller 105 controls an output of various types of information to a passenger of the local car or the outside of the vehicle. For example, the output controller 105 controls an output of visual information (for example, image data) and auditory information (for example, sound data) from the output unit 106 by generating an output signal including at least one of the visual information or the auditory information and supplying the output signal to the output unit 106. Specifically, for example, the output controller 105 combines pieces of image data that have been captured by imaging devices that are different from each other in the data acquisition unit 102, generates an overhead image, a panoramic image, or the like, and supplies an output signal including the generated image to the output unit 106. Furthermore, for example, the output controller 105 generates sound data including warning sound, a warning message, or the like against danger such as collision, contact, or entry into a danger zone, and supplies, to the output unit 106, an output signal including the generated sound data.

The output unit 106 includes a device that can output the visual information or the auditory information to a passenger of the local car or the outside of the vehicle. For example, the output unit 106 includes a display device, an instrument panel, an audio speaker, a headphone, a wearable device, such as an eyeglasses type display, that a passenger wears, a projector, a lamp, or the like. The display device included in the output unit 106 may be a device including a normal display, or may be a device that displays auditory information in a field of view of a driver, such as a head-up display, a transmission type display, or a device having an augmented reality (AR) display function, for example.

The drive system controller 107 controls the drive-system system 108 by generating various control signals and supplying the various control signals to the drive-system system 108. Furthermore, the drive system controller 107 supplies a control signal to respective units other than the drive-system system 108, as needed, and gives notice or the like of a control state of the drive-system system 108.

The drive-system system 108 includes a variety of devices that relate to a drive system of the local car. For example, the drive-system system 108 includes a drive force generation device that generates a drive force, such as an internal combustion engine or a drive motor, a drive force transmission mechanism that transmits a drive force to wheels, a steering mechanism that adjusts a steering angle, a braking device that generates a braking force, an antilock brake system (ABS), an electronic stability control (ESC), an electric power steering device, and the like.

The body system controller 109 controls the body-system system 110 by generating various control signals and supplying the various control signals to the body-system system 110. Furthermore, the body system controller 109 supplies a control signal to respective units other than the body-system system 110, as needed, and gives notice or the like of a control state of the body-system system 110.

The body-system system 110 includes a variety of devices of a body system equipped in a vehicle body. For example, the body-system system 110 includes a keyless entry system, a smart key system, a power window device, a power seat, a steering wheel, an air conditioner, a variety of lamps (for example, a headlamp, a back lamp, a brake lamp, a turn signal, a fog lamp, and the like), or the like.

The storage 111 includes, for example, a read only memory (ROM), a random access memory (RAM), a magnetic storage device such as a hard disc drive (HDD), a semiconductor storage device, an optical storage device, a magneto-optical storage device, and the like. The storage 111 stores various programs, data, or the like that are used by the respective units of the movement device 100. For example, the storage 111 stores map data such as a three-dimensional high-precision map, e.g., a dynamic map, a global map that has a lower precision and covers a wider area than the high-precision map, or a local map including information relating to the surroundings of the local car.

The automatic driving controller 112 performs control relating to automatic driving such as autonomous traveling or driving support. Specifically, for example, the automatic driving controller 112 performs cooperative control aiming at implementing a function of an advanced driver assistance system (ADAS) including collision avoidance or impact mitigation of the local car, following traveling based on a distance between vehicles, vehicle speed maintaining traveling, collision warning of the local car, lane departure warning of the local car, or the like. Furthermore, for example, the automatic driving controller 112 performs cooperative control aiming at automatic driving or the like for autonomous traveling that is independent of an operation performed by a driver. The automatic driving controller 112 includes, a detection unit 131, a self-position estimation unit 132, a situation analyzer 133, a planning unit 134, and a motion controller 135.

The detection unit 131 detects various types of information required to control automatic driving. The detection unit 131 includes an outside-vehicle information detection unit 141, an in-vehicle information detection unit 142, and a vehicle state detection unit 143.

The outside-vehicle information detection unit 141 performs processing for detecting information relating to the outside of the local car on the basis of data or a signal from each of the units of the movement device 100. For example, the outside-vehicle information detection unit 141 performs processing for detecting an object around the local car, recognition processing, and tracking processing, and processing for detecting a distance to the object and a relative speed. Examples of an object to be detected include a vehicle, a person, an obstacle, a structure, a road, a traffic light, a traffic sign, a road sign, and the like.

Furthermore, for example, the outside-vehicle information detection unit 141 performs processing for detecting a surrounding environment of the local car. Examples of a surrounding environment to be detected include weather, air temperature, humidity, brightness, a road surface state, and the like. The outside-vehicle information detection unit 141 supplies data indicating a result of detection processing to the self-position estimation unit 132, a map analyzer 151, the traffic rule recognizer 152, and the situation recognizer 153 of the situation analyzer 133, an emergency avoidance unit 171 of the motion controller 135, and the like.

With respect to information that the outside-vehicle information detection unit 141 acquires, if a traveling section is a section for which a constantly updated local dynamic map has been intensively supplied from infrastructure as a section in which automatic driving traveling can be performed, information can be principally supplied from infrastructure. Alternatively, traveling may be performed in a state where information is constantly updated in advance from a vehicle or a vehicle group that is preceding and traveling in a corresponding section, prior to invasion into the section. Furthermore, for example, in a case where a local dynamic map is not constantly updated to the latest version by infrastructure or in other cases, in particular, in columnar traveling or the like, road environmental information acquired from a leading vehicle that has invaded a section may be further used complementarily in order to acquire road information just before a safer invasion section. In many cases, whether or not automatic driving can be performed in a section is determined according to the presence or absence of these pieces of advance information provided from infrastructure. Automatic driving availability information on a route that is provided from infrastructure roughly amounts to the provision of an invisible track as what is called "information". Note that, for convenience sake, the outside-vehicle information detection unit 141 is illustrated under the assumption that the outside-vehicle information detection unit 141 is mounted in the local vehicle. However, by using information acquired as "information" by the preceding vehicle, advance predictability during traveling may be further improved.

The in-vehicle information detection unit 142 performs processing for detecting in-vehicle information on the basis of data or a signal from each of the units of the movement device 100. For example, the in-vehicle information detection unit 142 performs processing for authenticating and recognizing a driver, processing for detecting the driver's state, processing for detecting a passenger, processing for detecting an in-vehicle environment, and the like. Examples of a driver's state to be detected include a physical condition, a degree of awakening, a degree of concentration, a degree of fatigue, a direction of a line-of-sight, a detailed eyeball behavior, and the like.

Moreover, it is expected that automatic driving will be used in the future in a state where a driver is completely separated from a driving steering task. The driver will temporarily doze or will start another task, and a system will need to grasp to what extent the awakening and recovery of consciousness required for recovery to driving has progressed. Stated another way, a conventionally proposed driver monitoring system principally includes detection means for monitoring a deterioration in consciousness such as drowsiness. However, in the future, a driver will not intervene at all in driving steering. Therefore, a system will not include means for directly observing a degree of intervention in driving of a driver on the basis of the steering stability of a steering device and the like, and will need to observe the transition of the recovery of consciousness required for driving from a state in which the driver's accurate consciousness state is unknown, grasp an accurate internal awakening state of the driver, and advance the intervention transfer of steering from automatic driving to manual driving.

Accordingly, the in-vehicle information detection unit 142 principally has a significant two-stage role. A first role is passive monitoring of a driver's state during automatic driving, and a second role is the acknowledgement, perception, and determination of the surroundings of the driver, and further the detection and determination of the operability of a steering device to a level at which manual driving can be performed after the issuance of a request for recovery from the system and before arrival at a cautious driving section. As control, failure self-diagnosis may be further performed on the entirety of a vehicle. In a case where an automatic driving function of the vehicle has deteriorated due to a failure in part of the automatic driving function, a driver may similarly be prompted to recover to manual driving early. Passive monitoring here refers to detection means that does not request a response reaction of consciousness from a driver, and detection means for emitting physical radio waves, light, or the like from a device and detecting a response signal is not excluded. Stated another way, monitoring of a state of a driver having no consciousness during a nap or the like is referred to, and a class that is not an acknowledgement response reaction of a driver is assumed to be a passive method. An active response device is not excluded that analyzes and evaluates reflection or a diffused signal that is caused by applying radio waves, infrared rays, or the like. In contrast, means for requesting a conscious response that requests a response reaction from a driver is active.

Examples of an in-vehicle environment to be detected include air temperature, humidity, brightness, an odor, and the like. The in-vehicle information detection unit 142 supplies data indicating a result of detection processing to the situation recognizer 153 of the situation analyzer 133 and the motion controller 135. Note that, in a case where it has been discovered that a driver will fail to achieve manual driving by an accurate deadline time after a system issues a driving recovery instruction to the driver and it has been determined that takeover will not been performed in time even if deceleration control is performed in a state where self-driving is maintained and time postponement is performed, an instruction is issued to the emergency avoidance unit 171 or the like of the system, and a deceleration and retreat/stop procedure is started in order to cause a vehicle to retreat. Stated another way, even in a situation of not making it in time as an initial state, an arrival time for arrival at a takeover limit can be gained by causing a vehicle to start deceleration early.

The vehicle state detection unit 143 performs processing for detecting a state of the local car on the basis of data or a signal from each of the units of the movement device 100. Examples of a state of the local car that serves as a target to be detected include speed, acceleration, a steering angle, the presence or absence and content of abnormality, a state of a driving operation, a position and an inclination of a power seat, a state of door lock, a state of another on-vehicle device, and the like. The vehicle state detection unit 143 supplies data indicating a result of detection processing to the situation recognizer 153 of the situation analyzer 133, the emergency avoidance unit 171 of the motion controller 135, and the like.

The self-position estimation unit 132 performs processing for estimating a position, a posture, and the like of the local car on the basis of data or a signal from each of the units of the movement device 100, e.g., the outside-vehicle information detection unit 141, the situation recognizer 153 of the situation analyzer 133, and the like. Furthermore, the self-position estimation unit 132 generates a local map used to estimate a self-position (hereinafter referred to as a self-position estimation map), as needed.

It is assumed, for example, that the self-position estimation map is a high-precision map using a technology such as simultaneous localization and mapping (SLAM). The self-position estimation unit 132 supplies data indicating a result of estimation processing to the map analyzer 151, the traffic rule recognizer 152, and the situation recognizer 153 of the situation analyzer 133, and the like. Furthermore, the self-position estimation unit 132 stores the self-position estimation map in the storage 111.

The situation analyzer 133 performs processing for analyzing situations of the local car and the surroundings. The situation analyzer 133 includes the map analyzer 151, the traffic rule recognizer 152, the situation recognizer 153, the situation prediction unit 154, and the safety determination unit 155.

The map analyzer 151 performs processing for analyzing various maps stored in the storage 111 by using data or a signal from each of the units of the movement device 100, e.g., the self-position estimation unit 132, the outside-vehicle information detection unit 141, and the like, as needed, and constructs a map including information required for automatic driving processing. The map analyzer 151 supplies the constructed map to the traffic rule recognizer 152, the situation recognizer 153, the situation prediction unit 154, a route planning unit 161, an action planning unit 162, and a motion planning unit 163 of the planning unit 134, and the like.

The traffic rule recognizer 152 performs processing for recognizing a traffic rule in the surroundings of the local car on the basis of data or a signal from each of the units of the movement device 100, e.g., the self-position estimation unit 132, the outside-vehicle information detection unit 141, the map analyzer 151, and the like. In this recognition processing, for example, a position and a state of a traffic light around the local car, the content of traffic regulations around the local car, a travelable traffic lane, and the like are recognized. The traffic rule recognizer 152 supplies data indicating a result of recognition processing to the situation prediction unit 154 or the like.

The situation recognizer 153 performs processing for recognizing a situation relating to the local car on the basis of data or a signal from each of the units of the movement device 100, e.g., the self-position estimation unit 132, the outside-vehicle information detection unit 141, the in-vehicle information detection unit 142, the vehicle state detection unit 143, the map analyzer 151, and the like. For example, the situation recognizer 153 performs processing for recognizing a situation of the local car, a situation of the surroundings of the local car, a situation of a driver of the local car, and the like. Furthermore, the situation recognizer 153 generates a local map used to recognize the situation of the surroundings of the local car (hereinafter referred to as a situation recognition map), as needed. It is assumed, for example, that the situation recognition map is an occupancy grid map.

Examples of a situation of the local car serving as a target to be recognized a position, a posture, and a movement (for example, speed, acceleration, a movement direction, and the like) of the local car, and a loading amount of freight that determines a motion characteristic of the local car or the movement of the center of gravity of a vehicle body caused by the loading of freight, tire pressure, a recovery start timing required in control changes depending on conditions that are peculiar to a vehicle and further are peculiar to loaded freight, such as a movement of a braking distance according to a brake braking pad wear situation, allowable maximum deceleration braking for the prevention of freight movement that is caused in load braking, or a centrifugal relaxation limit speed in curve traveling according to a liquid mounted object, moreover, characteristics of the vehicle itself even in exactly the same road environment such as a road surface wear coefficient, a rod curve, or a grade, and moreover, a load or the like. Therefore, this variety of conditions need to be collected, be learnt, and be reflected in an optimum timing for control. This is not the content obtained by simply observing and monitoring the presence or absence, content, and the like of an abnormality of the local vehicle in determining a control timing on the basis of the type of a vehicle or a load. In transportation business or the like, a parameter for determining the addition of a grace time of recovery that is desirable to secure a prescribed level of safety according to characteristics peculiar to a load may be set as a fixed value in advance, and a method for uniformly determining all of the notice timing determination conditions in self-cumulative learning is not always employed.

Examples of a situation of the surroundings of the local car that serves as a target to be recognized include a type and a position of a surrounding static object, a type, a position, and a movement (for example, speed, acceleration, a moving direction, and the like) of a surrounding moving object, a configuration and a road surface state of a surrounding road, weather, air temperature, humidity, and brightness of the surroundings, and the like. Examples of a driver's state serving as a target to be recognized include a physical condition, a degree of awakening, a degree of concentration, a degree of fatigue, a movement of a line-of-sight, a driving operation, and the like. In order to cause a vehicle to safely travel, a control start point to be handled significantly changes according to a loading amount mounted in a state peculiar to the vehicle, a state where a mounting part is fixed to a chassis, a partiality state of the center of gravity, a maximum deceleration available acceleration value, a maximum load available centrifugal force, a recovery response delay amount according to a driver's state, or the like.

The situation recognizer 153 supplies data indicating a result of recognition processing (including a situation recognition map, as needed) to the self-position estimation unit 132, the situation prediction unit 154, and the like. Furthermore, the situation recognizer 153 stores the situation recognition map in the storage 111.

The situation prediction unit 154 performs processing for predicting a situation relating to the local car on the basis of data or a signal from each of the units of the movement device 100, e.g., the map analyzer 151, the traffic rule recognizer 152, the situation recognizer 153, and the like. For example, the situation prediction unit 154 performs processing for predicting a situation of the local car, a situation of the surroundings of the local car, a situation of a driver, and the like.

Examples of a situation of the local car that serves as a target to be predicted include a behavior of the local car, the occurrence of an abnormality, a travelable distance, and the like. Examples of a situation of the surroundings of the local car that serves as a target to be predicted include a behavior of a moving object around the local car, a change in a state of a traffic light, a change in environment such as weather, and the like. Examples of a situation of a driver that serves as a target to be predicted include a behavior, a physical condition, and the like of the driver.

The situation prediction unit 154 supplies data indicating a result of prediction processing together with data from the traffic rule recognizer 152 and the situation recognizer 153, to the route planning unit 161, the action planning unit 162, and the motion planning unit 163 of the planning unit 134, and the like.

The safety determination unit 155 learns an optimum recovery timing according to a driver's recovery action pattern, vehicle characteristics, or the like, and provides the learned information to the situation recognizer 153 or the like. By doing this, for example, a statistically obtained optimum timing required for a driver to recover from automatic driving to manual driving in a normal manner at a predetermined fixed ratio or more can be presented to the driver.

The route planning unit 161 plans a route to a destination on the basis of data or a signal from each of the units of the movement device 100, e.g., the map analyzer 151, the situation prediction unit 154, and the like. For example, the route planning unit 161 sets a route from a current position to a specified destination on the basis of a global map. Furthermore, for example, the route planning unit 161 appropriately changes a route on the basis of a traffic jam, an accident, traffic regulations, a situation of works or the like, a physical condition of a driver, and the like. The route planning unit 161 supplies data indicating the planned route to the action planning unit 162 or the like.

The action planning unit 162 plans an action of the local car for safely traveling on the route planned by the route planning unit 161 within a planned time, on the basis of data or a signal from each of the units of the movement device 100, e.g., the map analyzer 151, the situation prediction unit 154, and the like. For example, the action planning unit 162 plans a start, a stop, a traveling direction (for example, moving forward, moving backward, turning left, turning right, changing directions, and the like), a traveling lane, traveling speed, passing, and the like. The action planning unit 162 supplies data indicating the planned action of the local car to the motion planning unit 163 or the like.

The motion planning unit 163 plans a motion of the local car for achieving the action planned by the action planning unit 162, on the basis of data or a signal from each of the units of the movement device 100, e.g., the map analyzer 151, the situation prediction unit 154, and the like. For example, the motion planning unit 163 plans acceleration, deceleration, a traveling track, and the like. The motion planning unit 163 supplies data indicating the planned motion of the local car to an acceleration or deceleration controller 172 and a direction controller 173 of the motion controller 135, and the like.

The motion controller 135 controls a motion of the local car. The motion controller 135 includes the emergency avoidance unit 171, the acceleration or deceleration controller 172, and the direction controller 173.

The emergency avoidance unit 171 performs processing for detecting emergency, such as collision, contact, entry to a danger zone, an abnormality in a driver, or an abnormality in a vehicle, on the basis of detection results of the outside-vehicle information detection unit 141, the in-vehicle information detection unit 142, and the vehicle state detection unit 143. In a case where the occurrence of emergency has been detected, the emergency avoidance unit 171 plans a motion of the local car for the avoidance of emergency, such as a sudden stop or a sudden turn. The emergency avoidance unit 171 supplies data indicating the planned motion of the local car to the acceleration or deceleration controller 172, the direction controller 173, and the like.

The acceleration or deceleration controller 172 controls acceleration or deceleration to achieve the motion of the local car that has been planned by the motion planning unit 163 or the emergency avoidance unit 171. For example, the acceleration or deceleration controller 172 calculates a control target value of a drive force generator or a braking device to achieve acceleration, deceleration, or a sudden stop that has been planned, and supplies a control command indicating the calculated control target value to the drive system controller 107. Note that there are principally two cases where emergency can occur. Specifically, there are a case where, during automatic driving on a road that has originally been determined to be safe on a traveling route during automatic driving in a local dynamic map or the like that has been acquired by infrastructure, an unexpected accident occurs for an unexpected reason and emergency recovery fails to be performed in time, and a case where it is difficult for a driver to accurately recover from automatic driving to manual driving.

The direction controller 173 controls a direction to achieve the motion of the local car that has been planned by the motion planning unit 163 or the emergency avoidance unit 171. For example, the direction controller 173 calculates a control target value of a steering mechanism to achieve a traveling track or a sudden turn that has been planned by the motion planning unit 163 or the emergency avoidance unit 171, and supplies a control command indicating the calculated control target value to the drive system controller 107.

3. Sequence of Mode Switching from Automatic Driving Mode to Manual Driving Mode Next, a takeover sequence from the automatic driving mode to the manual driving mode is described.

Figure 7:
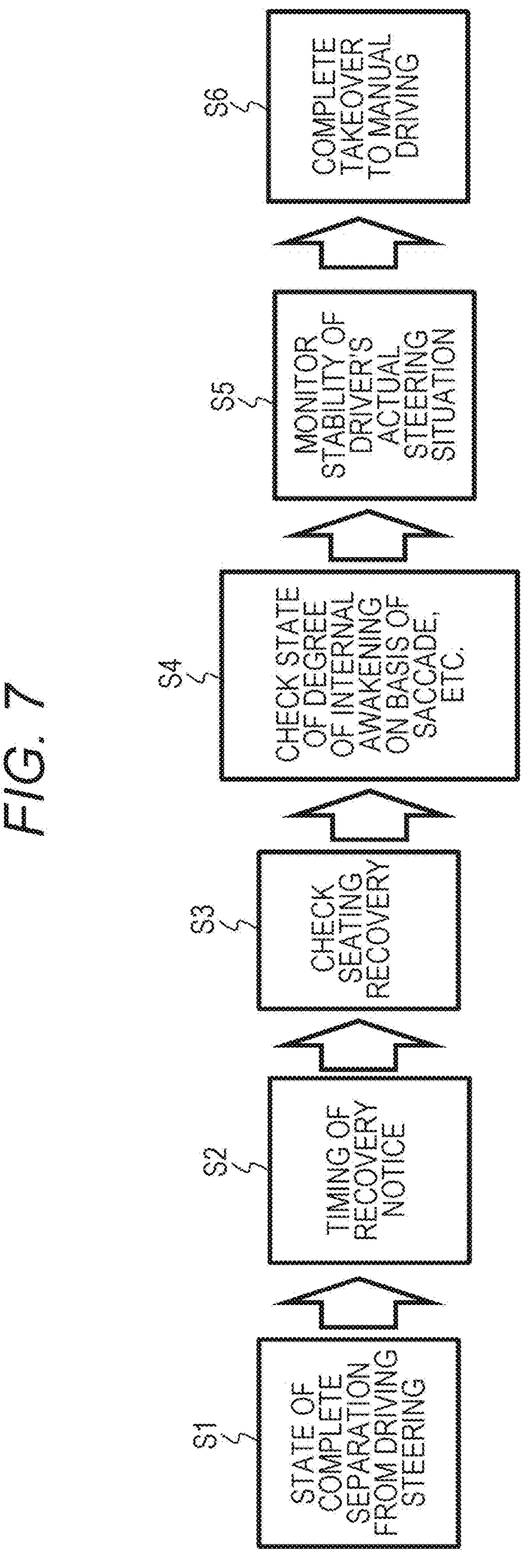
FIG. 7 is a diagram illustrating one example of a sequence of mode switching from an automatic driving mode to a manual driving mode that is performed by the movement device according to the present disclosure.

FIG. 7 schematically illustrates one example of a sequence of mode switching from the automatic driving mode to the manual driving mode that is performed by the automatic driving controller 112.

In step S1, a driver is in a state of complete separation from driving steering. In this state, the driver can perform a secondary task such as nap, watching a video, concentration on a game, or a task using a visual tool such as a tablet or a smartphone, for example. It is conceivable that the task using the visual tool such as a tablet or a smartphone is performed, for example, in a state where a driver's seat has been displaced, or in a seat that is different from the driver's seat.

Depending on these states of the driver, it is expected that the time required for the driver to recover will significantly change according to the content of a current task, when the driver approaches a section that requests recovery to manual driving on a route. If notice is given just before the approach of an event, the time required for recovery is not sufficient, or in a case where notice is given excessively early so as to allow a margin before the approach of the event, the time to a timing actually required for recovery is excessively long. If a situation in which notice is not given at an accurate timing repeatedly occurs as a result of this, the timing reliability of a notice timing of a system deteriorates, the driver reduces a consciousness of notice, consequently, the driver neglects to take accurate measures, and this results in a high risk of a failure in takeover and the hindrance of reliably performing the secondary task. Accordingly, in order for a driver to start accurate measures for driving recovery in response to notice, the system needs to optimize a notice timing.

Step S2 indicates a timing of manual driving recovery request notice, as described above with reference to FIG. 2. Notice of driving recovery is given to a driver by using dynamic paptics such as vibration or in a visual or auditory manner. For example, the automatic driving controller 112 monitors a steady state of a driver, grasps a timing of notice, and gives notice at an appropriate timing. Stated another way, it is desirable that, during a pre-stage passive monitoring period, a state where a driver performs a secondary task be constantly and passively monitored, the system can calculate an optimum timing of an optimum timing of notice, passive monitoring during the period of step S1 be constantly and continuously performed, and a recovery timing and recovery notice be caused to match recovery characteristics peculiar to the driver.

Stated another way, it is desirable that an optimum recovery timing according to the recovery action pattern of the driver, characteristics of a vehicle, or the like be learnt, and a statistically obtained optimum timing required for the driver to recover from automatic driving to manual driving in a normal manner at a predetermined fixed ratio or more be presented to the driver. In this case, in a case where the driver has not responded to notice during a fixed time period, a warning using the emission of alarm sound, or the like is given.

In step S3, it is checked whether or not the driver has made a seating recovery. In step S4, a state of a degree of internal awakening of the driver is checked by analyzing a face or the behavior, such as saccade, of eyeballs. In step S5, the stability of an actual steering situation of the driver is monitored. Then, in step S6, takeover from automatic driving to manual driving has been completed.

4. Operation Sequence Example of Automatic Driving

Next, one example of an operation sequence of automatic driving is described with reference to the flowchart illustrated in FIG. 8.

The flowchart illustrated in FIG. 8 is a flowchart explaining an operation sequence of automatic driving that implements the movement device 100.

First, in step S11, driver authentication is performed. This driver authentication is performed by using knowledge authentication using a password, a personal identification number, or the like, or biological authentication using a face, a fingerprint, the iris of the pupil, a voiceprint, or the like, or by using both knowledge authentication and biological authentication. By performing driver authentication, as described above, even in a case where a plurality of drivers drives the same vehicle, information for determining a notice timing in association with each of the drivers can be accumulated.

Next, in step S12, the driver operates the input unit 101 to set a destination. In this case, the driver performs an input operation on the basis of a display on an instrument panel Note that the present example describes an example in a case where it is assumed that an itinerary is set on a vehicle. However, remote advance reservation setting or the like may be performed in advance by using a smartphone before getting in a vehicle or by using a personal computer before leaving home. Moreover, a system of a car may perform preplanning setting according to a schedule that has been assumed by a driver in accordance with a schedule table, LDM information of a road environment, namely, what is called local dynamic map (LDM) information in which traveling map information of a road on which a vehicle travels is constantly updated with high precision, or the like may be updated and acquired, and an actual traveling advice display or the like may be further conducted in a concierge manner at the time of or prior to getting in the vehicle.

Next, in step S13, a traveling section display on a traveling route is started. This traveling section display is conducted on the instrument panel, or is conducted, for example, in a tablet or the like in which a driver performs a secondary task in such a way that the traveling section and a working window are arranged side by side. By doing this, a driver who is performing a task in the working window can easily recognize a driver intervention required section and an automatic driving available section on a traveling route on an arrival prediction time axis from a current point.

In this traveling section display, a forward schedule and information relating to the approach to each point are presented. In this traveling section display, a driver intervention required section and an automatic driving available section on a traveling route are displayed on an arrival prediction time axis from a current point. Then, the driver intervention required section includes a manual driving section, a takeover section from automatic driving to manual driving, and a cautious traveling section from automatic driving. Details of this traveling section display are described later.

Next, in step S14, the acquisition of LDM update information is started. According to the acquisition of this LDM update information, the content of the traveling section display can be changed to the latest state. Next, in step S15, traveling is started. Next, in step S16, a display of the traveling section display is updated on the basis of positional information of the local car and the acquired LDM update information. By doing this, the traveling section display is scroll-displayed according to traveling in such a way that each section is approaching the local car.

Means for presenting information relating to a forward traveling environment that is accompanied with traveling and is relatively approaching, a timing required for takeover of a corresponding local vehicle, or the like does not need to be limited to scroll means, and it is preferable that means in which an imminent time interval is intuitive and explicit and that enables when recovery to driving is to be started to be known with misrecognition reduced be employed as another method. For example, a time presenting method imitating a sandglass or means for directly presenting a takeover remaining time to equipment that a user wears in the form of a chronograph type watch may be intervened.

Next, in step S17, a driver's state is monitored. Next, in step S18, event change handling processing is performed. This event change handing processing includes mode switching processing for handling a case where a switching point between the automatic driving mode and the manual driving mode that is already present on a traveling route or a cautious traveling section is approaching, event occurrence processing for handling a case where a mode switching point or a driver intervention required section of the cautious traveling section has newly occurred on a traveling route, and the like. After this, the processes of step S16 to step S18 are appropriately repeated.

"Details of Traveling Section Display"

Figure 9:
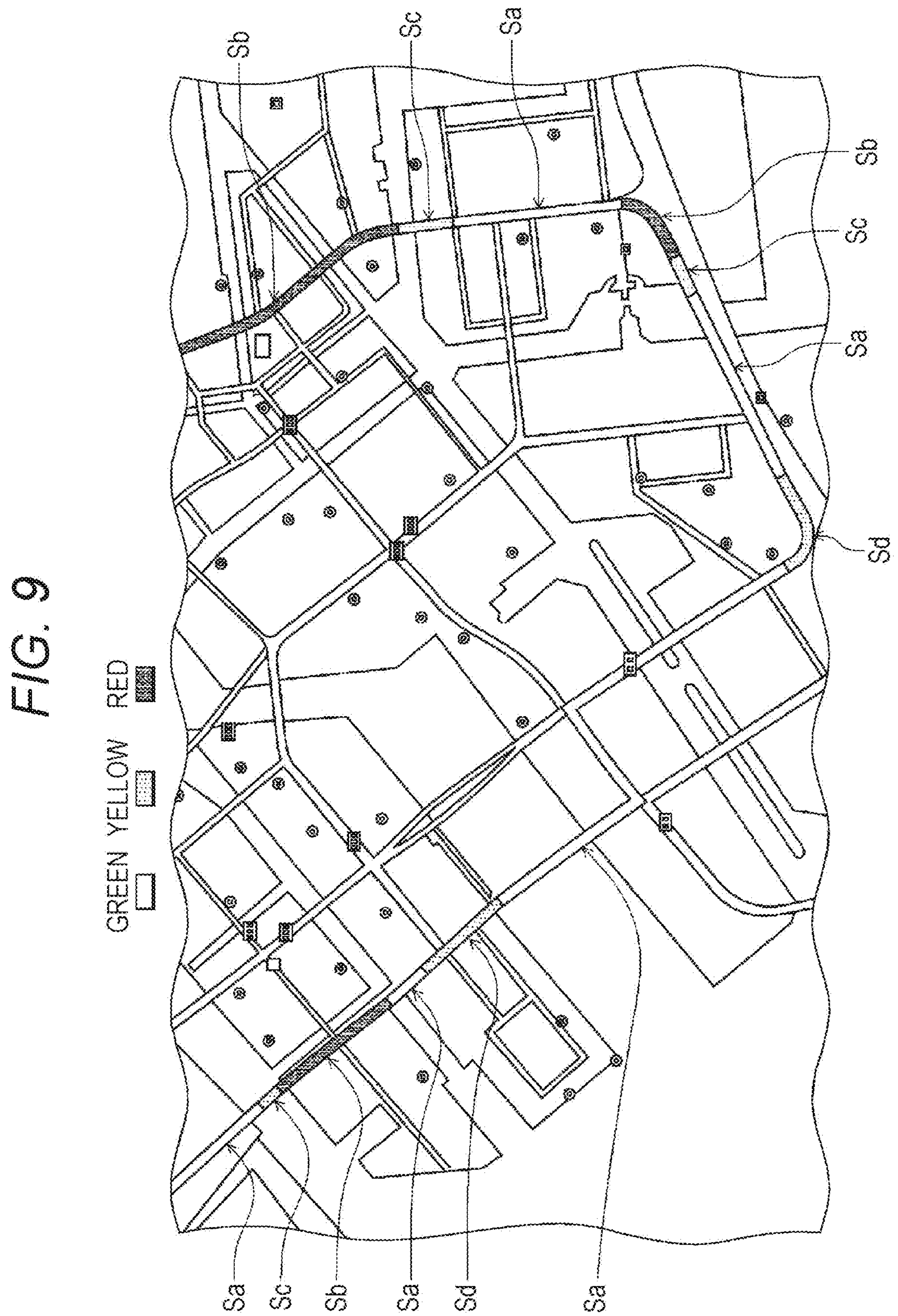
FIG. 9 is a diagram illustrating one example of a traveling route on which an automatic driving permitting/prohibiting section that has been determined by a driver setting a destination has been set or generated in spots.

FIG. 9 illustrates one example of a traveling route that has been determined by a driver setting a destination. In this traveling route, an automatic driving available section Sa, a manual driving section Sb, a takeover section Sc from automatic driving to manual driving, and a cautious traveling section Sd from automatic driving are present. Here, the takeover section Sc is always present just before the manual driving section Sb, and it is requested that a driver be in a position of recovery to manual driving. Furthermore, the cautious traveling section Sd is a section in which traveling can be performed at a reduced speed while automatic driving is maintained in a state where a driver in the position of recovery to manual driving is performing cautious monitoring.

In the illustrated example, the automatic driving available section Sa is illustrated in green, the manual driving section Sb is illustrated in red, and the takeover section Sc and the cautious traveling section Sd are illustrated in yellow. Note that respective colors are illustrated by using different patterns, for convenience sake.

In a traveling section display on a display device such as a center information display or a tablet, each of the sections described above of the traveling route is displayed on an arrival prediction time axis from a current point. The automatic driving controller 112 performs information processing for a traveling section display of a traveling route on the basis of traveling route information and traffic information.

Figures 10A, 10B, 10C, 10D:
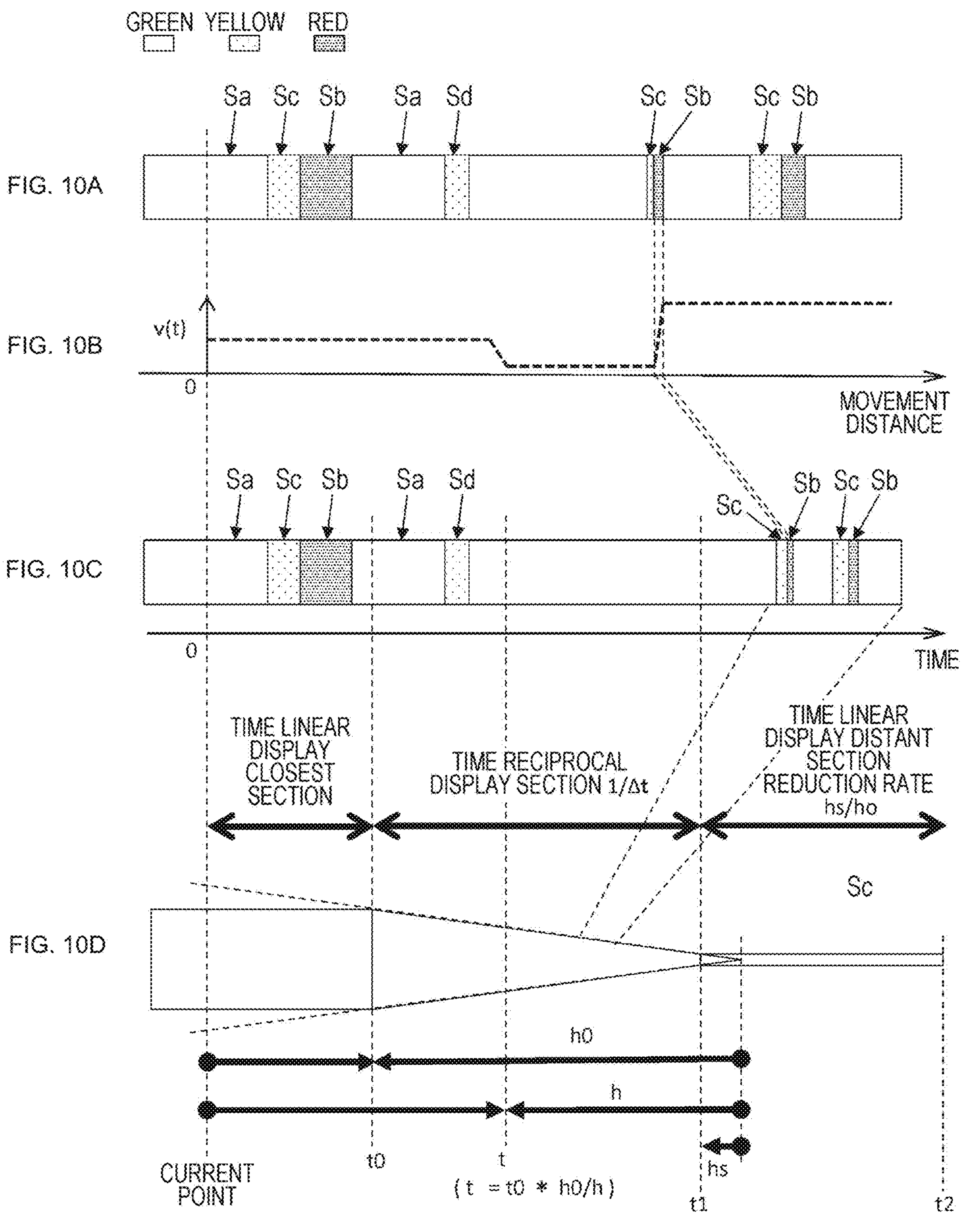
FIG. 10 is a diagram explaining information processing for a traveling section display on a traveling route.

FIG. 10A illustrates each of the sections on the traveling route on a movement distance axis from a current point on a fixed scale. FIG. 10B illustrates a speed v(t) of a flow of average road traffic at each point. FIG. 10C illustrates the respective sections indicated on the movement distance axis that have been converted into a time axis by using the speed v(t). By doing this, the respective sections on the traveling route are indicated on an arrival prediction time axis from a current point. Stated another way, a physical distance on the traveling route can be indicated on a time axis obtained by performing division using an average speed in each corresponding section.

In this embodiment, all of the sections for which a traveling section display is conducted are divided into three sections, as illustrated in FIG. 10D, and a time axis of each of the sections is changed. Stated another way, a first section from a current point to a first point (time t0, for example, about 10 minutes) is displayed as a time linear display closest section on a first time axis. For example, time to is set to be a necessary and sufficient time period after a general driver terminates a secondary task and before the general driver makes a recovery to driving. A closest section that is approached according to traveling has a visually intuitive effect that is equal to an effect of indication on a map that seems to proceed at a fixed speed, and therefore a driver can start preparation for accurate driving recovery that follows the approach to an event. There is an advantage in which a point at which recovery will be started can be instinctively grasped in a somewhat accurate manner. Stated another way, a purpose for displaying this section is to provide a user with start determination information of a driver's accurate recovery point.

Furthermore, a second section from the first point (time t0) to a second point (time t1, for example, about one hour) is displayed as a time reciprocal display section on a time axis that has sequentially changed from the first time axis to a second time axis that has been reduced at a predetermined ratio with respect to this first time axis. A purpose for displaying this second section is principally measures to accurately provide a driver with a road situation during a long period in a small display because it is difficult to display a long period in a small display space if a display is conducted at a scale magnification equal to a scale magnification of the first section described above. This enables a driver to easily grasp up to which point in a certain section ahead driving intervention will not be requested according to traveling, and there is an advantage in which engagement in a secondary task can be performed according to a plan. Intervention and non-intervention of driving are clearly separated from each other. Furthermore, in a secondary task that follows communication with a third party, or the like, a role is played in presenting important information in planning of releasing a driver from the secondary task, or the like.

Here, a method for setting this second display section is described with reference to FIG. 10D. When it is assumed that the height of a triangle is h0, time t at a point that exists previous to its end by h is obtained according to Formula (1) described below.

$$t = t0 * h0 / h \quad (1)$$

Furthermore, the second time axis at the second point (time t1) has been reduced at a ratio of hs/h0 with respect to the first time axis. For example, in a case where hs=h0/8, a reduction rate is 1/8.

In a case where traveling is performed at a constant vehicle speed, a display of the second display section described above corresponds to a display at the time of viewing a map in which a traveling straight line expansion display section on the map is obliquely inclined in a traveling direction, or a state where a front side on a road plane is obliquely viewed. In other words, it can also be said that a visual effect of this display section is a display that enables a sensory distance to be easily grasped without displaying a scale or the like of an accurate positional display on a screen, because perspective can be intuitively grasped due to a display image height position. Then, a distant section is reduced in size, but is not a point that is immediately arrived at in traveling. Therefore, a driver does not need to sensorily grasp strict arrival time information similarly to a close point, although rough prediction is important. This is preferable in planning to perform a secondary task.

Furthermore, a third section from the second point (time t1) to a third point (time t2) is displayed as a time linear display distant section on the second time axis (a reduction rate of hs/h0). As described above, by displaying three divided sections, a driver can know temporally closest section information in detail in a limited display space, and can know temporally distant section information. Note that a display of a distant part in a display form of the second section is below a person's visual resolution and further a display resolution limit of a system, information required to plan and determine a secondary task fails to be discriminated, and a display function becomes useless. Accordingly, a most effective display is a display in which a reduction in a display scale is finished in a stage in which the sense of a time section can be sufficiently grasped in an intuitive manner and the division of a required intervention section and an unrequired section is appropriately displayed, and the display scale is returned again to a fixed scale in sections that follow.

Note that the vehicle control system 100 has default values of times t0, t1, and t3. It is conceivable that values of time t0, t1, and t3 are changed between long-distance driving and short-distance driving. Therefore, the number of default values is not limited to 1. Plural types of default values may be used, and a driver (a user) or a system may selectively use the plural types of default values depending on a traveling route. Furthermore, it is also conceivable that values of times t0, t1, and t3 can be arbitrarily set by the driver (the user).

Figures 11A, 11B, 11C:
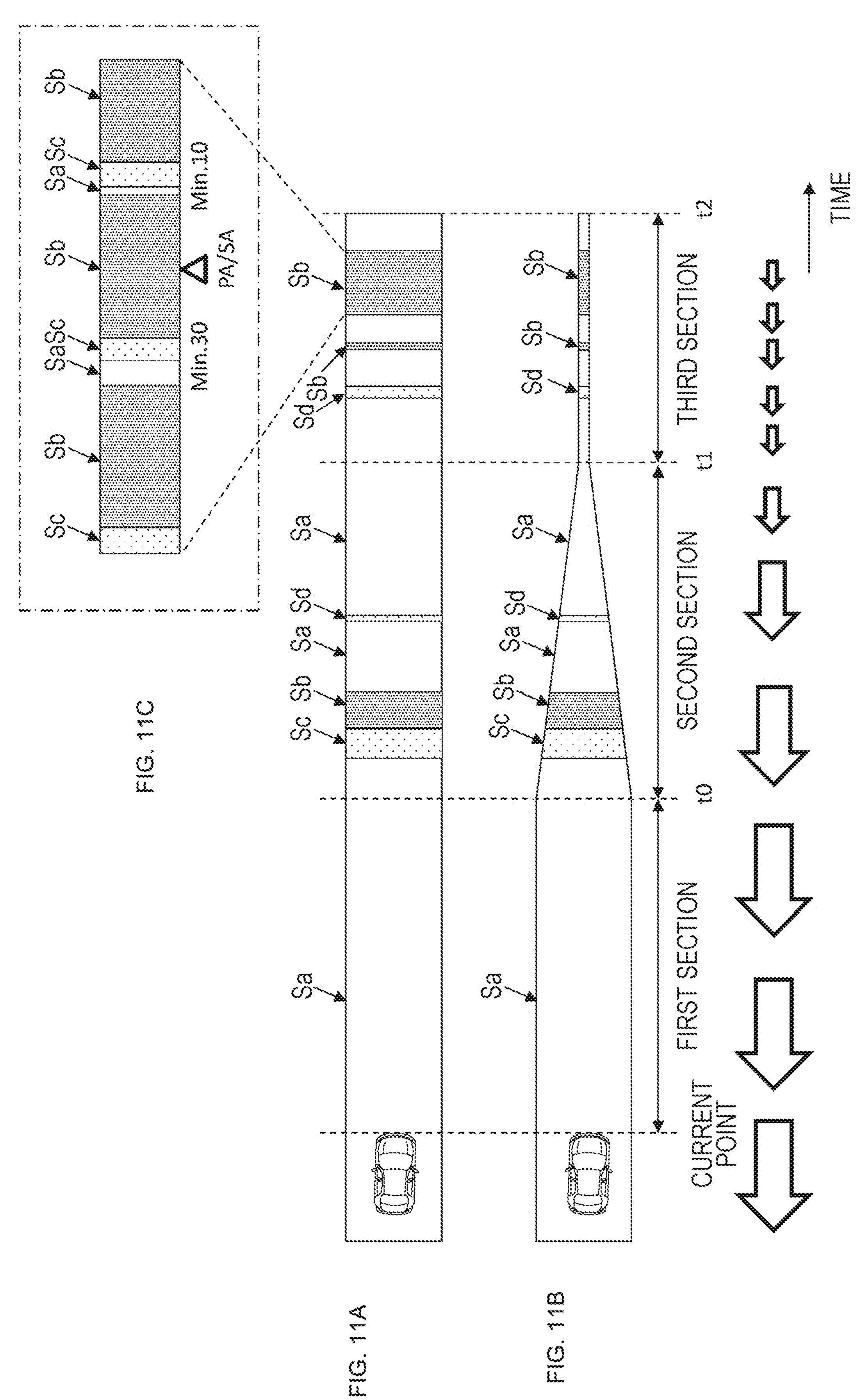
FIG. 11 is a diagram illustrating one example of a traveling section display that is finally conducted.
Figures 12A, 12B, 12C, 12D:
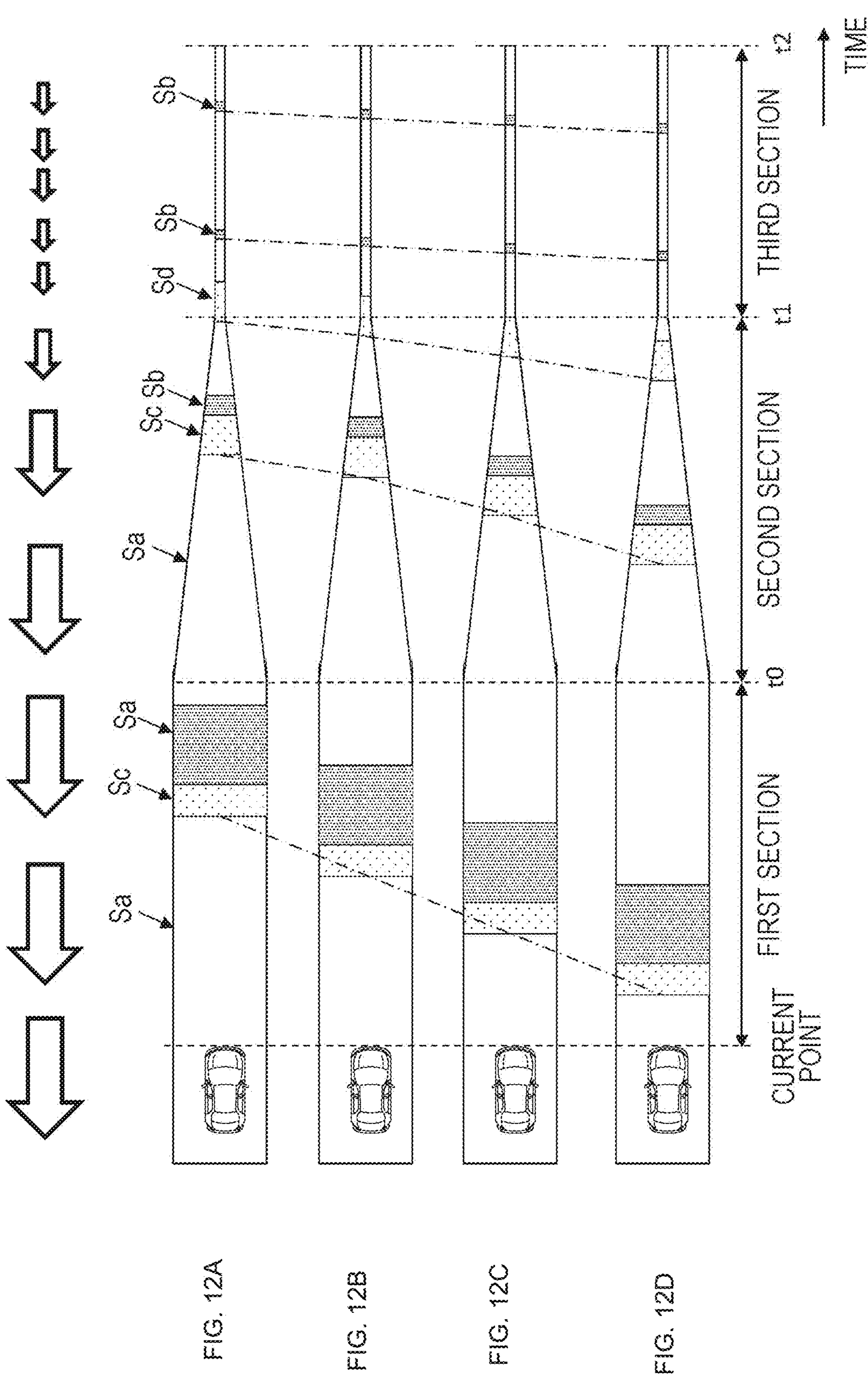
FIG. 12 is a diagram illustrating an example of a change in (an example of scrolling of) a traveling section display with the lapse of time.

FIGS. 11A and 11B illustrate examples of a traveling section display that is finally displayed. Note that whether or not a time axis is linear and further a change in a reduction rate of the time axis are indicated by using the length of an arrow. In the case of FIG. 11A, all of the sections, the first section, the second section, and the third section, are displayed to have a first width.

In contrast, in the case of FIG. 11B, the first section from a current point to the first point (time t0) is displayed to have the first width, the second section from the first point (time t0) to the second point (time t1) is displayed to have a width that has sequentially changed from the first width to a second width that is narrower than the first width, and the third section from the second point (time T1) to the third point (time T2) is displayed to have the second width. This enables a driver to visually recognize a degree of reduction of time axes of the second section and the third section with respect to the first section. Stated another way, the display form of FIGS. 10A, 10B, 10C, and 10D is a display in consideration of only a reduction rate in a traveling direction. By further artificially changing a width that crosses the traveling direction of display information in accordance with perspective, the same perspective effect as a perspective effect in viewing along the progress of a road or a map to face an infinite direction can be exhibited, and a distribution of a driving intervention required section can be easily grasped in an intuitive manner in comparison with the case of glancing at a screen. In particular, in a case where only the second section is rotated instead of counterclock and is viewed, it seems to match a road width of a front side of a road and an arrival time at each corresponding point in the case of traveling at a constant speed. Therefore, even if an accurate position scale is not viewed and judged, an actual arrival feeling to each point can be intuitively grasped, and a display form that enables time allocation can be achieved.

Note that, for example, in a part having a small reduction rate hs/h0 like the third section, if a section having a short time length is displayed to have the time length with no change, the section is displayed to be very thin, and it is expected that it will be difficult for a driver to recognize the section. Therefore, even in a case where, in practice, a driver intervention section (a manual driving section, a takeover section, and a cautious traveling section) has a length that is less than or equal to a fixed time length, the driver intervention section is displayed to have the fixed time length. In this case, for example, in a case where the takeover section and the manual driving section are continuous, a display of the takeover section may be omitted. In FIGS. 11A and 11B, a display of a first manual driving section Sb in the third section indicates such a state. By doing this, in the third section in which a time axis has significantly been reduced in size, a driver intervention required section having a short time length can be displayed to be recognizable to a driver.

Furthermore, in a part having a small reduction rate hs/h0 like the third section, in a case where a manual driving section Sb is intermittently continued at a short cycle, all of the manual driving sections Sb are displayed continuously. In FIGS. 11A and 11B, a display of a second manual driving section Sb in the third section indicates such a continuously displayed state. In practice, the manual driving section Sb displayed as described above includes takeover sections Sd and automatic driving available sections Sa that have a short period in addition to the manual driving sections Sb, as illustrated in FIG. 11C. Note that, as described later, a detailed display can be conducted, for example, by double-touching a corresponding point in a state where a traveling section display is conducted on a tablet or the like.

The traveling section display described above on the traveling route is updated on the basis of positional information of the local car and acquired LDM update information. By doing this, the traveling section display is scroll-displayed with the lapse of time in such a way that each section is approaching the local car. FIGS. 12A, 12B, 12C, and 12D illustrate an example of a change in a traveling section display with the lapse of time. This example indicates an example in which the second section is displayed in a tapered manner, but the similar is applied to a case where all of the sections are displayed to have the same width.

In this case, in the first section, each section moves fast. Furthermore, in the second section, a reduction in size of a time axis becomes smaller at a point closer to a side of the first section from a side of the third section, and therefore each of the sections moves faster. Furthermore, in the third section, a reduction in size of the time axis becomes larger, and therefore each of the sections moves slowly.

Figure 13B:
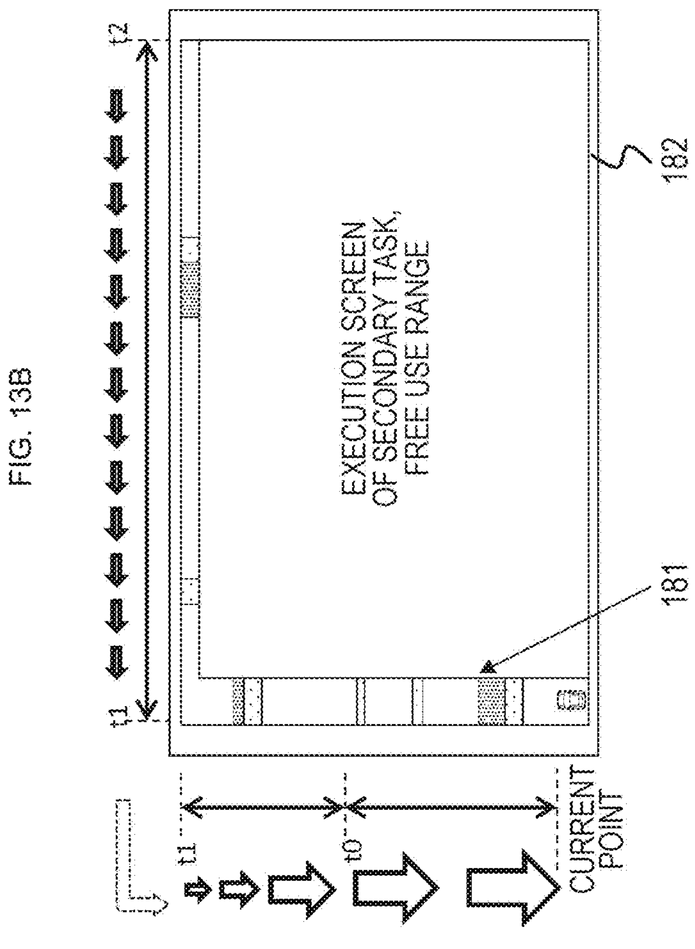
FIG. 13 is a diagram illustrating one example of a traveling section display on a traveling route that is displayed on a screen of a tablet terminal device (hereinafter simply referred to as a "tablet").
Figure 13A:
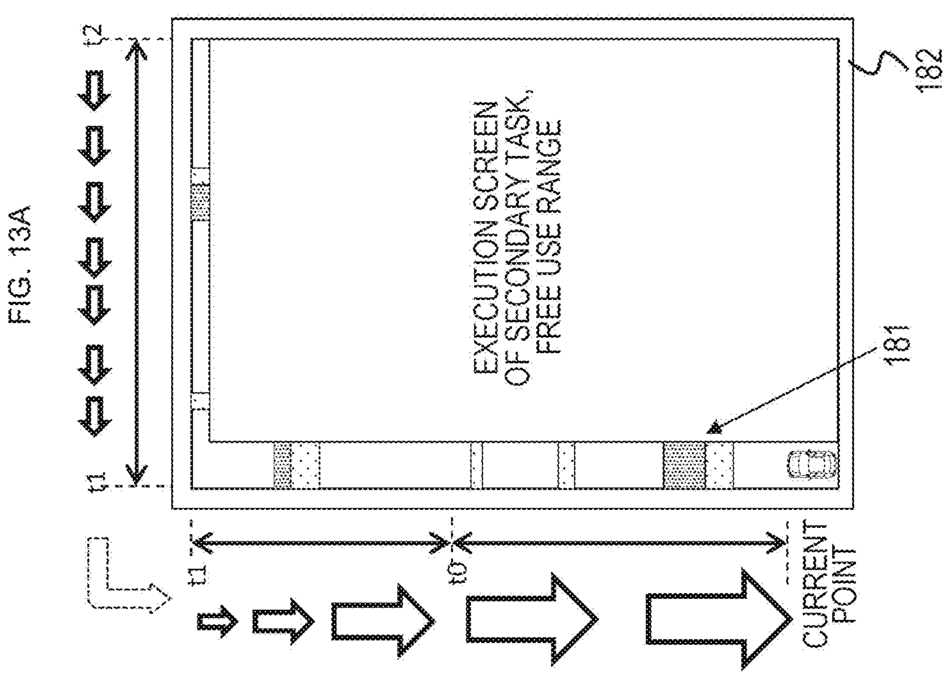

FIGS. 13A and 13B illustrate examples of a traveling section display 181 on a traveling route displayed on a screen of a tablet 182. FIG. 13A illustrates an example in a case where the tablet 182 is used in a vertically long shape. In this case, the traveling section display 181 is conducted along a left-hand side and an upper side in a bent state, and is conducted in parallel to a working window serving as an execution screen of a secondary task performed on the tablet 182. FIG. 13B illustrates an example in a case where the tablet 182 is used in a horizontally long shape. Similarly in this case, the traveling section display 181 is conducted along a left-hand side and an upper side in a bent state, and is conducted in parallel to a working window serving as an execution screen of a secondary task performed on the tablet 182. Note that in the illustrated example, the traveling section display 181 is disposed in a bent state on the screen of the tablet 182. However, in a case where a disposition space can be sufficiently acquired, it is also conceivable that the traveling section display 181 is disposed linearly.

Figure 14:
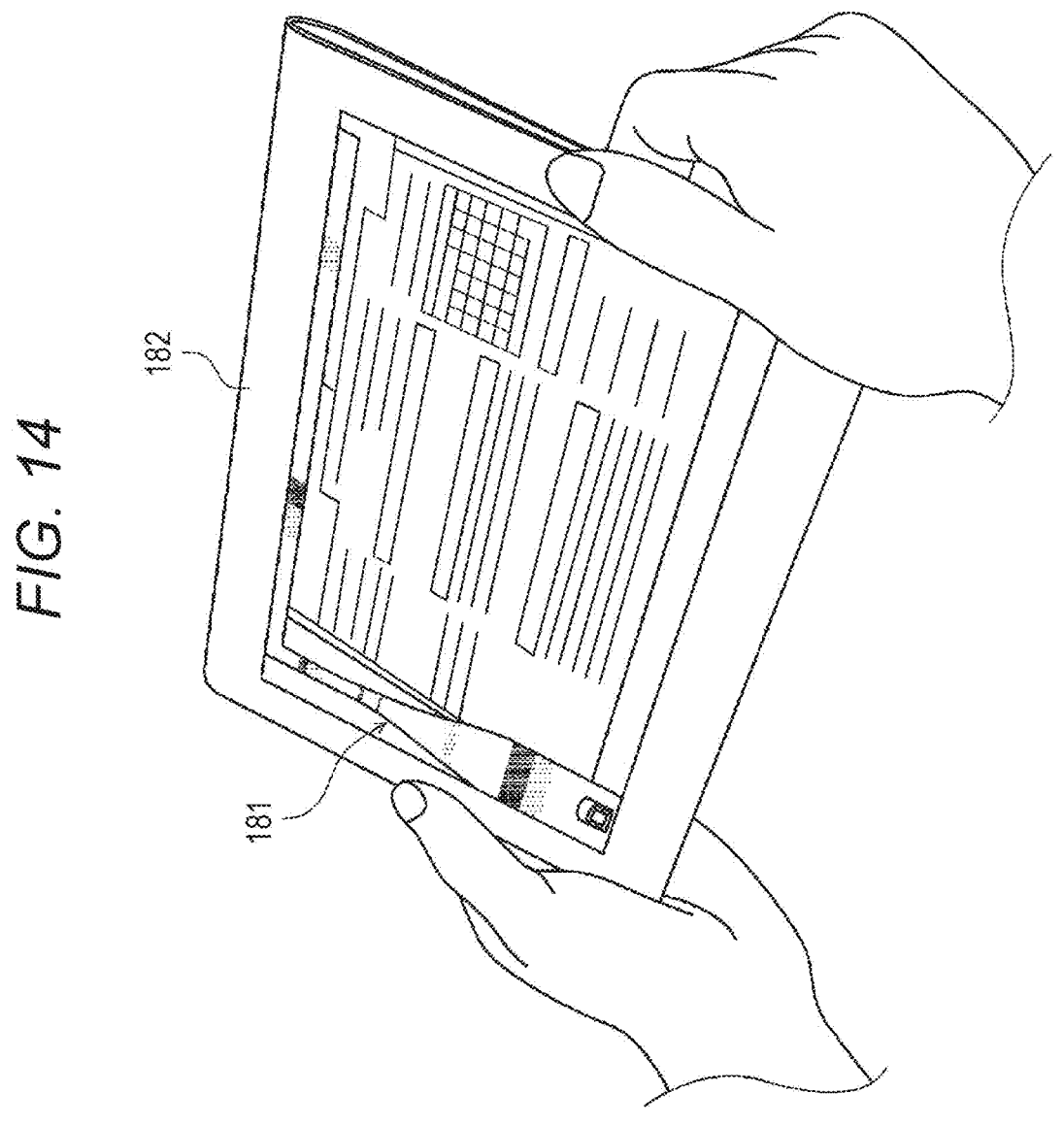

FIG. 14 illustrates one example of a state where a driver is performing a secondary task by actually using the tablet 182. In this example, the tablet 182 is used in a horizontally long shape. On the screen of the tablet 182, the traveling section display 181 is conducted along a left-hand side and an upper side in a bent state. Note that whether or not this traveling section display 181 is conducted on the screen may be selected according to an operation performed by a driver (a user). In this case, for example, in a case where the traveling section display 181 is not conducted on the screen and in a case where the driver intervention required section enters within a fixed time period and notice is given to the driver, the traveling section display 181 may be automatically conducted on the screen.

In a state where the traveling section display 181 is conducted on the screen of the tablet 182, in a case where the driver intervention required section is newly generated in the displayed section, the newly generated driver intervention required section is newly displayed. In this case, for example, this newly generated driver intervention required section is displayed to flash on and off during a fixed time period such that the newly generated driver intervention required section can be distinguished from another section. This flashing display may be accompanied with caution alarm sound. Here, a case where the driver intervention required section has been newly generated includes a case where the cautious traveling section or the manual driving section has been newly generated and a case where the cautious traveling section has been changed to the manual driving section.

FIG. 15 illustrates a state where a cautious traveling section Sd is newly generated in a second section and a warning is issued to a driver by using a flashing display. Note that, in this case, flashing, namely, a warning state, may be able to be stopped by a driver touching a display portion of the cautious traveling section Sd that is displayed to flash on and off. Alternatively, a small window may be popped up by a driver touching the display portion of this cautious traveling section Sd that is displayed to flash on and off, and flashing, namely, the warning state, may be able to be stopped by touching the screen for consent.

Figure 16:
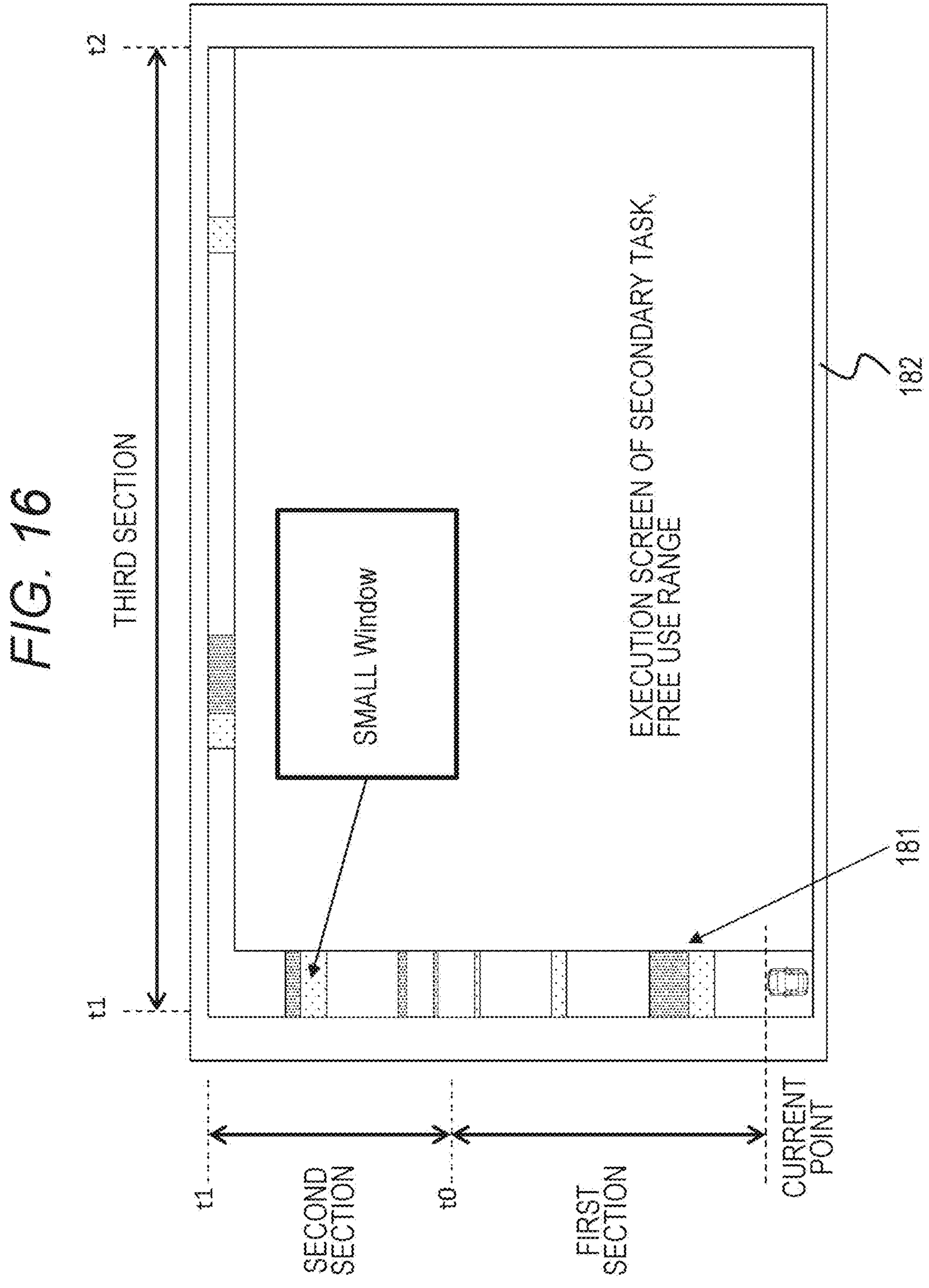
FIG. 16 is a diagram illustrating a state where a small window has been popped up on a screen of a tablet.

Furthermore, in a state where the traveling section display 181 is conducted on the screen of the tablet 182, in a case where a driver (a user) double-touches and specifies an arbitrary point, a small window is popped up, for example, as illustrated in FIG. 16, and a display relating to the point is conducted.

5. Safety Determination Processing and Manual Driving Recovery Available Time Estimation Processing that are Performed by Movement Device Next, safety determination processing and manual driving recovery available time estimation processing that are performed by a movement device are described.

These pieces of processing are principally performed by the safety determination unit 155 that is configured in the automatic driving controller 112 of the movement device 100 described with reference to FIG. 4.

As described above, the safety determination unit 155 learns an optimum recovery timing according to a driver's recovery action pattern, vehicle characteristics, or the like, and provides the learned information to the situation recognizer 153 or the like. By doing this, for example, a statistically obtained optimum timing required for a driver to recover from automatic driving to manual driving in a normal manner at a predetermined fixed ratio or more can be presented to the driver.

FIG. 17 is a diagram explaining a specific configuration example and processing of the safety determination unit 155.

A left-hand side illustrates a movement device 200 such as an automobile, and a right-hand side illustrates a server 300 that performs communication with the movement device 100 via a network.

The movement device 200 includes a driver information acquisition unit 201, an environmental information acquisition unit 202, a driver personal identification information acquisition unit 203, a safety determination unit 210, a notice controller 221, a notice unit 222, a communication unit 230, and a storage 240.

Note that the safety determination unit 210 corresponds to the safety determination unit 155 that is configured in the situation analyzer 133 illustrated in FIG. 4.

The safety determination unit 210 includes a learning processing unit 211, a safety determination processing performing unit (a manual driving recovery available time estimation unit) 212, and a personal authentication processing unit 213.

The server 300 includes a learning data acquisition or generation unit 301, a learning processing unit 302, a communication unit 303, and a storage 304.

First, processing performed by each component of the movement device 200 is described.

The driver information acquisition unit 201 includes a camera or a variety of sensors, and acquires information relating to a driver.

Examples of driver information acquired by the driver information acquisition unit 201 include a line-of-sight direction, an eyeball behavior, and the pupil diameter that are acquired from an image including an eyeball area, a facial expression acquired from an image including a face area, and the like.

These pieces of information acquired by the driver information acquisition unit 201 are used, for example, as information for determining a degree of awakening of a driver.

Note that the examples described above are pieces of the content that has been simplified and described, the detailed state of a driver fails to be determined by acquiring simple information relating to an eye, a face, or the like, and the determination of a degree of awakening of the driver includes advance history information or performing detailed behavior analysis on the eye, the face, or the like, and comprehensively performing the hierarchical determination of an internal awakening state required for manual driving recovery of the driver from the observable value. Examples of some of these pieces of biological information used in determination are described below.

An example of means for observing an awakening state of a driver an activity situation of a target to be acknowledged or a portion to be determined by observing an activity area within the brain is a measurement instrument on a large scale such as the observation of brain waves obtained by electrically detecting a potential, the observation using infrared rays of the blood flow in the surface layer of the head, or the evaluation using fMRI of a function within the brain. However, in the today's technology, the instrument is not suitable at all to be normally and generally used by being mounted in a vehicle, and the obtainment of a correlation with another organism such as a heartbeat waveform or EOG in an experiment environment and the use of offline learning based on these pieces of biological information are limited.

In addition, there is also information that can be used to predict awakening recovery in advance by continuously acquiring medium-term and long-term advance log information in advance, although this is difficult to be directly used to determine a short-term awakening state in a stage in which takeover is suddenly needed. The time required after the reception of recovery notice from a system and before recovery changes according to various factors such as the depth of a sleep, a degree of accumulation of fatigue, or an elapsed time from the start of a nap at a point in time at which notice is received, and according to individual characteristics. These pieces of advance information are difficult to give a direct recovery time, but serve as an influential factor of awakening recovery. Therefore, available observable information is used as an affector for the estimation of awakening recovery time.

Logs of these pieces of driver information acquired by the driver information acquisition unit 201 are acquired according to these states of a driver, and further an awakening state is observed on the basis of a trigger such as the reception of recovery notice or the approach of a target takeover event. In a case where a driver wears and uses an observable device such as a watch, for example, the observation of a long-term log may include a life log before getting in a vehicle. In this case, information relating to an advance rest state or a state of an excessive sleep or a lack of sleep can also be used as help for determination. In normal use in a case where advance log acquisition is not available, a user can get in a vehicle and can observe a degree of loss of attention, such as fatigue or drowsiness, from a variety of sensors mounted on the vehicle, for example, by evaluating the Lorentz plot of an electrocardiogram, can also estimate a tension state or a fatigue state from information relating to a heartbeat, pulse waves, or the blood flow, blood pressure, and further a medium-term and long-term change log of respiration or exhalation/body odor, and can also estimate a state of the driver by analyzing an utterance tone or a response delay of the user in a verbal (inquiry) response with the system. Moreover, means for analyzing an action, such as a facial expression, facing downward, or the occurrence of an inattentive driving state, can also be employed.

Furthermore, a state may be determined by evaluating the speediness of gesture to determine an instruction response characteristic or performing active evaluation of an amount of activity.

A log of the driver information acquired by the driver information acquisition unit 201 is observed in advance, as described above, and an awakening recovery affector is monitored in advance. In order to perform final takeover determination, an internal awakening state needs to be determined with a high degree of accurateness. When awakening and recovery from automatic driving to manual driving of a driver is viewed from another viewpoint, the driver's state changes in time series according to the sequence described below.

1. The occurrence of an event requiring takeover is acknowledged,
2. A required situation that follows the necessity of takeover is grasped and acknowledged, and
3. In the case of sound notice, the grasp and acknowledgement of notice include a response to the notice, and the response is rising, acknowledgement and confirmation using a switch, a response and confirmation using gesture, detection using action acknowledgement of placing the hand on the steering wheel, or the detection of driver's seat seating recovery.
4. Normally, it is assumed that a driver that has received recovery notice and has finally returned to a recovery posture performs a procedure of grasping and examining a situation required for recovery to manual driving and starts the steering of a device before the driver starts to operate a steering device such as a steering wheel, a brake, or an accelerator, and therefore one of principal information acquisition means is the acquisition of visual information.
5. When the driver can visually acknowledge a situation, the driver starts to operate an appropriate steering device. However, for safety, the system does not instantaneously take over the entirety of steering, but performs a procedure of gradually advancing takeover to a stage in which the driver's appropriate intervention in steering and a muscular steering response situation can be confirmed.

The driver information acquired by the driver information acquisition unit 201 includes a function of observation in this series of processes.

It has been described that the driver information acquired by the driver information acquisition unit 201 further grasps the visual situation, and in Process 4. described above, but it is not until visual acknowledgement, determination, and planning are further performed that manual steering is prepared. By only capturing information required for determination in a central field of view of a line-of-sight, a driver fails to determine and plan a steering action to be taken. Therefore, a line-of-sight is directed to a target required for risk determination, the target is normally captured by a peripheral field of view, and a central field of view=the line-of-sight is directed to the direction. Therefore, a speedy action of a swing of the eyeballs due to saccade occurs. When the target is positioned in the central field of view of the line-of-sight, fixation is principally started in order to advance understanding of the target, and when the determination of the target is completed by referring to knowledge information within the brain while grasping the features of the target, understanding is ignited. Then, when the understanding of the target is completed, a saccade action of the eyeballs is taken in a new direction in which the grasp of a next target to be grasped simultaneously and in parallel is advanced, or pursuit tracking rotation for canceling a movement in a relative direction is performed in order to advance the determination of an action of the grasped target.

Stated another way, when determination is performed in a cycle of a wide-area saccade search that appears as these visual information search actions of the eyeballs, a pursuit action of tracking a flow according to traveling, a fixation slight movement that occurs in fixation in which a line-of-sight stays until acknowledgement of a body to be viewed of interest to which the line-of-sight is directed, the initial visual acquisition of its range, fluctuation stability, a staying time for saccade to a point of interest, or the like, and a confirmation fixation slight-movement of knowledge acknowledgement and acknowledgement settlement, that is, a slight time delay in which the ignition of determination occurs is affected by an amount of activity within the brain, and there is also a phenomenon in which the influence can be observed in a short term. Here, in particular, in a visual reflection action, it is assumed that an individual driver refers to their own visual memory, starts risk determination from soft information that has started to be grasped, and supplements additional supplementary information required to settle determination while fixation and a slight movement are performed in an unconscious state, until risk determination is performed. Therefore, a sequence of evaluating initial visual information immediately after a swing of the eyeballs due to saccade and elaborately repeating driving action determination in an unconscious state to settle determination required to continue driving, and repeating saccade for the acquisition of information to be checked next is intermittently repeated. Then, a task of acquiring information required for driving steering is an action under awakening and acknowledgement, and therefore this series of behaviors of the eyeballs appears as a detailed behavior of the eyeballs that strongly reflects with a recovery level of an internal awakening state that driving requires for manual recovery.

Moreover, the driver information acquisition unit 201 also includes an operation information acquisition unit that acquires driver operation information. These include, for example, a camera that captures a face image of the driver, an operation information acquisition unit of each operation unit (a steering wheel, an accelerator, a brake, or the like), or the like.

The environmental information acquisition unit 202 acquires various types of environmental information.

Examples of the environmental information acquired by the environmental information acquisition unit 202 include an image, depth information, or three-dimensional structure information from an imaging unit provided in the movement device 200, topographical information from a sensor, such as a LiDAR, that is provided in a moving body, positional information from the GPS, information from a communication device provided in infrastructure, e.g., a road, such as a state of a traffic light or information relating to a sign, and the like.

The driver personal identification information acquisition unit 203 acquires information that can be employed in personal authentication such as iris authentication, fingerprint authentication, vein authentication, or voiceprint authentication, for example.

Note that configurations of the driver information acquisition unit 201, the environmental information acquisition unit 202, and the driver personal identification information acquisition unit 203 that are illustrated in FIG. 17 correspond to respective configurations of the data acquisition unit 102 and the detection unit 131 in the configuration illustrated in FIG. 4.

The safety determination unit 210 includes a learning processing unit 211, a safety determination processing performing unit (a manual driving recovery available time estimation unit) 212, and a personal authentication processing unit 213.

The personal authentication processing unit 213 receives, as an input, personal authentication information in, for example, iris authentication, fingerprint authentication, vein authentication, voiceprint authentication, or the like that has been acquired by the driver personal identification information acquisition unit 203, and performs personal authentication processing.

Registration information required in this authentication processing is acquired from the storage 240 or the server 300.

For example, when a driver gets in an automobile serving as a movement device, personal authentication is performed as personal identification processing. Driver information, time, a driving input, and environmental information of a road or the like after personal identification are constantly or regularly recorded, and are transmitted to the server 300.

Note that information that has been input from the driver personal identification information acquisition unit 203 and can be employed in personal authentication such as iris authentication, fingerprint authentication, vein authentication, or voice print authentication, for example, may be transmitted to the server 300, and personal authentication processing may be performed by the server 300 by using information registered in the server 300.

The learning processing unit 211 receives, as an input, the driver information acquired by the driver information acquisition unit 201, the environmental information acquired by the environmental information acquisition unit 202, and the like, and performs learning processing for safety determination employing these pieces of input information.

Specifically, for example, a learning device that enables the calculation of a "safety index value" or a "manual driving recovery available time estimation value" that corresponds to the "driver information" or the "environmental information" is constructed. Note that the learning device not only performs learning to perform determination that is limited to characteristics peculiar to a driver, but also learns characteristics according to vehicle characteristics, environmental characteristics, or the like. For example, when a driver that has been identified as the same driver performs driving in consideration of the safety of a steering characteristic in a passenger car for commutation using a private vehicle and a vehicle behavior characteristic of a vehicle connected with a heavy load in occupation engagement, a steering start point, an amount of braking, or the like according to a traveling situation significantly changes. Therefore, by learning a factor of a variation factor that contributes to their safety, an optimized learning device including a situation or vehicle characteristics can be obtained.

Note that the learning device refers to a set of a model, an algorithm, a parameter, and the like that enables an input/output relationship to be learnt by using machine learning. There are a variety of names such as a statistical learning device, a learning model, a machine learning model, a statistical learning model, a predictor, a prediction model, an estimator, or an estimation model, but all of them have substantially the same meaning, and therefore the name "learning device" is adopted here. A name such as "classifier", "classification model", "identification device", "identification model", "regression learning device", "regression learning model", or "generation model" may be used according to specific purposes, but the name "learning device" is a broad concept including all of these concepts.

A safety determination processing performing unit 212 receives, as an input, the driver information acquired by the driver information acquisition unit 201, the environmental information acquired by the environmental information acquisition unit 202, and the like, further uses a learning device serving as a result of learning performed by the learning processing unit 211 or a learning device acquired from the server 300, and calculates a safety index value based on driver information and environmental information in the present moment.

Moreover, the time required before safe manual driving recovery (=a manual driving recovery available time) is estimated.

Note that the time required before safe manual driving recovery is calculated on the basis of the time required for a driver to start manual driving at a high fixed ratio before arrival at a point requesting takeover, but is never the time calculated by directly evaluating safety. A timing at which it is requested that preparation for recovery to manual driving be started is affected by a variety of factors such as a motion characteristic of a corresponding vehicle, a road environment situation, or weather, and therefore safety can be maximized by considering these influences.

The notice controller 221 controls a notice timing of manual driving start request notice, as described above with reference to FIG. 2, on the basis of the manual driving recovery available time estimated by the safety determination processing performing unit 212, and gives notice via the notice unit 222.

Note that the notice unit 222 includes, for example, an alarm, a display on a window, a vibration processing performing unit of a steering wheel or a seat, or the like.

The communication unit 230 performs communication with an external device such as the server 300.

Next, processing performed by each component of the server 300 is described.

The server 300 includes a learning data acquisition or generation unit 301, a learning processing unit 302, a communication unit 303, and a storage 304.

The learning data acquisition or generation unit 301 acquires or generates learning device input/output data that is required to construct the learning device. Specifically, for example, the "driver information" or the "environmental information" is acquired from various movement devices that are connected to a network. Moreover, for example, data for learning based on various types of data that can be acquired, such as map data, accident occurrence situation data, or traffic jam data, is generated. Note that the expression "learning device input/output data" is used here, but this is what is called teaching data, training data, or the like in supervised learning. If only a desired input/output relationship can be learnt, a learning possibility using another method such as unsupervised learning, semi-supervised learning, or reinforcement learning is not excluded, and therefore the generic name "learning device input/output data" is used here.

These pieces of data are stored in the storage 304.

The learning processing unit 303 performs learning processing using the learning device input/output data that has been acquired or generated by a learning device input/output data acquisition or generation unit 301 and has been stored in the storage 304.

As a result of this learning processing, for example, learning device input/output data that enables the calculation of the "safety index value" or the "manual driving recovery available time estimation value" that corresponds to the "driver information" or the "environmental information" is constructed.

Next, details of processing performed by the safety determination unit 210 of the movement device 200 are described.

The safety determination unit 210 includes a learning processing unit 211, a safety determination processing performing unit (a manual driving recovery available time estimation unit) 212, and a personal authentication processing unit 213.

The learning processing unit 211 receives, as an input, the driver information acquired by the driver information acquisition unit 201 and the environmental information acquired by the environmental information acquisition unit 202, and performs learning processing for safety determination employing these pieces of input information.

The safety determination processing performing unit (the manual driving recovery available time estimation unit) 212 receives, as an input, the driver information acquired by the driver information acquisition unit 201, the environmental information acquired by the environmental information acquisition unit 202, and the like, further uses a learning device serving as a result of learning performed by the learning processing unit 211 or a learning device acquired from the server 300, and calculates a safety index value based on driver information and environmental information at the present time.

Moreover, the time required before safe manual driving recovery (=a manual driving recovery available time) is estimated.

Note that, in an initial state where learning device input/output data does not exist and a learnt learning device fails to be acquired from the learning processing unit 211, the safety determination processing performing unit (the manual driving recovery available time estimation unit) 212 acquires, from the storage 240, a learning device that has been learnt by using, for example, an unspecified large number of pieces of data that have been experimentally acquired in advance, and performs safety index value calculation processing or manual driving recovery available time estimation processing by using this learning device.

Alternatively, a prescribed and fixed manual driving recovery available time is output as an estimation value.

Note that a learning device that has been generated in learning processing using an unspecified large number of pieces of data can also be acquired from the server 300.

After the learning processing has been performed by the learning processing unit 211, safety index value calculation processing based on driver information and environmental information that have been input or manual driving recovery available time estimation processing are performed by using the learning device.

The learning processing unit 211 performs learning processing for constructing a correspondence relationship, for example, between pieces of information (a) and (b) described below:

(a) the driver information acquired by the driver information acquisition unit 201 and the environmental information acquired by the environmental information acquisition unit 202; and (b) operation information indicating whether or not a driver has been able to perform driving in a safe state after switching notice from the automatic driving mode to the manual driving mode.

Note that, as described above, the driver information acquisition unit 12 also has, for example, a function of acquiring driver operation information, namely, information relating to an operation performed on each operation unit (a steering wheel, an accelerator, a brake, or the like), in addition to information acquisition processing for determining a degree of awakening of the driver.

Stated another way, the learning processing unit 211 acquires the driver information and the environmental information, acquires driving operation information of a driver after manual driving recovery request notice has been given, as described above with reference to FIG. 2, at a certain timing, and checks whether or not safe driving is being performed.

If safe driving is being performed, it is determined that a notice timing of manual driving recovery request notice may be further delayed in a case where the same driver information and the same environmental information are acquired.

In contrast, if safe driving is not being performed, it is determined that the notice timing of the manual driving recovery request notice is to be advanced in a case where the same driver information and the same environmental information are acquired.

In learning processing performed by the learning processing unit 211, a learning device for determining such a notice timing of the manual driving recovery request notice is constructed.

Note that, in learning processing performed by the learning processing unit 211, a learning device that can be employed in processing for determining whether or not a driver can perform safe manual driving in a case where certain driver information and environmental information have been acquired, namely, a learning device in which "driver information and environmental information" and the "safety index value" have been associated with each other, is also constructed in addition to data that is employed to determine a notice timing of the manual driving recovery request notice.

By acquiring a transition from a recovery notice advance characteristic of a driver that occurs every time an event occurs, and by performing success/failure determination or takeover quality evaluation by also using, as teaching data, (b) operation information indicating whether or not the driver has been able to perform driving in a safe state, a system including a self-contained learning device is achieved, and precision can be improved, as a feature of the learning device.

As described above, in learning processing performed by the learning processing unit 211, safety index value data can be obtained that is associated with the driver information acquired by the driver information acquisition unit 201 and the environmental information acquired by the environmental information acquisition unit 202.

Moreover, a manual driving recovery available time (the time required before safe manual driving recovery) can be calculated that corresponds to the driver information acquired by the driver information acquisition unit 201 and the environmental information acquired by the environmental information acquisition unit 202.

A notice time of manual driving start request notice given to a driver can be determined on the basis of this manual driving recovery available time.

Result data of learning processing performed by the learning processing unit 211 is stored in the storage 240.

Data (a learning device and/or learning device input/output data) that is stored in the storage 240 includes, for example, the pieces of data described below.

The following pieces of data can be accumulated in the storage 240:

- safety index value data associated with driver information and environmental information;
- a manual driving recovery available time (the time required before safe manual driving recovery) (=optimum advance notice time of a manual driving start request) that is associated with driver information and environmental information;
- an abnormality in driver information after manual driving start request notice, an abnormality in environmental information, and the time required for recovery; and
- a learning device.

Data accumulated in the storage 240 is regularly transmitted to the server 300.

The server 300 stores data received from the movement device 200 in the storage 304, and further performs learning processing based on the received data in the learning data generation unit 301.

The server 300 can receive a large amount of data from a large number of movement devices (automobiles), and can perform learning processing based on this large amount of data. As a result of this, input/output data (a learning device) having higher versatility and higher accuracy can be obtained.

The server 300 performs learning processing based on a large amount of data to update a learning device, and stores the learning device in the storage 304 of the server 300.

The learning device stored in the storage 304 of the server 300 includes data that is similar to data stored in the storage 240 of the movement device 200 described above. Stated another way, the following pieces of data are stored in the storage 304 of the server 300:

- a learning device;
- safety index value data associated with driver information and environmental information;
- a manual driving recovery available time associated with driver information and environmental information (the time required before safe manual driving recovery) (=optimum advance notice time of a manual driving start request); and
- an abnormality in driver information after manual driving start request notice, an abnormality in environmental information, and the time required for recovery.

These learning devices stored in the storage 304 of the server 300 are provided to the movement device 200 at any time, and are used to calculate a safety index value based on the driver information acquired by the driver information acquisition unit 201 and the environmental information acquired by the environmental information acquisition unit 202, the manual driving recovery available time, or the like in the safety determination processing unit 212 of the safety determination unit 210 of the movement device 200.

Note that the learning processing unit 211 can generate a learning device that enables the prediction of a safety index value associated with an individual, an automobile (a vehicle type or the like), or time or the manual driving recovery available time by including personal identification information, vehicle type information, time information, or the like in learning data.

The personal identification information can be acquired via the personal authentication processing unit 213.

The vehicle type information can be acquired from the environmental information acquisition unit 202. Alternatively, a configuration in which data stored in a storage in advance is used may be employed.

The safety determination processing performing unit (the manual driving recovery available time estimation unit) 212 employs the learning device calculated as a result of learning processing performed by the learning processing unit 211 to acquire the manual driving recovery available time, and gives manual driving recovery request notice based on the acquired manual driving recovery available time.

Moreover, the learning processing unit 211 acquires a driver's driving operation information after this notice, from the driver information acquisition unit 201 and the environmental information acquisition unit 202, and determines whether or not normal driving is being performed.

According to this determination, a learning device is updated and/or relearning is performed to enable an output, for example, in such a way that notice time is advanced in a case where an abnormality occurs with high frequency and notice time is delayed in a case where an abnormality occurs with low frequency. This updating/or relearning processing also enables notice time control.

Next, a specific example of manual driving recovery available time estimation processing that is performed by the safety determination processing unit 212 of the safety determination unit 210 of the movement device 200 is described.

As described above, during automatic driving, a driver can perform various types of processing (secondary tasks), and a degree of awakening significantly changes according to a secondary task that is being performed.

For example, a simple release of hands from a steering wheel includes a case where a driver is gazing at the front of an automobile, similarly to the time of driving, a case where the driver is reading a book, or a case where the driver is dozing. A degree of awakening (a level of consciousness) of the driver changes due to a difference among these pieces of processing.

For example, if a driver dozes, a degree of awakening of the driver deteriorates. Stated another way, a level of consciousness has deteriorated. In a state where a degree of awakening has deteriorated, as described above, normal manual driving fails to be performed. If switching to the manual driving mode is performed in this state, in the worst case, there is a possibility of the occurrence of an accident.

Accordingly, in order to perform manual driving recovery available time estimation processing performed by the safety determination processing unit 212, it is preferable that the driver information acquisition unit 201 acquire information that enables the checking of a driver's secondary task performing situation during the performance of automatic driving and the learning processing unit 211 perform learning processing using these pieces of data.

It is preferable that a configuration of the driver information acquisition unit 201 for this purpose include a camera provided to observe an inside of a vehicle, a pressure sensor provided in a steering wheel or a seat, a temperature sensor, or the like.

The learning processing unit 211 calculates results of face authentication, head posture estimation, line-of-sight estimation, body posture estimation, and action identification, by using an image obtained from the camera, and uses these pieces of data in learning processing.

When a secondary task is performed, management is performed with additional information added in such a way that it is known that input information has been acquired in an automatic driving state. In recovery from the secondary task, information needs to be presented to a driver earlier by a recovery available time calculated according to an arbitrary method in such a way that the driver returns to a manual driving state. At a point in time at which data for the estimation of the manual driving recovery available time has not been sufficiently collected, recovery notice needs to be given at a time that reliably enables recovery. Because personal characteristics have not yet been learnt, information is presented by using a fixed definition time that does not depend on information relating to the personal characteristics. With regard to this fixed definition time, a definition time for recovery at a target success rate may be set on the basis of, for example, statistical data obtained by performing statistical evaluation on the basis of use results data of various driver population, acquiring, in advance, a time period during which an estimation user has been able to succeed in takeover at a fixed ratio, and causing a driver population average of recovery delay times collected in advance to be learnt in advance offline or the like.

Furthermore, in using this regular time, a user who uses a system for the first time is cautious, and therefore offset setting considering this characteristic may be performed.

At this time, a time period from the presentation of information to recovery to manual driving is measured every time a takeover event occurs, and is recorded and settled as a manual driving recovery available time in the form of a record log.

Furthermore, in determining that recovery to manual driving has been made, an advance learning result may be referred to. If similar execution is repeated, data for the estimation of the recovery available time relating to a specified individual and a specified vehicle can be collected.

In a case where data for the estimation of the safety index value or the estimation of the manual driving recovery available time has been sufficiently collected, a learning device that predicts the safety index value or an optimum recovery available time can be constructed by performing machine learning processing using, for example, the following input/output data.

Input: driver information, environmental information, or the like

Output: a safety index value or a manual driving recovery available time

Furthermore, in a peculiar recovery characteristic that has been peculiarly authorized, in some cases, a recovery time changes according to a driver's driving experience in the past or environmental conditions. The time required for recovery after preparation for recovery is not unique depending on a situation, such as a situation where a field of view is poor due to rainy weather, a night situation, a state where an obstacle to a field of view can go in backlight, a situation where cumulative fatigue is accumulated early in the morning or in the evening, an action of the same driver at the use of a private car in commutation, or vehicle characteristics of a driving large-size bus or a cargo loading vehicle, for example. Hereinafter, these many situation-factor factors are examples, and these factors are roughly classified into two groups, and are referred to as "driver information" or "environmental information".

Next, a sequence example of learning processing performed by the learning processing unit 211 of the movement device 200 and the learning processing unit 302 of the server 300 is described with reference to the flowchart illustrated in FIG. 18.

As described above, the learning processing unit 211 of the movement device 200 and the learning processing unit 302 of the server 300 construct a learning device that enables the calculation of the "safety index value" or the "manual driving recovery available time estimation value" that corresponds to the "driver information" or the "environmental information".

First, in step S21, "driver information" or "environmental information" is input.

Next, in step S22, a driver's operation information after the start of manual driving started due to manual driving start request notice is acquired from the driver information acquisition unit, and a safety index value according to whether or not a safe operation is being performed is calculated.

As described above, the driver information acquisition unit 12 also has a function of acquiring driver operation information, namely, information relating to operation performed on each operation unit (a steering wheel, an accelerator, a brake, or the like), in addition to information acquisition processing for determining a degree of awakening of the driver.

Note that, in the safety index value calculation processing of step S22, processing for calculating a safety index value may be performed by using, for example, specific event handling information or accident information in addition to the driver operation information. For example, a configuration may be employed in which the safety index value is calculated by using event handling information that corresponds to time or road information, or the like in addition to the "driver information" or the "environmental information". The event handling information, by continuously monitoring a driving steering situation as a driver's accurate steering determination evaluation level, comprehensive steering safety evaluation is continuously performed with respect to a variation amplitude, a change in generated acceleration in steering correction, e.g., whether or not a steering wheel operation for correction has been performed at an appropriate timing if traveling in which a vehicle deviates from a traveling lane is started, whether or not delay has been observed in steady observation, whether or not an over-correction action has occurred, whether or not a correction cut space has irregularly occurred, and the like, for example.

Once a system starts to commit a driver to control a vehicle system, the driver inputs steering intention with a steering wheel, a brake, or an accelerator. Therefore, as is apparent from the example described above of correction steering of steering, the system can start to evaluate a difference between ideal speed-per-hour traveling control that the system has determined to be desirable in steering and control performed by the driver, and therefore a degree-of-awakening recovery level of the driver can be quantitatively evaluated from a steering validity of the driver. It is in a stage in which system control has been committed to the driver that the system has completed steering intervention. As a result, the system can acquire a log data set including a history and success/failure of what are called "driver information" and "environmental information" such as a driver's state, a vehicle state, or an environmental state before the start of takeover, an actual delay time required for normal takeover, or a quality evaluation log of steering at the time of the start of takeover, further, a recovery behavior characteristic change curve required for complete recovery, and the like.

In step S23 that follows, input/output data including correspondence data between input information (the driver information, the environmental information, or the like) and the safety index value is generated, and a learning device is updated. An occurrence event is scheduled takeover in traveling planning or an event that newly occurs during traveling time, and they do not always need to be distinguished from each other. An observation value that has been acquired in advance before recovery and that occurs due to the repetitive use of a vehicle and a set of logs of the determination of the success/failure of a takeover result and further the determination of success, avoidance, and quality are acquired as a learning data set.

The processes of steps S21 to S23 are repeatedly performed, and a learning device that includes correspondence data between the input information (the driver information, the environmental information, or the like) and the safety index value is sequentially updated by using a large amount of learning data.

The process of step S24 is a process in a case where a learning device has been constructed by the learning processing unit 302 of the server 300.

In step S24, the latest learning device generated by the server 300 is transmitted to a movement device (an automobile).

Note that the flow illustrated in FIG. 18 is a flow of processing for generating a learning device that includes correspondence data between "driver information, environmental information, or the like" and "safety index value". Moreover, a processing sequence in a case where a learning device for input/output data in which "manual driving recovery available time" is associated with "driver information, environmental information, or the like" is described with reference to the flow illustrated in FIG. 19.

First, in step S31, "driver information" or "environmental information" is input.

Next, in step S32, the time from manual driving start request notice time to the start of manual driving is measured.

Next, in step S33, a driver's operation information after the start of manual driving is acquired from the driver information acquisition unit, and a safety index value according to whether or not a safe operation is being performed is calculated.

Note that, in the safety index value calculation processing of step S33, processing for calculating a safety index value may be performed by using, for example, specific accident information in addition to the driver's operation information. For example, a configuration may be employed in which the safety index value is calculated by using accident information that corresponds to time or road information, or the like in addition to the "driver information" or the "environmental information".

In step S34 that follows, the elapsed time from notice time to manual driving start time (a manual driving recovery available time) that is required to cause a safety index value based on operation information after the start of manual driving to be greater than or equal to a fixed value (safe) is calculated.

In step S35 that follows, input/output data that includes correspondence data among input information (the driver information, the environmental information, or the like), the safety index value, and the manual driving recovery available time is generated, and a learning device is updated.

The processes of steps S31 to S35 are repeatedly performed, and a learning device that is configured by using correspondence data among the input information (the driver information, the environmental information, or the like), the safety index value, and the manual driving recovery available time is sequentially updated by using a large amount of learning data.

The process of step S36 is a process in a case where a learning device has been constructed by the learning processing unit 302 of the server 300.

In step S36, the latest learning device generated by the server 300 is transmitted to a movement device (an automobile).

An example of the input/output data of the learning device that has been generated in this learning device construction processing is illustrated in FIG. 20.

The data illustrated in FIG. 20 is learning device input/output data configured by correspondence data among input information (the driver information, the environmental information, or the like), the safety index value, and the manual driving recovery available time.

Note that the driver information or the environmental information includes a plurality of observation values (parameters) that is acquired by a plurality of sensors different from each other.

Stated another way, the driver information or the environmental information includes a set of a plurality of parameters.

A safety index value in the example illustrated in FIG. 20 is an example that has been set by using values of 0 to 1, 0 (dangerous) to 1 (safe).

This is an example, and as described above, binary setting of 0 (dangerous) and 1 (safe) or another numerical value range can also be employed.

A manual driving recovery available time estimation value is a time calculated in the process of step S34 in the flow of FIG. 19 described above. Stated another way, this is a calculation value of the elapsed time from notice time to manual driving start time (a manual driving recovery available time) that is required to cause a safety index value based on operation information after the start of manual driving to be greater than or equal to a fixed value (safe).

The safety determination processing performing unit (the manual driving recovery available time estimation unit) 212 of the safety determination unit 210 illustrated in FIG. 17 uses such a learning device, and estimates a safety index value that corresponds to input information, e.g., driver information, environmental information, or the like, or a manual driving recovery available time.

Manual driving recovery available time estimation processing employing a learning device is performed, for example, as the following processing.

The safety determination processing performing unit (the manual driving recovery available time estimation unit) 212 receives, as an input, the driver information acquired by the driver information acquisition unit 201, the environmental information acquired by the environmental information acquisition unit 202, and the like.

Moreover, a learning device serving as a result of learning performed by the learning processing unit 211 or a learning device acquired from the server 300, namely, a learning device that has been learnt by using input/output data having the data configuration illustrated in FIG. 20, is used, and the time required before safe manual driving recovery (=a manual driving recovery available time) is estimated on the basis of driver information and environmental information at the present time.

Note that the data illustrated in FIG. 20 includes correspondence data between "driver information and environmental information" and "safety index value and manual driving recovery available time", but this is an example. For example, by including, in data, personal identification information, vehicle type information, time information, or the like, a learning device can be generated that includes a safety index value or a manual driving recovery available time that is associated with an individual, an automobile (a vehicle type or the like), or time.

Furthermore, similarly in a case where the same person gets in a vehicle that is different, for example, in a vehicle type, by providing a correlation of input information for each vehicle, similar manual driving recovery available time estimation can be performed. By newly collecting information for the vehicle and performing additional learning, the precision of prediction can be further improved. The present technology can be applied to manual driving recovery available time prediction adapting to a vehicle in addition to recovery available time prediction adapting to an individual.

Furthermore, in a case where a plurality of persons gets in one vehicle, a learning device may be constructed that calculates a recovery available time estimation value that is associated with members of a driver and fellow passengers who get in the vehicle.

By employing such a configuration, an optimum manual driving recovery available time according to members of a driver and fellow passengers who get in a vehicle can be predicted.

As described above, by performing processing in consideration of a driving history, an accident history, and driving operation information after the start of manual driving of a driver that serve as information relating to an individual driver, information relating to the type of an automobile, or the like or learning processing using information relating to the number of passengers or loaded freight, a learning device according to various situations can be generated.

Note that, in a case where many types of information are used, a configuration may be employed in which the many types of information are used in a state where the many types of information have been divided for advance learning and for online learning in accordance with data characteristics.

6. Sequence of Processing Performed by Movement Device and Information Processing Device According to the Present Disclosure Next, a sequence of processing performed by a movement device and an information processing device according to the present disclosure is described.

The flowchart illustrated in FIG. 21 is a flowchart explaining one example of a sequence of processing that an automobile serving as a movement device according to the present disclosure performs at the time of switching from the automatic driving mode to the manual driving mode.

In step S41, the movement device observes an event of the occurrence of a switching request from the automatic driving mode to the manual driving mode.

This observation information is acquired on the basis of, for example, LDM information of a road environment.

Stated another way, acquisition is performed on the basis of what is called local dynamic map (LDM) information in which high-density traveling map information of a road on which a vehicle travels is constantly updated.

As a specific example, for example, in a case where a schedule of starting invasion from an expressway to a public road has been acquired on the basis of an LDM, the determination of an event of the occurrence of a switching request from the automatic driving mode to the manual driving mode is performed.

Next, in step S42, an observation value is acquired. This observation value acquisition processing is performed, for example, by the driver information acquisition unit 201, the environmental information acquisition unit 202, and the driver personal identification information acquisition unit 203 that are illustrated in FIG. 17. Note that these configurations correspond to respective configurations of the data acquisition unit 102 and the detection unit 131 in the configuration illustrated in FIG. 4.

As described above, the driver information acquisition unit 201 includes a camera or a variety of sensors, and acquires a driver's information, e.g., information for determining a degree of awakening of the driver. Examples include a line-of-sight direction, an eyeball behavior, and the pupil diameter that are acquired from an image including an eyeball area, a facial expression acquired from an image including a face area, and the like. The driver information acquisition unit 201 further acquires information relating to an operation performed by the driver on each operation unit (a steering wheel, an accelerator, a brake, or the like).

The environmental information acquisition unit 202 acquires, for example, an image, depth information, or three-dimensional structure information from an imaging unit provided in the movement device, topographical information from a sensor, such as a LiDAR, that is provided in a moving body, positional information from the GPS, information from a communication device provided in infrastructure, e.g., a road, such as a state of a traffic light or information relating to a sign, and the like.

Next, in step S43, a manual driving recovery available time is calculated on the basis of the acquired observation value.

This processing is processing performed by the safety determination processing performing unit (the manual driving recovery available time estimation unit) 212 of the safety determination unit 210 illustrated in FIG. 17.

The safety determination processing performing unit (the manual driving recovery available time estimation unit) 212 receives, as an input, the driver information acquired by the driver information acquisition unit 201, the environmental information acquired by the environmental information acquisition unit 202, and the like. Moreover, a learning device serving as a result of learning performed by the learning processing unit 211 or a learning device acquired from the server 300 is used, and the time required before safe manual driving recovery (=a manual driving recovery available time) is estimated on the basis of driver information and environmental information at the present time.

Here, a learning device to be used is, for example, a learning device that has been learnt by using the input/output data described above with reference to FIG. 20.

Note that, as described above, the data illustrated in 12 is learning device input/output data that includes correspondence data between “driver information and environmental information” and “safety index value and manual driving recovery available time”.

FIG. 20 illustrates an example in which a table has been formed by combining specific parameters on the basis of a combination of driver information and environmental information under the assumption of a combination of input information. However, in practice, a frequency of the occurrence of a peculiar combination event is not so high. Every time, an event occurs as a combination of various circumstances or situations, and therefore information is input multi-dimensionally, and a log of information indicating a driver’s advance situation is not always present. Then, even in the case of an observation value of the same biological information, the delay of determination for performing determining from acquired visual information has an individual difference due to a physical constitution, gestures, experiences, memory, or the like that is peculiar to an individual.

In order to perform more accurate determination in various conditions, a data group including a set of driver information and a safety index is used, and a safety determination device is updated by learning. Conceivable examples of a method for learning include the support vector machine, boosting, the convolutional neural network, the deep belief network, the long short-term memory, and the like. In updating, a newly acquired data group may be added to a data group for advance learning and relearning may be performed, or online learning may be used.

The safety determination processing performing unit (the manual driving recovery available time estimation unit) 212 uses a learning device that has been learnt by using the data illustrated in FIG. 20, and performs prediction by outputting driver information and environmental information as an input. Alternatively, a simple method may be used in which an entry including parameters that are closest to respective parameters of the driver information acquired by the driver information acquisition unit 201 and the environmental information acquired by the environmental information acquisition unit 202 is selected from the data illustrated in FIG. 20 and a manual driving recovery available time estimation value set in the selected entry is acquired.

Note that a learning device to be used in processing for estimating a manual driving recovery available time can be set for each driver, or can be set to include, in observation information, the type of a secondary task during the performance of automatic driving.

In this case, processing (manual driving recovery available time estimation processing) using, as observation information, personal identification information of a driver who is performing driving and information relating to the type of a current secondary task is performed.

Figures 22A, 22B:
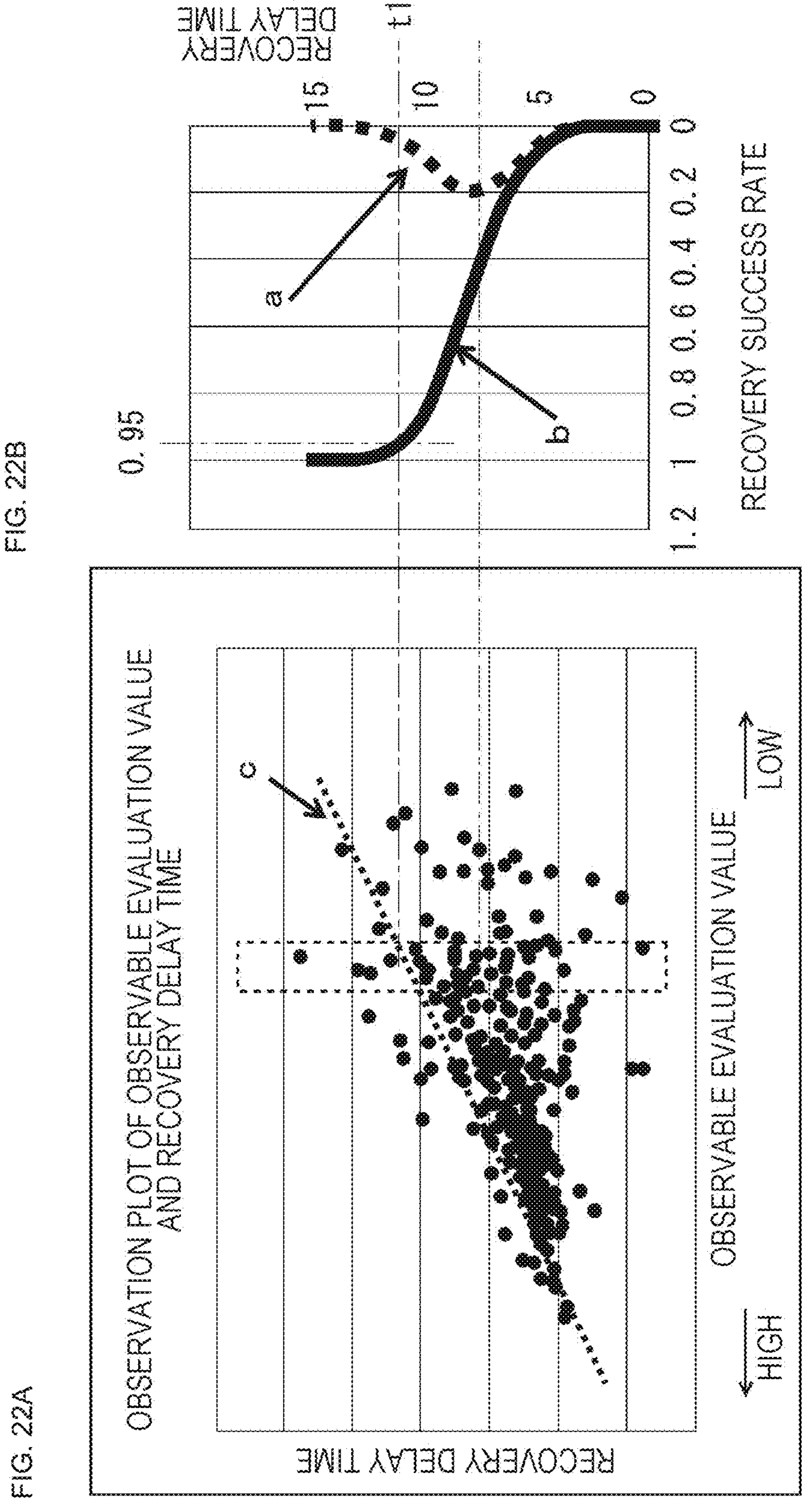
FIG. 22 is a diagram explaining a distribution example of a plurality of pieces of relationship information (observation plots) between an observable evaluation value that corresponds to an observation value and a recovery delay time (=a manual driving recovery available time), and a recovery success rate.

FIG. 22A illustrates one example of a distribution of a plurality of pieces of relationship information (observation plots) between an observable evaluation value that corresponds to an observation value and a recovery delay time (=a manual driving recovery available time). This example corresponds to the type of a certain secondary task of a certain driver. In order to calculate a recovery delay time from this plurality of pieces of relationship information (observation plots), pieces of relationship information (observation plots) in an area (illustrated with a broken-line rectangular frame) that has a fixed width in a direction of an evaluation value direction that corresponds to an acquired observation value are extracted. Dotted line c in the drawing indicates a boundary line at a time when a recovery delay time at a recovery success rate described later of 0.95 in FIG. 22B is observed at different observation values of a driver.

By issuing automatic-to-manual recovery notice or a warning to a driver at a grace time that is longer than dotted-line c, namely, an earlier grace time, an area that secures a success in the driver’s automatic-to-manual recovery at a rate of 0.95 or more is obtained. Note that a target value (a request for a recovery ratio) of a driver’s normal recovery from automatic driving to manual driving at every corresponding time is specified, for example, from the necessity for infrastructure by a road side, and is provided to an individual section passing vehicle.

Note that, in a case where a stop of a vehicle on a traveling road does not cause an obstacle to the surroundings, it is only required to cope by stopping the vehicle and reducing speed to a speed at which the system can cope. Normally, there are not many cases where a stop on a traveling road is desirable. Therefore, a high recovery ratio is desirable as default setting. In particular, on a specified route such as the Metropolitan Expressway, in some cases, an extremely high recovery success rate is obtained by default even if updated information is not purposely given from infrastructure.

FIG. 22B illustrates a relationship between recovery delay times obtained from an extracted plurality of pieces of relationship information (observation plots) and recovery success rates. Here, curve a indicates an independent success rate at each recovery delay time, and curve b indicates a cumulative success rate at each recovery delay time. In this case, recovery delay time t1 is calculated on the basis of curve b in such a way that a prescribed success rate, a success rate of 0.95 in the illustrated example, is obtained.

This calculation processing is performed, for example, by the safety determination unit 210 described above with reference to FIG. 17. For example, this calculation processing is performed by the safety determination unit 210 by using distribution information of a plurality of pieces of relationship information (observation plots) between an observable evaluation value and a recovery delay time that has been stored in the storage 240 and has been acquired in the past.

Figure 23:
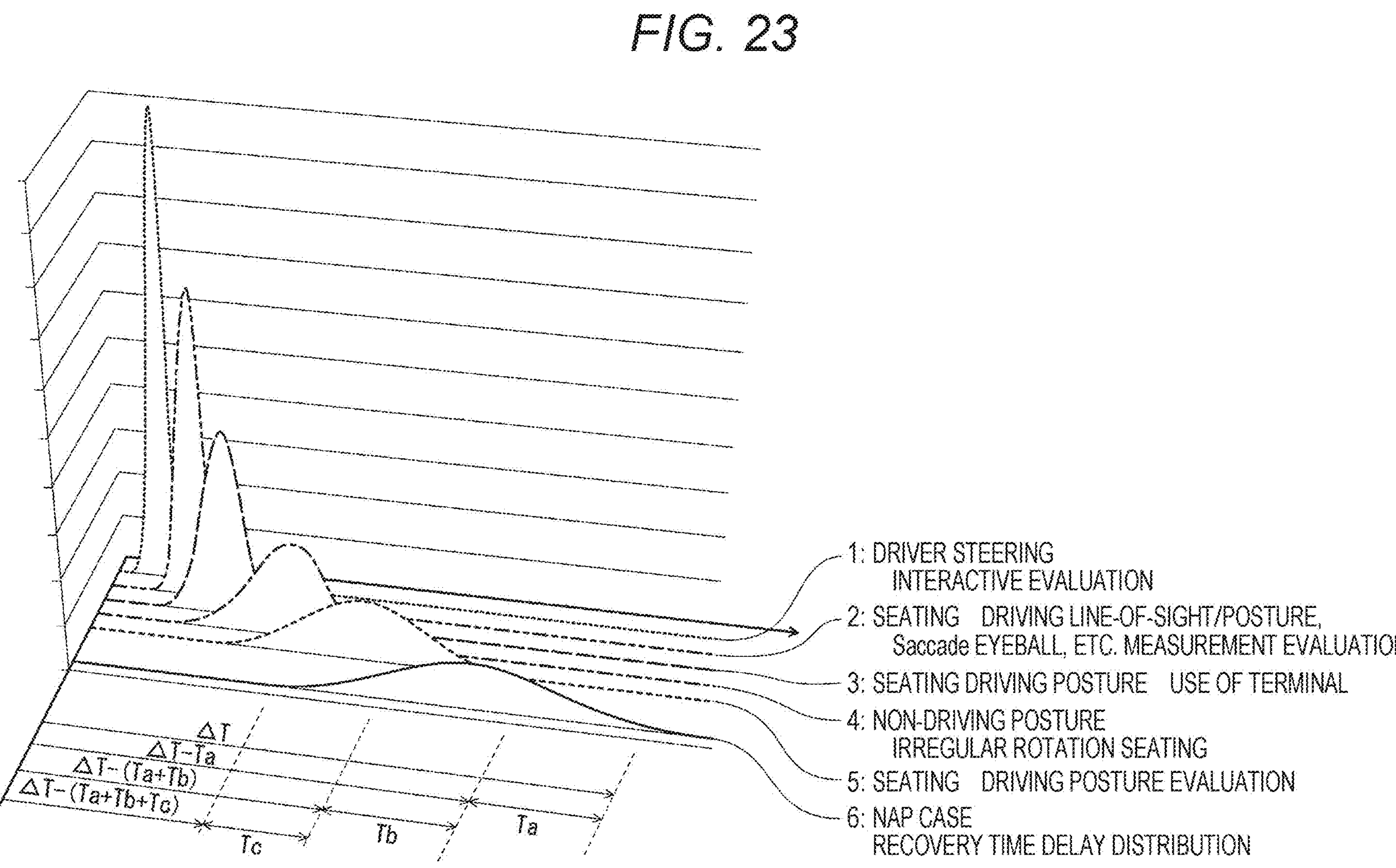
FIG. 23 is a diagram explaining a manual driving recovery available time according to the type of processing (a secondary task) that a driver is performing in the automatic driving mode.

FIG. 23 is a diagram explaining a manual driving recovery available time according to the type of processing (a secondary task) that a driver is performing in a state of separation from a driving steering task in the automatic driving mode.

An individual distribution profile corresponds to curve a that is predicted on the basis of an observation value, namely, a driver’s state, as illustrated in FIG. 22B. Stated another way, for completion at a takeover point from automatic driving to manual driving at a required recovery probability, characteristics in the past that are needed by a driver for recovery are referred to from an observation value that is detected in each stage and enables a degree of awakening of the driver to be evaluated, and whether or not an actual state required for recovery has been reached in each recovery stage is monitored on the basis of time t1 when its profile (the recovery success rate profile of FIG. 22B) has a desired value, until takeover is completed.

For example, an initial curve in the case of a nap is a cumulative average distribution obtained by estimating a sleep level from observation information, such as respiration or pulse waves, that has been passively monitored during a nap period in automatic driving and observing a recovery delay characteristic of a corresponding driver after the issuance of an awakening warning. Each distribution in the middle is determined according to a driver's state that has been observed during a movement recovery procedure after waking up. "6. Nap case" illustrated in the drawing is observed, a right-hand side timing at which an awakening warning is issued in time is determined, and a process in the middle thereafter indicates a recovery time distribution within a recovery budget that is predicted from an observable driver's state evaluation value at a prediction intermediate point.

Non-violation against a remaining takeover limit time limit that sequentially reduces until takeover continues to be observed in the middle, and in a case where there is a risk of violation, speed is reduced, and time postponement generation or the like is performed. Note that, for example, in a distribution at the time of recovery that starts from "4. Non-driving posture irregular rotation seating" without the steps "6. Nap case" and "5. Seating", a recovery process is started from first situation acknowledgement grasping. Therefore, the posture of the same item "4. Non-driving posture irregular rotation seating" that is a state in an intermediate process starting from "6. Nap case" is the same, but a thinking process is in a recovery conscious process. In the case of starting from situation acknowledgement in the posture of "4. Non-driving posture irregular rotation seating" from the beginning, the time of situation acknowledgement is required, and it takes longer.

Note that, in some cases, relationship information between an observable evaluation value and a recovery delay time of a driver who is driving is not sufficiently stored in the storage. In this case, recovery delay time t1 can be calculated by using as assumed distribution information of recovery that has been provided in advance in the storage as recovery characteristic information that has been generated on the basis of information collected, for example, from driver population of the same age. Characteristics peculiar to a driver have not yet been sufficiently learnt, and therefore this recovery information may be used at the same recovery probability on the basis of the information, or a higher recovery success rate may be set. Note that an inexperienced user from an ergonomic viewpoint is more cautious. Therefore, early recovery is expected in an early stage of use, and a driver themselves gradually fits an action in synchronization with notice of a system as the driver becomes accustomed to use. Note that, in the distribution business in which a large number of vehicles are driven, in the business of operation of busses, taxis, or the like, and further in a case where different vehicles are used as a sharing car or a rental automobile, personal authentication may be performed on a driver, observable information and a recovery characteristic of driving may be managed or learnt in a concentrated or distributed manner by a remote server or the like, and remote learning processing or holding may be performed without always holding data relating to the recovery characteristic in an individual vehicle.

Furthermore, a notice timing is important, and therefore description has been provided under the assumption that a recovery success rate is a uniform time before success/failure. However, determination extended to recovery takeover quality may be further performed without limiting the success/failure of manual driving from automatic driving to binary success/failure. Stated another way, a delay time of a recovery procedure transition that reaches actual recovery confirmation, recovery start delay in response to notice, retention in an intermediate recovery action, or the like is recovery within an allowable time, and may be further input as a recovery quality evaluation value to a learning device.

Return now to FIG. 21. In step S44, notice is given to prompt a driver to recover to driving at a notice timing specified by the recovery delay time calculated in step S43, namely, at a timing at which a takeover target event (a takeover section from automatic driving to manual driving or a cautious traveling section from automatic driving) becomes closer to the recovery delay time. This notice is given, for example, as display processing, as described above with reference to FIG. 2. Alternatively, this notice may be given as a sound output or the vibration of a steering wheel or a seat. For example, in a case where a driver is taking a nap, a notice method for waking the driver up from a sleeping state is selected.

Next, in step S45, a transition in recovery of a driver is monitored. Then, in step S46, whether or not driving recovery can be made within the recovery delay time is determined on the basis of a result of monitoring in step S45. When it is determined that driving recovery can be made, the driver makes driving recovery in step S47. Thereafter, in step S48, learning data is updated. Stated another way, one sample value of relationship information (an observation plot) between an observable evaluation value and an actual recovery delay time with respect to the type of an initial secondary task of the driver at the time of the driving recovery described above is added. Thereafter, in step S50, the processing is terminated. Note that, in the present example, description has been provided in which only this plot data that is generated in every event is learnt. However, in practice, learning is determined heavily dependently on a previous state (a history) before an event occurs. Therefore, by performing multi-dimensional learning, the precision of estimation of a recovery delay required time from a driver's state observation value may be further improved.

Furthermore, when it is determined in step S46 that driving recovery will fail to be made, the starting of a sequence of deceleration, traveling slowly, and retreat to the stopping of a vehicle is performed in step S51. Next, in step S52, a record of a penalty of a takeover defect event is issued, and the processing is terminated. Note that this record of the penalty is stored in the storage.

7. Configuration Example of Information Processing Device

The processing described above can be performed by employing the configuration of the movement device that has been described with reference to FIG. 4. However, part of the processing can be performed, for example, by an information processing device that can be attached to the movement device.

A hardware configuration example of such an information processing device is described with reference to FIG. 24.

FIG. 24 is a diagram illustrating a hardware configuration example of an information processing device.

A central processing unit (CPU) 501 functions as a data processing unit that performs various types of processing according to a program stored in a read only memory (ROM) 502 or a storage 508. For example, processing according to the sequence described in the example described above is performed.

A random access memory (RAM) 503 stores a program executed by the CPU 501, data, or the like. The CPU 501, the ROM 502, and the RAM 503 that are described above are mutually connected via a bus 504.

The CPU 501 is connected to an input/output interface 505 via the bus 504, and the input/output interface 505 is connected to an input unit 506 that includes various switches, a keyboard, a touch panel, a mouse, a microphone, a situation data acquisition unit such as a sensor, a camera, or the GPS, and the like and an output unit 507 that includes a display, a speaker, or the like.

Note that input information from a sensor 521 is also input to the input unit 506.

Furthermore, the output unit 507 outputs drive information to a drive unit 522 of the movement device.

The CPU 501 receives, as an input, a command, situation data, or the like that has been input from the input unit 506, performs various types of processing, and outputs a processing result, for example, to the output unit 507.

The storage 508 that is connected to the input/output interface 505 includes, for example, a hard disk or the like, and stores a program executed by the CPU 501 or various types of data. A communication unit 509 functions as a transmission/reception unit of data communication via a network such as the Internet or a local area network, and performs communication with an external device.

A drive 510 that is connected to the input/output interface 505 drives a removable medium 511 such as a magnetic disk, an optical disk, a magneto-optical disk, or a semiconductor memory, e.g., a memory card, and records or reads data.

8. Summary of Configuration According to the Present Disclosure

Examples of the present disclosure have been described in detail above with reference to specified examples. However, it is obvious that those skilled in the art could make modifications or substitutions to the examples without departing from the gist of the present disclosure. Stated another way, the present invention has been disclosed in the form of an example, and are not to be construed as limitations. In order to determine the gist of the present disclosure, the claims should be considered.

Note that the technology disclosed herein can employ the configuration described below.

(1) An information processing device including:

a safety determination unit that receives, as an input, driver information and environmental information, and calculates a safety index value indicating whether or not a driver in a vehicle during automatic driving is in a state of being able to perform safe manual driving.

(2) The information processing device described in (1), in which the safety determination unit performs:

receiving, as the input, the driver information and the environmental information, and estimating a manual driving recovery available time including a time required until the driver in the vehicle during the automatic driving becomes able to start the safe manual driving.

(3) The information processing device described in (1) or (2), in which the safety determination unit performs:

performing learning processing, and generating a learning device in which the driver information and the environmental information have been associated with the safety index value; and employing the learning device that has been generated, and calculating the safety index value.

(4) The information processing device described in (2), in which the safety determination unit performs:

performing learning processing, and generating a learning device in which the driver information and the environmental information have been associated with the manual driving recovery available time; and employing the learning device that has been generated, and estimating the manual driving recovery available time.

(5) The information processing device described in any of (1) to (4), further including:

a communication unit that performs communication with a server, in which the information processing device acquires, from the server, a learning device in which pieces of data (a) and (b) described below have been associated with each other:

(a) the driver information and the environmental information; and (b) at least either the safety index value or a manual driving recovery available time including a time required until the driver in the vehicle during the automatic driving becomes able to start the safe manual driving.

(6) The information processing device described in any of (1) to (5), in which the driver information includes information that enables a degree of awakening of the driver to be calculated.

(7) The information processing device described in any of (1) to (6), in which the driver information includes at least one of a line-of-sight direction, an eyeball behavior, a pupil diameter, or a facial expression, the line-of-sight, the eyeball behavior and the pupil diameter being acquired from an image including an eyeball area, the facial expression being acquired from an image including a face area.

(8) The information processing device described in any of (1) to (7), in which the driver information includes information including operation information of the driver after a mode is switched from an automatic driving mode to a manual driving mode.

(9) The information processing device described in any of (1) to (8), in which the environmental information includes at least one of a captured image, depth information, three-dimensional structure information, LiDAR acquisition information, topographical information, or positional information.

(10) The information processing device described in any of (1) to (9), in which the safety determination unit performs:

performing learning processing, and generating a learning device in which the driver information and the environmental information have been associated with the manual driving recovery available time; and employing the learning device that has been generated, and calculating the manual driving recovery available time, and the information processing device further includes:

a notice controller that performs notice processing for giving manual driving recovery request notice to the driver via a notice unit at a timing determined on the basis of the manual driving recovery available time that has been calculated by the safety determination unit.

(11) The information processing device described in (10), in which the notice unit includes at least one of a display unit, a sound output unit, or a vibrator.

(12) A movement device including:

a driver information acquisition unit that acquires driver information of the movement device;

an environmental information acquisition unit that acquires environmental information of the movement device; and a safety determination unit that receives, as an input, the driver information and the environmental information, and calculates a safety index value indicating whether or not a driver in the movement device during automatic driving is in a state of being able to perform safe manual driving.

(13) The movement device described in (12), in which the safety determination unit performs:

receiving, as the input, the driver information and the environmental information, and estimating a manual driving recovery available time including a time required until the driver in the movement device during the automatic driving becomes able to start the safe manual driving.

(14) The movement device described in (12) or (13), in which the safety determination unit performs:

performing learning processing, and generating a learning device in which the driver information and the environmental information have been associated with the safety index value; and employing the learning device that has been generated, and calculating the safety index value.

(15) The movement device described in (13), in which the safety determination unit performs:

performing learning processing, and generating a learning device in which the driver information and the environmental information have been associated with the manual driving recovery available time; and employing the learning device that has been generated, and estimating the manual driving recovery available time.

(16) The movement device described in (15), further including:

a notice controller that performs notice processing for giving manual driving recovery request notice to the driver via a notice unit at a timing determined on the basis of the manual driving recovery available time that has been calculated by the safety determination unit.

(17) The movement device described in (16), in which the notice unit includes at least one of a display unit, a sound output unit, or a vibrator.

(18) An information processing method performed by an information processing device, the information processing method including:

a safety determination unit receiving, as an input, driver information and environmental information, and performing processing for calculating a safety index value indicating whether or not a driver in a vehicle during automatic driving is in a state of being able to perform safe manual driving.

(19) An information processing method performed by a movement device, the information processing method including:

a driver information acquisition step of a driver information acquisition unit acquiring driver information of the movement device;

an environmental information acquisition step of an environmental information acquisition unit acquiring environmental information of the movement device; and a safety determination step of a safety determination unit receiving, as an input, the driver information and the environmental information, and calculating a safety index value indicating whether or not a driver in the movement device during automatic driving is in a state of being able to perform safe manual driving.

(20) A program that causes an information processing device to perform information processing, the information processing including:

a safety determination unit receiving, as an input, driver information and environmental information, and calculating a safety index value indicating whether or not a driver in a vehicle during automatic driving is in a state of being able to perform safe manual driving.

Furthermore, a series of processes described in the description can be performed by hardware or software, or a composite configuration of hardware and software. In a case where the series of processes is performed by software, the series of processes can be performed by installing a program recording a processing sequence in a memory within a computer that has been incorporated into dedicated hardware, or can be performed by installing the program in a general-purpose computer that can perform various types of processing. For example, the program can be recorded in a recording medium in advance. The program can be installed in a computer from the recording medium, or the program can be received via a network such as a local area network (LAN) or the Internet, and can be installed in a recording medium such as an incorporated hard disk.

Note that various types of processing described in the description may be performed in series according to the description, or may be performed in parallel or individually according to a throughput of a device that performs processing or as needed. Furthermore, the system described herein is a configuration including a logical set of a plurality of devices, and does not always include devices having respective configurations in the same housing.

INDUSTRIAL APPLICABILITY

As described above, by employing a configuration in one example of the present disclosure, a configuration is achieved in which driver information and environmental information are input and a safety index value indicating whether or not a driver who is performing automatic driving is in a state of being able to perform safe manual driving or a manual driving recovery available time is estimated.

Specifically, for example, the configuration includes: a driver information acquisition unit that acquires driver information of a movement device such as an automobile; an environmental information acquisition unit that acquires environmental information of the movement device; and a safety determination unit that receives, as an input, the driver information and the environmental information, and learns and calculates a safety index value indicating whether or not a driver in the movement device during automatic driving is in a state of being able to perform safe manual driving. The safety determination unit further estimates a manual driving recovery available time including a time required until the driver in the movement device during the automatic driving becomes able to start the safe manual driving.

By employing this configuration, a configuration is achieved in which driver information and environmental information are input and a safety index value indicating whether or not a driver who is performing automatic driving is in a state of being able to perform safe manual driving or a manual driving recovery available time is estimated.

REFERENCE SIGNS LIST

10 Automobile
11 Data processing unit
12 Driver information acquisition unit
13 Environmental information acquisition unit
14 Communication unit
15 Notice unit
20 Driver
30 Server
100 Movement device
101 Input unit
102 Data acquisition unit
103 Communication unit
104 In-vehicle device
105 Output controller
106 Output unit
107 Drive system controller
108 Drive-system system
109 Body system controller
110 Body-system system
111 Storage
112 Automatic driving controller
121 Communication network
131 Detection unit
132 Self-position estimation unit
133 Situation analyzer
134 Planning unit
135 Motion controller
141 Outside-vehicle information detection unit
142 In-vehicle information detection unit
143 Vehicle state detection unit
151 Map analyzer
152 Traffic rule recognizer
153 Situation recognizer
154 Situation prediction unit
155 Safety determination unit
161 Route planning unit
162 Action planning unit
163 Motion planning unit
171 Emergency avoidance unit
172 Acceleration or deceleration controller
173 Direction controller
201 Movement device
181 Traveling section display
182 Tablet
201 Driver information acquisition unit
202 Environmental information acquisition unit
203 Driver personal identification information acquisition unit
210 Safety determination unit
211 Learning processing unit
211 Safety determination processing performing unit (manual driving recovery available time estimation unit)
213 Personal authentication processing unit
221 Notice controller
222 Notice unit
230 Communication unit
240 Storage
300 Server
301 Learning data acquisition or generation unit
302 Learning processing unit
303 Communication unit
304 Storage
501 CPU
502 ROM
503 RAM
504 Bus
505 Input/output interface
506 Input unit
507 Output unit
508 Storage
509 Communication unit
510 Drive
511 Removable medium
521 Sensor
522 Drive unit

The invention claimed is:

1. An information processing device, comprising:
circuitry configured to:
acquire driver information and environmental information, wherein
the environmental information includes a state of a traffic light which is on a travelling route of a vehicle;
generate a machine learning model based on the driver information and the environmental information;
calculate, based on the machine learning model, a manual driving recovery available time, wherein
the manual driving recovery available time includes a time required for a driver of the vehicle in an automatic driving mode to start driving of the vehicle in a manual driving mode, and
in the machine learning model, the driver information and the environmental information are associated with the manual driving recovery available time; and
control generation of a prompt for the driver to switch the vehicle from the automatic driving mode to the manual driving mode, wherein the generation of the prompt is at a notice time specified by the manual driving recovery available time.

2. The information processing device according to claim 1, wherein
the circuitry is further configured to employ the machine learning model to calculate a safety index value, and
in the machine learning model, the driver information and the environmental information are further associated with the safety index value.

3. The information processing device according to claim 1, wherein the circuitry is further configured to:
perform communication with a server; and
acquire a new machine learning model in which the driver information and the environmental information are associated with at least one of a safety index value or the manual driving recovery available time.

4. The information processing device according to claim 1, wherein the driver information includes information to calculate a degree of awakening of the driver.

5. The information processing device according to claim 1, wherein
the circuitry is further configured to acquire:
an eyeball behavior of the driver, a pupil diameter of the driver, and a line-of-sight direction of the driver, from an image including an eyeball area of the driver; and
a facial expression of the driver from an image including a face area of the driver, and the driver information includes at least one of the line-of-sight direction of the driver, the eyeball behavior of the driver, the pupil diameter of the driver, or the facial expression of the driver.

6. The information processing device according to claim 1, wherein the driver information includes historical operation information of the driver after a mode is switched from the automatic driving mode to the manual driving mode.

7. The information processing device according to claim 1, wherein the environmental information further includes at least one of a captured image, depth information, three-dimensional structure information, LiDAR acquisition information, topographical information, or positional information.

8. The information processing device according to claim 1, further comprising at least one of a display, a speaker, or a vibrator, wherein the circuitry is further configured to control the at least one of the display, the speaker, or the vibrator to generate the prompt.

9. A movement device, comprising:

a first sensor configured to acquire driver information of the movement device;

a second sensor configured to acquire environmental information of the movement device, wherein the environmental information includes a state of a traffic light on a travelling route of the movement device; and circuitry configured to:

acquire the driver information and the environmental information;

generate a machine learning model based on the driver information and the environmental information;

calculate, based on the machine learning model, a manual driving recovery available time, wherein the manual driving recovery available time includes a time required for a driver of the movement device in an automatic driving mode to start driving of the movement device in a manual driving mode, and in the machine learning model, the driver information and the environmental information are associated with the manual driving recovery available time; and control generation of a prompt for the driver to switch the movement device from the automatic driving mode to the manual driving mode, wherein the generation of the prompt is at a notice time specified by the manual driving recovery available time.

10. The movement device according to claim 9, wherein the circuitry is further configured to employ the machine learning model to calculate a safety index value, and in the machine learning model, the driver information and the environmental information are further associated with the safety index value.

11. The movement device according to claim 9, further comprising at least one of a display, a speaker, or a vibrator, wherein the circuitry is further configured to control the at least one of the display, the speaker, or the vibrator to generate the prompt.

12. An information processing method, comprising:

in an information processing device:

acquiring driver information and environmental information, wherein the environmental information includes a state of a traffic light which is on a travelling route of a vehicle;

generating a machine learning model based on the driver information and the environmental information;

calculating, using the machine learning model, a manual driving recovery available time, wherein the manual driving recovery available time includes a time required for a driver of the vehicle in an automatic driving mode to start driving of the vehicle in a manual driving mode, and in the machine learning model, the driver information and the environmental information are associated with the manual driving recovery available time; and controlling generation of a prompt for the driver to switch the vehicle from the automatic driving mode to the manual driving mode, wherein the generation of the prompt is at a notice time specified by the manual driving recovery available time.

13. An information processing method, comprising:

in a movement device:

acquiring driver information of the movement device and environmental information of the movement device, wherein the environmental information includes a state of a traffic light which is on a travelling route of the movement device;

generating a machine learning model based on the driver information and the environmental information;

calculating, using the machine learning model, a manual driving recovery available time, wherein the manual driving recovery available time includes a time required for a driver of the movement device in an automatic driving mode to start driving of the movement device in a manual driving mode, and in the machine learning model, the driver information and the environmental information are associated with the manual driving recovery available time; and controlling generation of a prompt for the driver to switch the movement device from the automatic driving mode to the manual driving mode, wherein the generation of the prompt is at a notice time specified by the manual driving recovery available time.

14. A non-transitory computer readable medium having stored thereon computer executable instructions, which when executed by a computer, cause the computer to execute operations, the operations comprising:

acquiring driver information and environmental information, wherein the environmental information includes a state of a traffic light which is on a travelling route of a vehicle;

generating a machine learning model based on the driver information and the environmental information;

calculating, using the machine learning model, a manual driving recovery available time, wherein the manual driving recovery available time includes a time required for a driver of the vehicle in an automatic driving mode to start driving of the vehicle in a manual driving mode, and in the machine learning model, the driver information and the environmental information are associated with the manual driving recovery available time; and controlling generation of a prompt for the driver to switch the vehicle from the automatic driving mode to the manual driving mode, wherein the generation of the prompt is at a notice time specified by the manual driving recovery available time.

* * * * *